(12) United States Patent
Nakagawa

(10) Patent No.: US 9,160,217 B2
(45) Date of Patent: Oct. 13, 2015

(54) BUSBAR UNIT AND MOTOR

(75) Inventor: Airi Nakagawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 424 days.

(21) Appl. No.: 13/581,614

(22) PCT Filed: Feb. 28, 2011

(86) PCT No.: PCT/JP2011/055156
§ 371 (c)(1),
(2), (4) Date: Aug. 29, 2012

(87) PCT Pub. No.: WO2011/108734
PCT Pub. Date: Sep. 9, 2011

(65) Prior Publication Data
US 2012/0319512 A1 Dec. 20, 2012

(30) Foreign Application Priority Data

Mar. 3, 2010 (JP) .................................. 2010-046955
Jun. 25, 2010 (JP) .................................. 2010-145082

(51) Int. Cl.
*H02K 3/50* (2006.01)
*H02K 15/095* (2006.01)
(Continued)

(52) U.S. Cl.
CPC ................ *H02K 15/03* (2013.01); *H02K 1/278* (2013.01); *H02K 3/522* (2013.01); *H02K 15/12* (2013.01); *H02K 1/148* (2013.01); *H02K 5/225* (2013.01); *H02K 15/095* (2013.01); *H02K 2203/09* (2013.01); *H02K 2203/12* (2013.01)

(58) Field of Classification Search
CPC .......... H02K 3/521; H02K 3/522; H02K 3/52
USPC ........................................................... 310/71
See application file for complete search history.

(56) References Cited

U.S. PATENT DOCUMENTS 4,590,397 A * 5/1986 Davis .............................. 310/71
7,582,999 B2 * 9/2009 Atkinson ....................... 310/179
(Continued)

FOREIGN PATENT DOCUMENTS

CN 101562373 A 10/2009
JP 6-233483 A 8/1994
(Continued)

OTHER PUBLICATIONS

English translation of Official Communication issued in International Patent Application No. PCT/JP2011/055156, mailed on May 5, 2011.

(Continued)

*Primary Examiner* — Terrance Kenerly
(74) *Attorney, Agent, or Firm* — Keating & Bennett, LLP

(57) ABSTRACT

A busbar unit is arranged on an axial end portion of a stator and electrically connected with a plurality of coil wire terminals arranged to project in an axial direction above the axial end portion of the stator. The busbar unit includes a plurality of busbars each including a body portion defined by an electrically conductive wire having an annular or "C" shape, the body portion being arranged around an axis of the stator; a holder member arranged on the axial end portion of the stator to hold the busbars; and a plurality of terminal members each including a busbar connection portion connected with the body portion of one of the busbars, and a coil connection portion connected with one of the coil wire terminals.

17 Claims, 48 Drawing Sheets

(51) Int. Cl.
*H02K 15/03* (2006.01)
*H02K 1/27* (2006.01)
*H02K 3/52* (2006.01)
*H02K 15/12* (2006.01)
H02K 1/14 (2006.01)
H02K 5/22 (2006.01)

(56) References Cited

U.S. PATENT DOCUMENTS

| | | |
|---|---|---|
| 2003/0201688 A1 | 10/2003 | Yamamura et al. |
| 2005/0236921 A1* | 10/2005 | Yoneda et al. ............... 310/179 |
| 2006/0022544 A1 | 2/2006 | Kinashi |
| 2007/0114878 A1 | 5/2007 | Tatebe |
| 2007/0205678 A1 | 9/2007 | Takashima et al. |
| 2009/0108688 A1* | 4/2009 | Miura ............................ 310/71 |
| 2009/0256439 A1 | 10/2009 | Inoue et al. |
| 2010/0194214 A1 | 8/2010 | Takahashi et al. |
| 2010/0275436 A1 | 11/2010 | Kiyono et al. |

FOREIGN PATENT DOCUMENTS

| | | |
|---|---|---|
| JP | 2000-333400 A | 11/2000 |
| JP | 2001-119885 A | 4/2001 |
| JP | 2003-324883 A | 11/2003 |
| JP | 2004-056873 A | 2/2004 |
| JP | 2006-050690 A | 2/2006 |
| JP | 2007-143324 A | 6/2007 |
| JP | 2007-174869 A | 7/2007 |
| JP | 2007-244008 A | 9/2007 |
| JP | 2007-259523 A | 10/2007 |
| JP | 2007-288821 A | 11/2007 |
| JP | 2008-220027 A | 9/2008 |
| JP | 2008-278704 A | 11/2008 |
| JP | 2009-017666 A | 1/2009 |
| JP | 2009-089456 A | 4/2009 |
| JP | 2009-171740 A | 7/2009 |
| JP | 2009-261082 A | 11/2009 |
| JP | 2009-261083 A | 11/2009 |
| JP | 2009-261220 A | 11/2009 |

OTHER PUBLICATIONS

English translation of Official Communication issued in corresponding International Application PCT/JP2011/055156, mailed on Sep. 13, 2012.

Official Communication issued in International Patent Application No. PCT/JP2011/055156, mailed on May 31, 2011.

Yokogawa et al., "Stator and Motor", U.S. Appl. No. 13/522,412, filed Jul. 16, 2012.

Yokogawa et al., "Stator Segment and Motor", U.S. Appl. No. 13/522,414, filed Jul. 16, 2012.

* cited by examiner

BUSBAR UNIT AND MOTOR

BACKGROUND OF THE INVENTION

1. Field of the Invention

The present invention relates to a busbar unit, and more specifically, to an inner-rotor motor including a busbar unit.

2. Description of the Related Art

FIGS. 4 and 5 of JP-A 2000-333400 show a busbar which is connected with coil terminals from a stator and arranged to supply currents to coils. A plurality of such busbars (lead frames) are placed one upon another, and each of the busbars (lead frames) is defined by a plate material having a substantially annular shape in plan view. Each busbar (lead frame) and a plurality of terminals are defined integrally with each other. The terminals are arranged to project in a radial direction from an outer circumference or an inner circumference of each busbar. In short, each busbar (lead frame) is defined by a substantially annular plate material having a plurality of terminals projecting therefrom in the radial direction. Therefore, the material yield of the busbars is not very high.

JP-A 2004-56873 discloses a motor in which a busbar and terminals are provided separately from each other. In this motor, the busbar is defined by a wire (cable), and the terminals, which are arranged to connect the busbar to coil terminals, are provided separately from the busbar. This arrangement achieves an improvement in the material yield of the busbars.

The motor described in JP-A 2004-56873 achieves an improvement in the material yield of the busbars. However, the motor described in JP-A 2004-56873 has a disadvantage in that the orientation of the coil terminals needs to be adjusted when the terminals are connected to the coil terminals. Therefore, according to the motor described in JP-A 2004-56873, an operation of connecting the terminals to the coil terminals cannot be performed efficiently.

SUMMARY OF THE INVENTION

Preferred embodiments of the present invention have been conceived to provide an improvement in the material yield of the busbars, and also an improvement in workability in attaching the busbars.

A busbar unit according to a preferred embodiment of the present invention is arranged on an axial end portion of a stator. The busbar unit is electrically connected with a plurality of coil wire terminals arranged to project in an axial direction above the axial end portion of the stator. The busbar unit preferably includes a plurality of busbars, a holder member, and a plurality of terminal members. Each of the busbars preferably includes a body portion defined by an electrically conductive wire shaped in a ring or the letter "C", the body portion being arranged around an axis of the stator. The holder member is arranged on the axial end portion of the stator to hold the busbars. Each of the terminal members preferably includes a busbar connection portion and a coil connection portion. The busbar connection portion is connected with the body portion of one of the busbars. The coil connection portion is connected with one of the coil wire terminals.

According to the busbar unit described above, the busbars and the terminal members preferably are defined separately from one another, and each of the busbars is preferably defined by a wire. Therefore, an improvement in the material yield of the busbars is achieved. In addition, each of the terminal members includes the coil connection portion arranged to be connected with one of the coil wire terminals arranged to extend in the axial direction of the stator. This makes it possible to connect the busbars with the corresponding coil wire terminals without the need for an operation of adjusting the orientation of any coil wire terminal.

The busbar unit according to a preferred embodiment of the present invention is able to achieve an improvement in the material yield of the busbars, and also an improvement in workability in attaching the busbars.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. Note that the following description is meant to be merely illustrative, and should not be construed to restrict the scope of the present invention, applications thereof, or purposes thereof.

Figure 1:
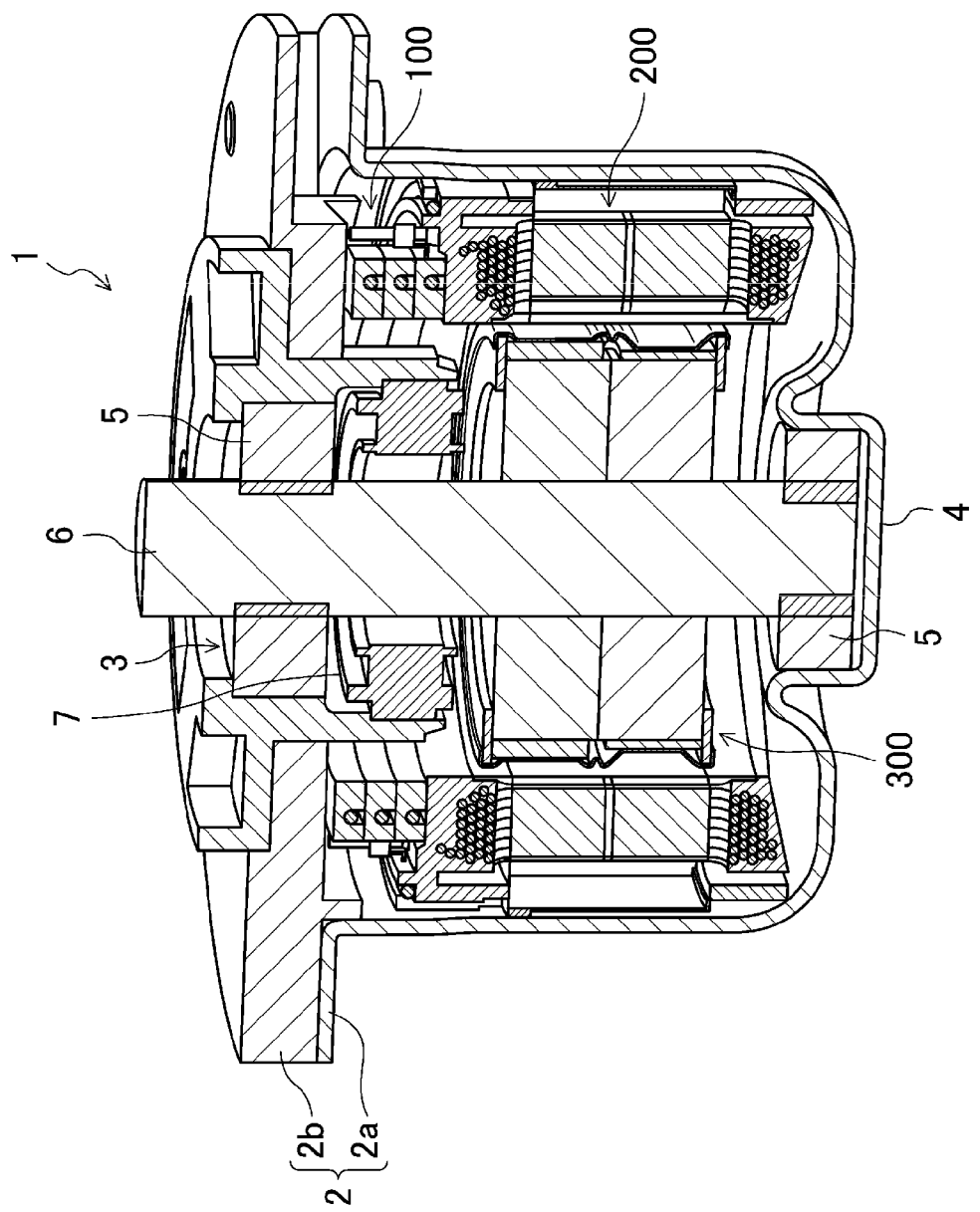
FIG. 1 is a cross-sectional view of a motor according to a preferred embodiment of the present invention.

FIG. 1 illustrates a motor 1 including a rotor 300 according to a preferred embodiment of the present invention. The motor 1 is preferably an inner-rotor brushless motor to be installed in a vehicle, for example, and is preferably used to drive an electric power steering, for example. As illustrated in FIG. 1, the motor 1 preferably includes a casing 2, a busbar unit 100, a stator 200, the rotor 300, a shaft 6, and so on.

The casing 2 preferably includes a receptacle 2a which has a bottom and is substantially cylindrical, and a substantially disc-shaped lid 2b. The lid 2b is secured to a flange of the receptacle 2a. The flange of the receptacle 2a is arranged to project radially outward around a circumference of an opening of the receptacle 2a. The stator 200 is contained inside the receptacle 2a. A through hole 3 is preferably defined in a central portion of the lid 2b. A bearing portion 4 is arranged on a bottom surface of the receptacle 2a to be opposed to the through hole 3. Bearings 5 are arranged in the bearing portion 4 and inside the through hole 3. The shaft 6 is supported through the bearings 5 to be rotatable with respect to the casing 2. One end portion of the shaft 6 is arranged to project outward from the lid 2b through the through hole 3. The end portion of the shaft 6 is connected to the electric power steering through a speed reducer (not shown).

The rotor 300 is preferably fixed to a middle portion of the shaft 6 such that the rotor 300 is coaxial or substantially coaxial with the shaft 6. The stator 200 is fixed to an inner circumferential surface of the receptacle 2a such that the stator 200 surrounds the rotor 300. An inner circumferential surface of the stator 200 and an outer circumferential surface of the rotor 300 are arranged opposite each other with a slight gap therebetween so that the motor 1 can preferably perform efficiently. The busbar unit 100 is attached to an end portion of the stator 200. In FIG. 1, reference numeral "7" indicates a rotation angle sensor arranged to detect a rotation angle (e.g., a resolver).

The motor 1 is preferably provided with a variety of unique features in order to achieve improved productivity, reduced production cost, and so on. Details thereof will now be described below.

Figure 2:
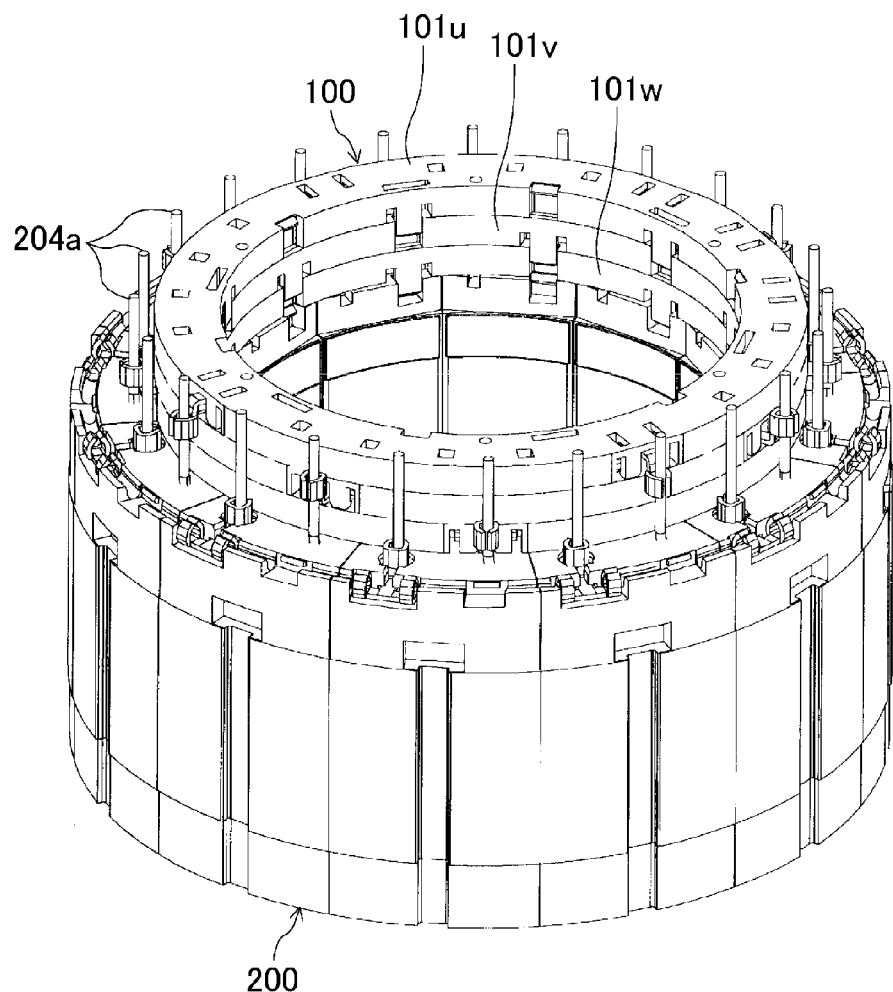
FIG. 2 is a perspective view of a busbar unit and a stator according to a preferred embodiment of the present invention.
Figure 3:
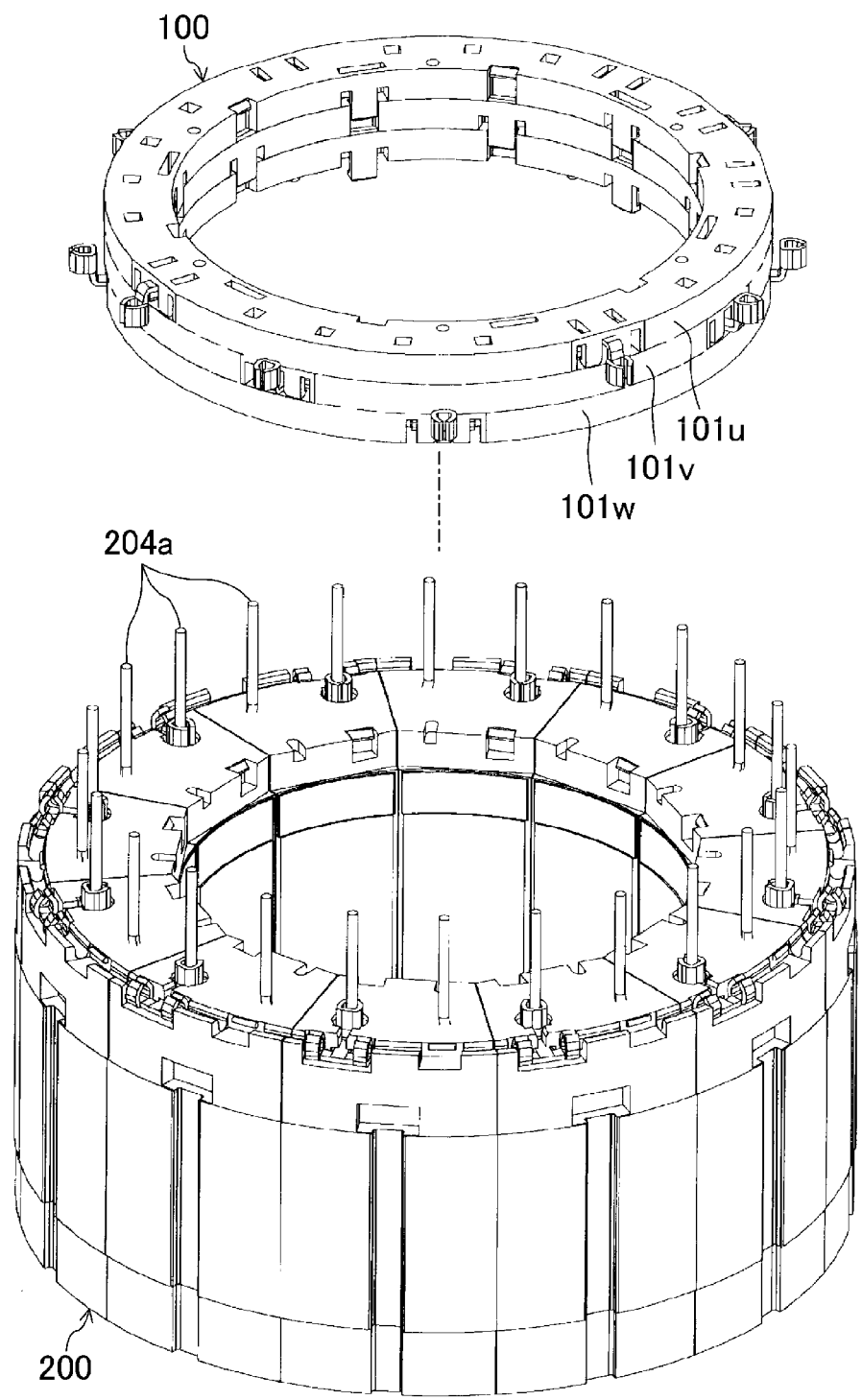
FIG. 3 is an exploded perspective view of the busbar unit and the stator according to a preferred embodiment of the present invention.

The structure of the busbar unit 100 in accordance with a preferred embodiment of the present invention will now be described in detail below. Referring to FIGS. 2 and 3, the busbar unit 100 is arranged on an axial end portion (i.e., an upper end portion in FIG. 2) of the stator 200. The busbar unit 100 is electrically connected to a plurality of coil wire terminals 204a from the stator 200, which will be described below. The busbar unit 100 is arranged to supply currents to coils 204 of the stator 200, which will be described below.

Referring to FIGS. 4, 5, 6, 7, 8, and 9, the busbar unit 100 includes holders 101u, 101v, and 101w, busbars 120, and terminal members 130. In the present preferred embodiment, the busbars 120 preferably are three in number, for example, and each of the busbars 120 is provided for a separate one of phases of the coils 204 of the stator 200, i.e., a u phase, a v phase, and a w phase. A total of three holders are preferably provided, i.e., a u-phase holder 101u, a v-phase holder 101v, and a w-phase holder 101w. Each holder is independently arranged to accommodate and hold a separate one of the busbars 120. In addition, a plurality of terminal members 130 is connected to each busbar 120.

Figure 7:
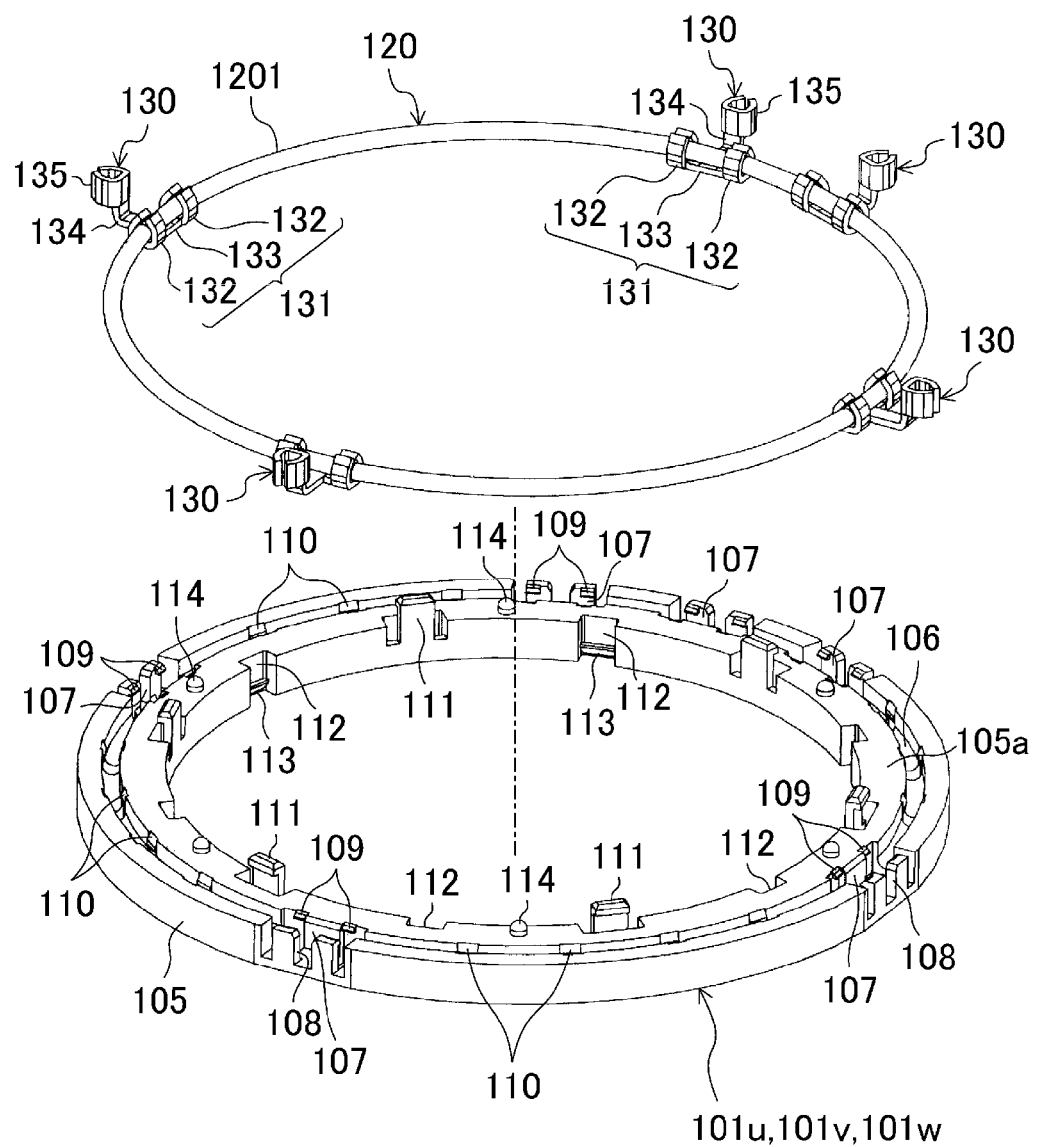
FIG. 7 is a perspective view of a busbar and a holder according to a preferred embodiment of the present invention.
Figure 8:
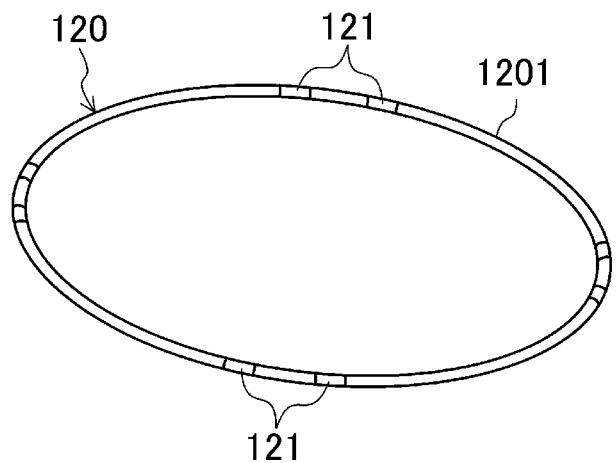
FIG. 8 is a perspective view of the busbar according to a preferred embodiment of the present invention.

Referring to FIGS. 7 and 8, each busbar 120 is preferably defined by a body portion 1201, which is defined, for example, by an electrically conductive wire shaped in a ring. Specifically, each busbar 120 (i.e., the body portion 1201) according to the present preferred embodiment is preferably defined by a bare electric wire (e.g., a bare copper wire) without an insulating coating. The busbar 120 (i.e., the body portion 1201) preferably includes a plurality of terminal connection portions 121 arranged at predetermined positions spaced from one another in a circumferential direction. The terminal members 130 are connected to the terminal connection portions 121. Each terminal connection portion 121 is preferably deformed to have, for example, a rectangular or substantially rectangular shape in a cross-section when the terminal connection portion 121 is connected to the terminal member 130. The portions of the busbar 120 (i.e., the body portion 1201) other than the terminal connection portions 121 are arranged to have a substantially circular shape in a cross-section. In the present preferred embodiment, the area of a cross section of the busbar 120 (i.e., the body portion 1201) is greater than that of a cross section of a coil wire used for the coils 204 of the stator 200.

Figure 57:
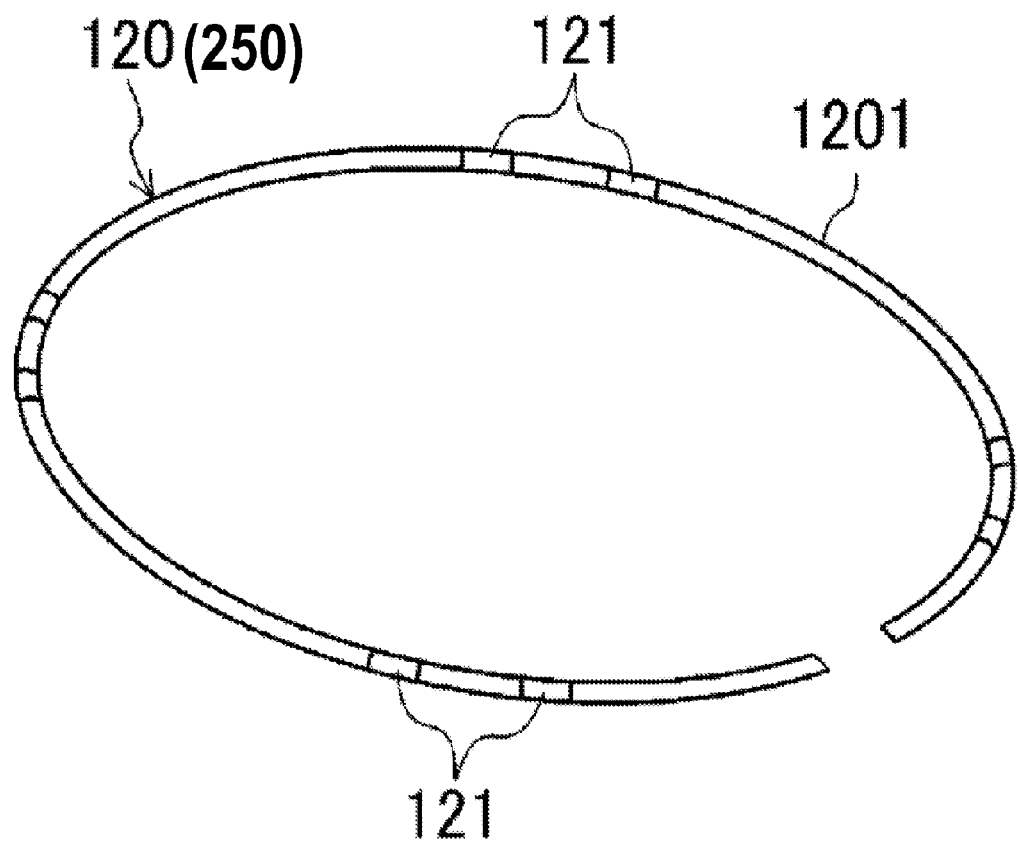
FIG. 57 is a perspective view of a busbar according to a preferred embodiment of the present invention.

Note that, in the present preferred embodiment, the busbar 120 may have any shape in a cross-section, as long as the busbar 120 is defined by an electrically conductive wire. Also note that the busbar 120 may not necessarily be in the shape of a ring, but may be in the shape of the letter "C", for example, as shown in FIG. 57. Also note that the busbar 120 may be defined by an electrically conductive wire having an insulating coating arranged on an outer circumference thereof. In the case where the busbar 120 is defined by an electrically conductive wire having an insulating coating arranged on an outer circumference thereof, it is necessary to remove the insulating coating from the terminal connection portions 121 of the busbar 120. The removal of the insulating coating may be accomplished either by a mechanical method or by resistance welding, as long as the terminal connection portions 121 are able to achieve electrical connection with the terminal members 130.

Figure 9:
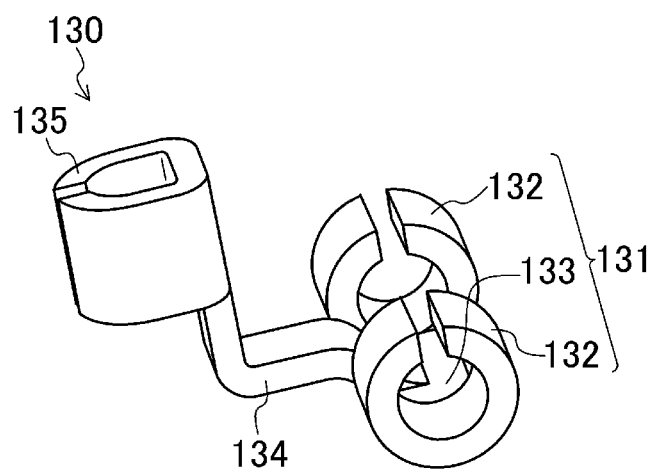
FIG. 9 is a perspective view of an example terminal member according to a preferred embodiment of the present invention.

Referring to FIG. 9, each terminal member 130 is preferably made out of a single piece of plate material, for example. The terminal member 130 preferably includes a busbar connection portion 131, which is connected with the busbar 120 (i.e., the body portion 1201); a coil connection portion 135, which is connected with the coil wire terminal 204a from the stator 200; and a joining portion 134, which is arranged to extend continuously between the busbar connection portion 131 and the coil connection portion 135.

The busbar connection portion 131 is preferably defined by two C-shaped tubular portions 132 and a plate portion 133 arranged to join end surfaces of the two C-shaped tubular portions 132 to each other. Each of the two C-shaped tubular portions 132 is a tubular portion preferably defined by bending plate material to assume or substantially assume the shape of the letter "C". The two C-shaped tubular portions 132 are arranged to be coaxial or substantially coaxial with each other. The busbar 120 is arranged to pass through the C-shaped tubular portions 132. The coil connection portion 135 is preferably a tubular portion defined by bending a plate material to substantially assume or substantially assume the shape of the letter "C". The coil wire terminal 204a is preferably arranged to pass through this tubular portion. An axis of the coil connection portion 135 and an axis of each C-shaped tubular portion 132 are preferably arranged to be perpendicular or substantially perpendicular to each other. The joining portion 134 is preferably defined by plate material extending from an end surface of the coil connection portion 135 to the plate portion 133 of the busbar connection portion 131. The joining portion 134 is preferably bent midway in a plate thickness direction. Specifically, the joining portion 134 is arranged to extend from the end surface of the coil connection portion 135 in an axial direction of the coil connection portion 135, and be bent in a direction perpendicular or substantially perpendicular to the axial direction of the coil connection portion 135 to extend up to the plate portion 133. The entire terminal member 130 therefore assumes or substantially assumes the shape of the letter "T" in a plan view when viewed from above in the axial direction of the coil connection portion 135, and assumes or substantially assumes the shape of the letter "L" in a plan view when viewed from above in the axial direction of the busbar connection portion 131.

Figure 10:
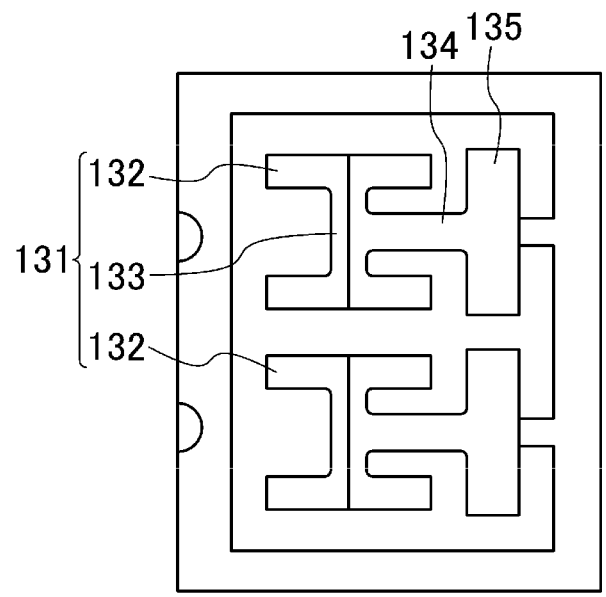
FIG. 10 illustrates a development of the example terminal member according to a preferred embodiment of the present invention.

FIG. 10 shows a development of the terminal member 130. The single piece of plate material is cut in accordance with the development of FIG. 10. The resulting plate material is subjected to a bending process to define the terminal member 130. As is apparent from FIG. 10, the terminal member 130 according to the present preferred embodiment has a shape that achieves a high yield of the material.

Figure 11:
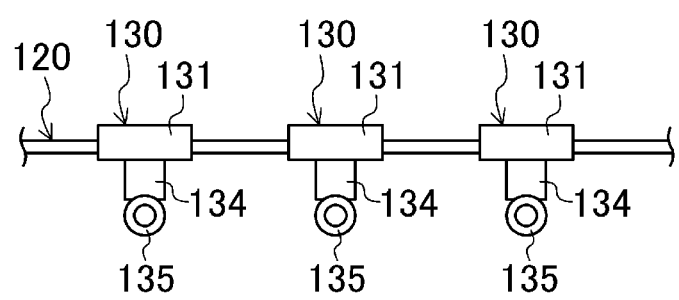
FIG. 11 is a diagram illustrating a situation in which the busbar is inserted into terminal members according to a preferred embodiment of the present invention.

Referring to FIG. 11, the busbar 120 is preferably inserted into the terminal members 130 before the busbar 120 is shaped into a ring. In other words, a bare electric wire shaped in a straight line is inserted into the C-shaped tubular portions 132 of the terminal members 130. The C-shaped tubular portions 132 are then preferably crimped or welded, for example, onto the corresponding terminal connection portions 121 of the busbar 120. The busbar 120 (i.e., the bare electric wire) shaped in a straight line is thereafter shaped into a ring. As a result, the plurality of terminal members 130 are electrically connected with the busbar 120 (see FIG. 7). Note that, in the present preferred embodiment, the C-shaped tubular portions 132 of the terminal members 130 may preferably be, for example, crimped or welded onto the corresponding terminal connection portions 121 of the busbar 120 after the busbar 120 shaped in a straight line and having the terminal members 130 attached thereto is shaped into a ring.

Each of the three holders 101*u*, 101*v*, and 101*w* is preferably an annular member made of an insulating material and provided by a single piece, and has the same configuration. Referring to FIG. 7, each of the holders 101*u*, 101*v*, and 101*w* preferably includes a holder body 105 in an annular shape. An annular surface 105*a* of the holder body 105 includes an annular accommodating groove 106 defined therein. The annular busbar 120 (i.e., the body portion 1201) having the terminal members 130 connected thereto is placed and held inside the accommodating groove 106. The accommodating groove 106 includes a plurality of (for example, preferably six in the present preferred embodiment) terminal accommodating portions 107 arranged at predetermined positions spaced from one another in the circumferential direction. The terminal accommodating portions 107 are arranged to have the terminal members 130 placed and held therein. Each terminal accommodating portion 107 of the accommodating groove 106 preferably includes coming-off preventing portions 109 arranged to prevent the terminal member 130 from coming off. Portions of the accommodating groove 106 other than the terminal accommodating portions 107 preferably include a plurality of coming-off preventing portions 110 arranged to prevent the busbar 120 from coming off. The coming-off preventing portions 109 and 110 of the accommodating groove 106 are preferably defined by, for example, claws. An outer wall of the holder body 105 preferably includes cuts 108 arranged at the terminal accommodating portions 107 to allow the joining portion 134 of each terminal member 130 to pass there through to project radially outward from the holder body 105.

An inner wall of the holder body 105 of each of the holders 101*u*, 101*v*, and 101*w* includes a plurality of hooks 111 preferably arranged at regular or substantially regular intervals in the circumferential direction. Specifically, each hook 111 is defined by a portion of the inner wall of the holder body 105 which is arranged to extend in an axial direction to project above the annular surface 105*a* of the holder body 105. The inner wall of the holder body 105 additionally includes a plurality of vertical grooves 112 preferably arranged at regular or substantially regular intervals in the circumferential direction and between the hooks 111. Specifically, each of the vertical grooves 112 is arranged to extend in the axial direction in the inner wall of the holder body 105. Each vertical groove 112 preferably includes a projection 113 arranged at a bottom thereof to project radially inward.

Figure 12:
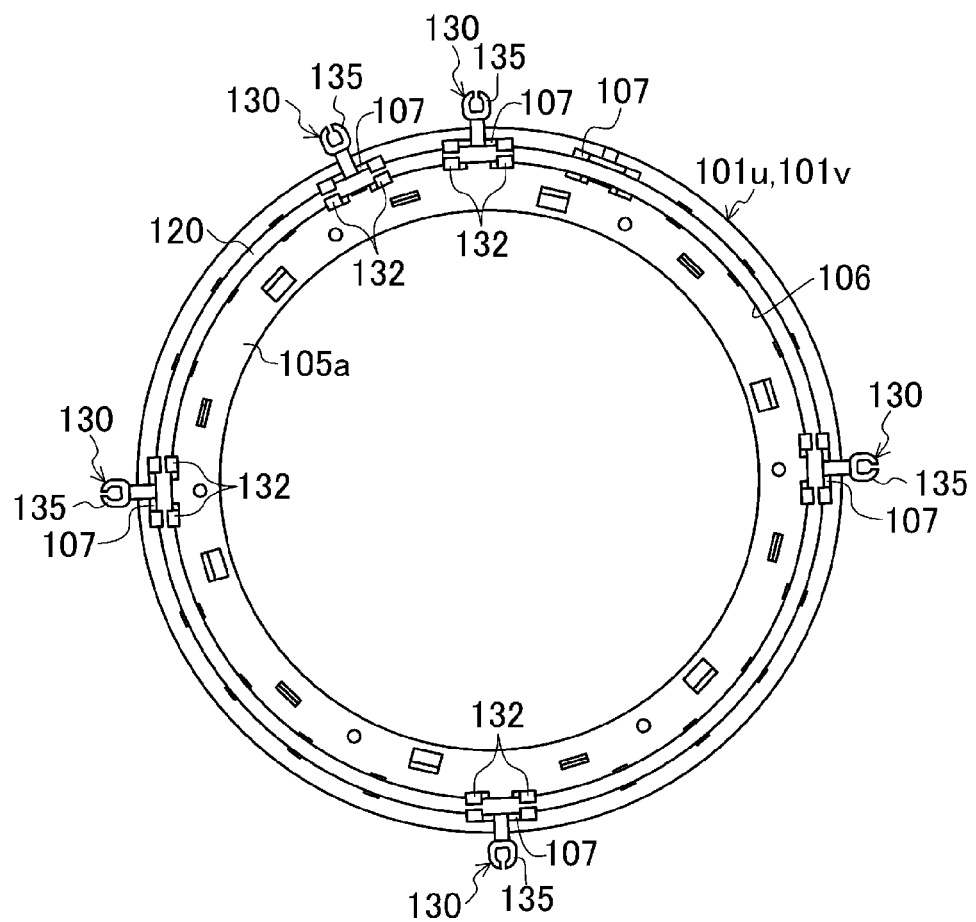
FIG. 12 is a plan view of a u-phase holder or a v-phase holder including the busbar according to a preferred embodiment of the present invention arranged therein.
Figure 13:
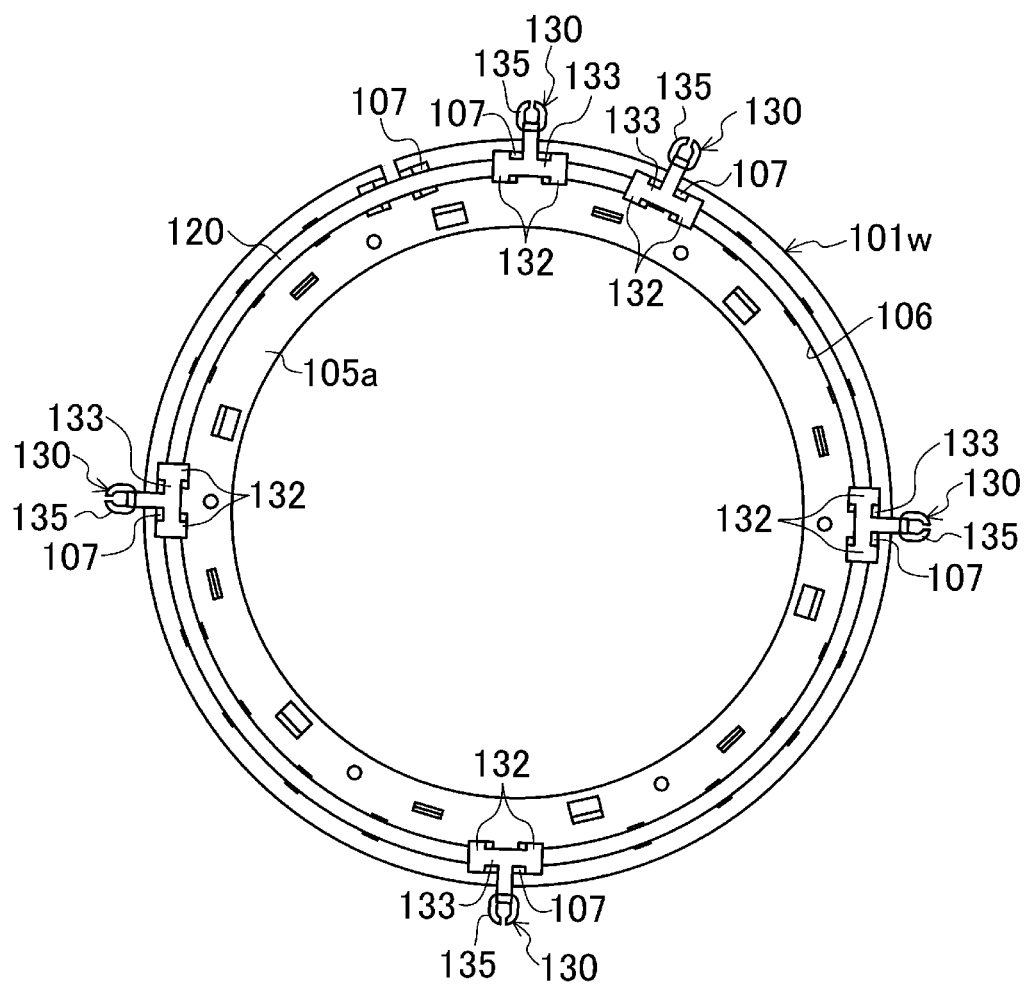
FIG. 13 is a plan view of a w-phase holder including the busbar according to a preferred embodiment of the present invention arranged therein.

Referring to FIGS. 12 and 13, five of the terminal members 130 are connected to each of the busbars 120 according to the present preferred embodiment preferably such that four of the five terminal members 130 are arranged at regular intervals of 90 degrees. The remaining terminal member 130 is preferably arranged in the vicinity of one of the four terminal members 130 on the busbar 120. In the present preferred embodiment, a manner in which the busbar 120 is placed inside the w-phase holder 101*w* is preferably slightly different from a manner in which the busbar 120 is placed inside each of the u-phase holder 101*u* and the v-phase holder 101*v*. Specifically, referring to FIG. 12, in the accommodating groove 106 of each of the u-phase holder 101*u* and the v-phase holder 101*v*, three of the terminal accommodating portions 107 are arranged in close vicinity to one another, and of the three terminal accommodating portions 107, the terminal accommodating portion 107 on the far right in FIG. 12 is preferably not provided with any terminal member 130. Meanwhile, referring to FIG. 13, in the accommodating groove 106 of the w-phase holder 101*w*, three of the terminal accommodating portions 107 are arranged in close vicinity to one another, and of the three terminal accommodating portions 107, the terminal accommodating portion 107 on the far left in FIG. 13 is not provided with any terminal member 130. In addition, in each of the holders 101*u*, 101*v*, and 101*w* having the busbar 120 placed therein, the coil connection portion 135 of each terminal member 130 is arranged to project radially outward. In addition, an axis of each coil connection portion 135 and an axis of each of the holders 101*u*, 101*v*, and 101*w* are arranged to be parallel or substantially parallel to each other.

Figure 4:
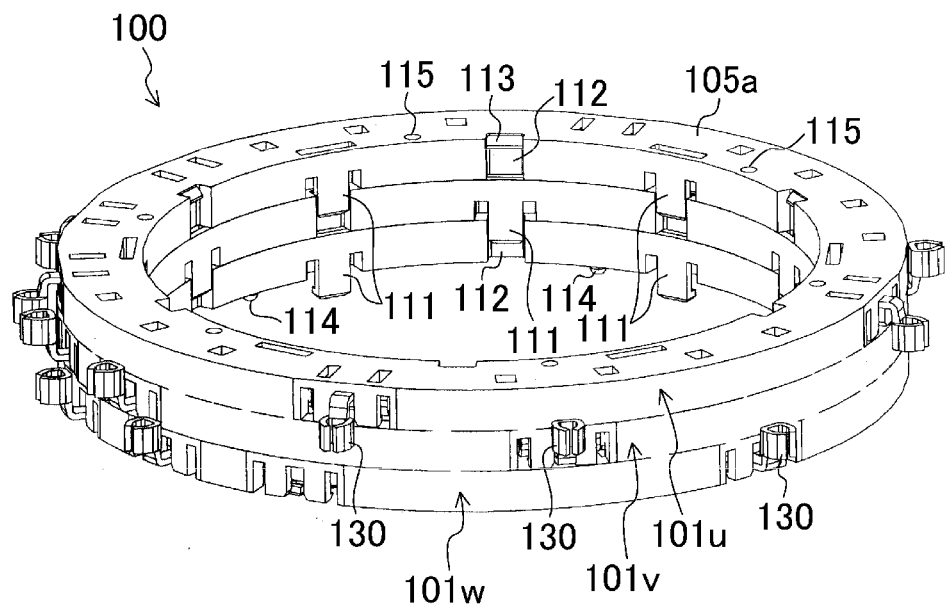
FIG. 4 is a perspective view of the busbar unit according to a preferred embodiment of the present invention.
Figure 5:
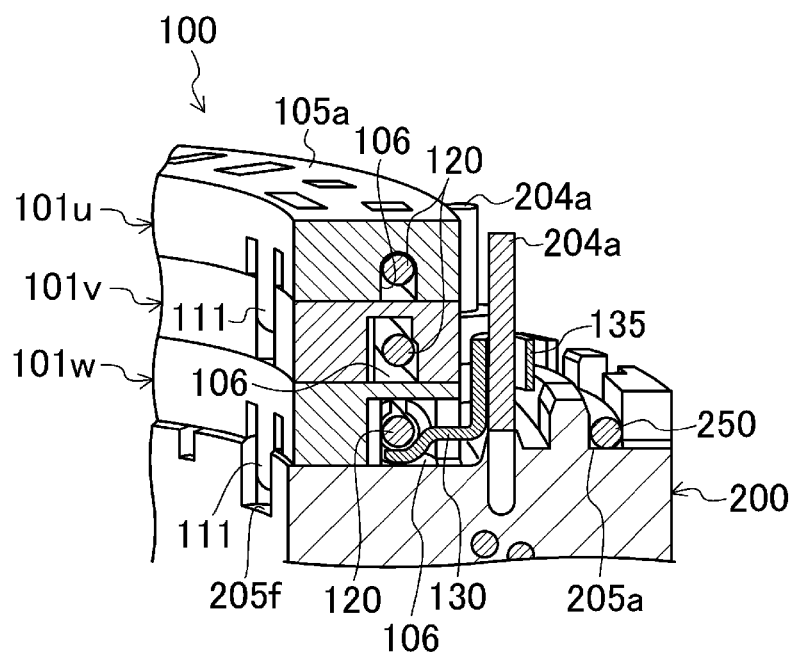
FIG. 5 is a cross-sectional view of the busbar unit and the stator according to a preferred embodiment of the present invention, illustrating a situation in which the busbar unit is secured to the stator.
Figure 6:
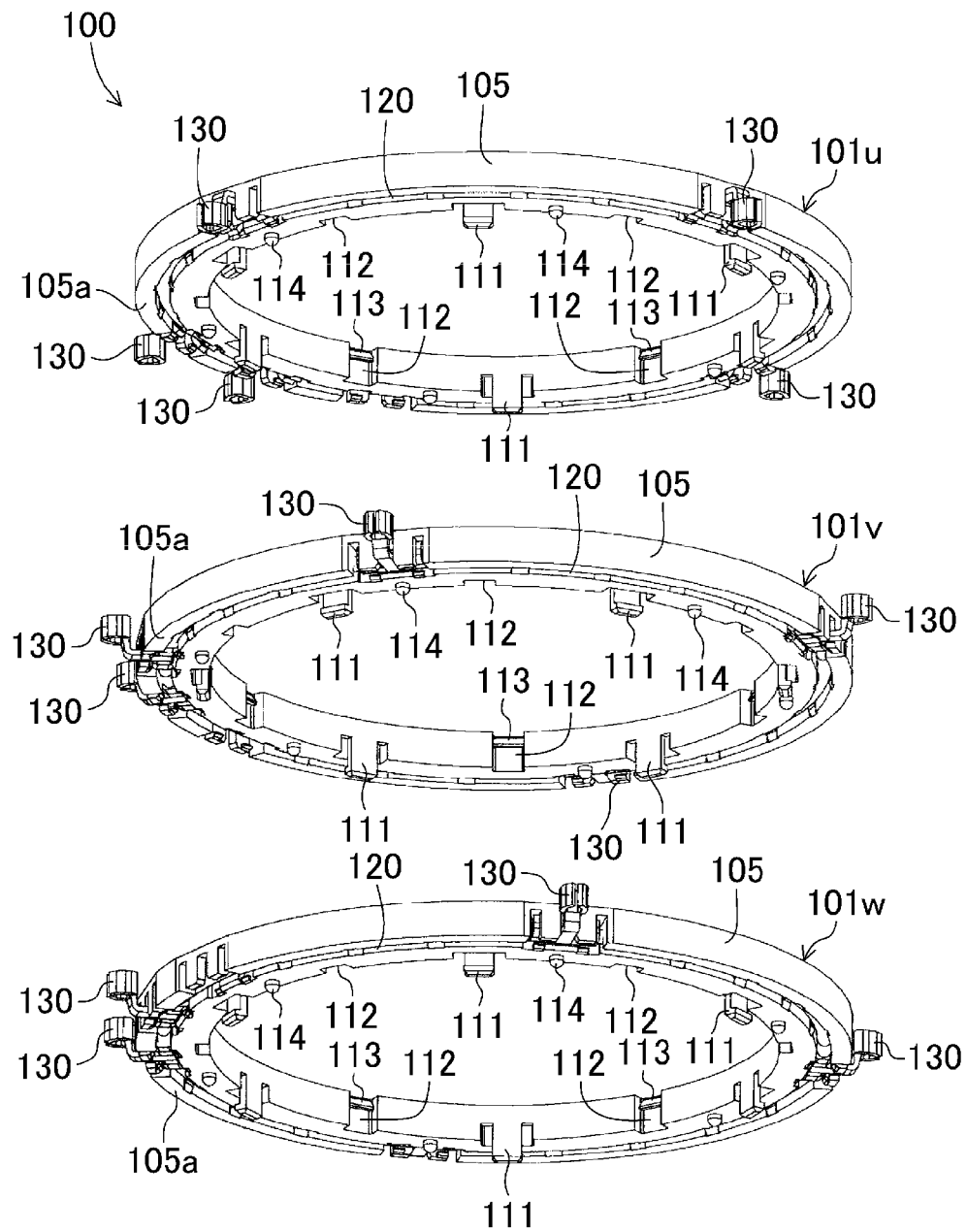
FIG. 6 is an exploded perspective view of the busbar unit according to a preferred embodiment of the present invention, in which holders are separated from one another.

Referring to FIGS. 2, 4, 5, and 6, the busbar unit 100 preferably is defined by the holders 101*u*, 101*v*, and 101*w* placed one upon another in an axial direction of the stator 200, each of the holders 101*u*, 101*v*, and 101*w* having the corresponding busbar 120 installed and held therein. In the present preferred embodiment, the u-phase holder 101*u* is preferably placed at the top, the v-phase holder 101*v* is preferably placed in the middle, and the w-phase holder 101*w* is preferably placed at the bottom in the axial direction. Note, however, that the order in which the holders are arranged in the axial direction is not limited thereto. Referring to FIGS. 5 and 6, the annular surface 105*a* of each of the holders 101*u*, 101*v*, and 101*w* is arranged to face downward in the axial direction. That is, in the present preferred embodiment, opening surfaces of the accommodating grooves 106 of the holders 101*u*, 101*v*, and 101*w* are arranged not to face each other.

Referring to FIGS. 4 and 5, the holders 101*u*, 101*v*, and 101*w* placed one upon another are secured to one another as a result of the hooks 111 and the aforementioned projections 113 of the vertical grooves 112 being engaged with each other. More specifically, the hooks 111 of the holders 101*u* and 101*v* are brought into engagement with the projections 113 of the holders 101*v* and 101*w*, respectively, to secure the three holders 101*u*, 101*v*, and 101*w* placed one upon another to one another.

Figure 14:
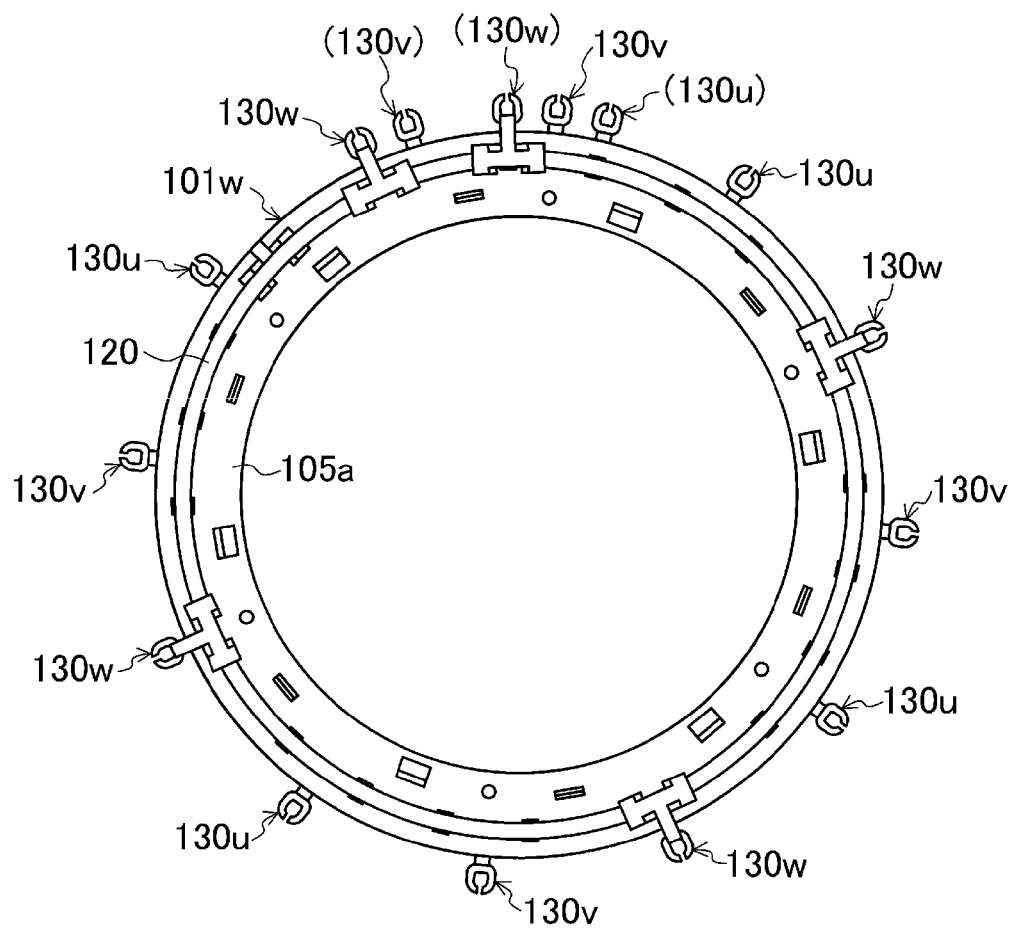
FIG. 14 is a plan view of the busbar unit according to a preferred embodiment of the present invention as viewed from below.

Referring to FIG. 14, the holders 101*u*, 101*v*, and 101*w* are preferably circumferentially displaced from one another such that no two terminal members 130 (130*u*, 130*v*, and 130*w*) are arranged to overlap with each other when viewed from above in the axial direction. Note that, in FIG. 14, reference symbols "130*u*", "130*v*", and "130*w*" denote the terminal members installed on the u-phase holder 101*u*, the v-phase holder 101*v*, and the w-phase holder 101w, respectively. Also note that reference symbols within parentheses denote terminal members which are not connected with any of the coil wire terminals 204a from the stator 200. Specifically, the motor 1 according to the present preferred embodiment preferably has a 12-slot structure. Accordingly, in the present preferred embodiment, the holders 101u, 101v, and 101w are placed one upon another such that twelve of the terminal members 130 (130u, 130v, and 130w), excluding the three terminal members 130 which are not connected with any of the coil wire terminals 204a, are preferably arranged at regular or substantially regular intervals of about 30 degrees in the circumferential direction. Note that the aforementioned number of slots of the motor 1 is merely an example, and is not essential to the present invention. Although not shown, each of the three terminal members 130 which are not connected with any of the coil wire terminals 204a from the stator 200 is connected with an electrically conductive wire leading from an external power supply through a control apparatus such as an electronic control unit (ECU), for example. A power-supply current is thereby supplied from the external power supply to each busbar 120 and the coils 204 of the stator 200. The ECU is arranged to control the rotational power of the motor 1.

Figure 15A:
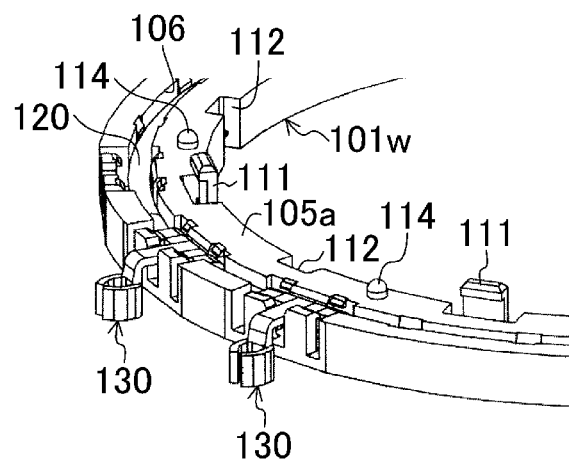
FIG. 15A is a perspective view of the holder having the busbar according to a preferred embodiment of the present invention arranged therein as viewed from below.
Figure 15B:
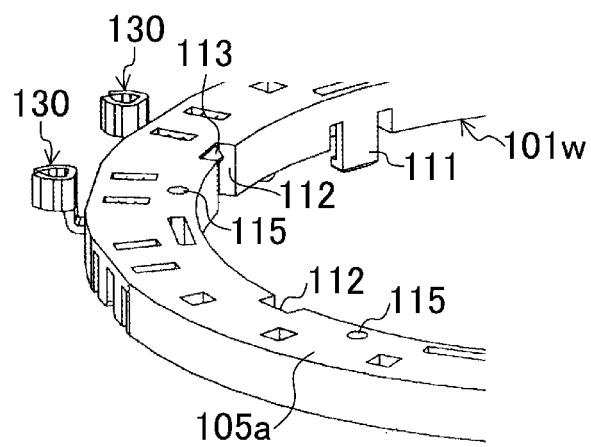
FIG. 15B is a perspective view of the holder including the busbar according to a preferred embodiment of the present invention arranged therein as viewed from above.

Referring to FIGS. 6 and 15A, the annular surface 105a of each of the holders 101u, 101v, and 101w preferably includes a plurality of raised portions 114 arranged at regular or substantially regular intervals in the circumferential direction. Referring to FIG. 15B, an annular surface of each of the holders 101u, 101v, and 101w opposite to the annular surface 105a preferably includes a plurality of recessed portions 115, which correspond to the raised portions 114, arranged at regular or substantially regular intervals in the circumferential direction. The raised portions 114 and the recessed portions 115 are used to properly position the holders 101u, 101v, and 101w when the holders 101u, 101v, and 101w are placed one upon another. That is, the raised portions 114 of the holders 101u and 101v are fitted into the recessed portions 115 of the holders 101v and 101w, respectively, to properly determine the circumferential orientation of each of the holders 101u, 101v, and 101w. Moreover, the fitting of the raised portions 114 into the corresponding recessed portions 115 contributes to restraining a circumferential movement of each of the holders 101u, 101v, and 101w.

Referring to FIGS. 4 and 6, the terminal members 130 installed on the u-phase holder 101u, which is placed at the top, are preferably arranged such that the joining portion 134 of each of the terminal members 130 is arranged to bend downward in the axial direction outside the u-phase holder 101u. On the other hand, the terminal members 130 installed on the v-phase holder 101v and the w-phase holder 101w, which are placed in the middle and at the bottom, respectively, are arranged such that the joining portion 134 of each of the terminal members 130 is arranged to bend upward in the axial direction outside the v-phase holder 101v and the w-phase holder 101w, respectively. That is, in the busbar unit 100 according to the present preferred embodiment, the joining portion 134 of each of the terminal members 130 installed on the u-phase holder 101u, which is placed at the top, and the joining portion 134 of each of the terminal members 130 installed on the w-phase holder 101w, which is placed at the bottom, are arranged to bend so as to head for each other. Therefore, preferably none of the terminal members 130 installed on the u-phase holder 101u, which is placed at the top, protrudes above an upper end surface of the u-phase holder 101u. Moreover, none of the terminal members 130 installed on the w-phase holder 101w, which is placed at the bottom, protrudes below a lower end surface of the w-phase holder 101w. This contributes to reducing the height of the busbar unit 100.

Figure 16:
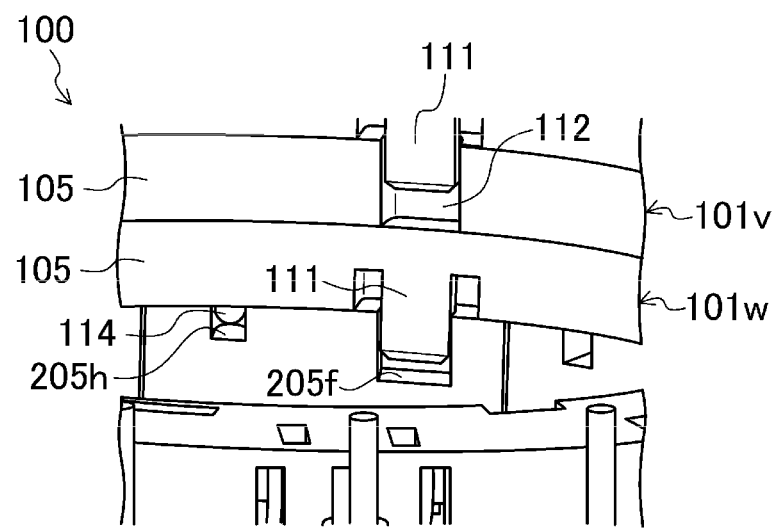
FIG. 16 is a perspective view illustrating a fixing portion at which the busbar unit is fixed to the stator according to a preferred embodiment of the present invention.
Figure 17:
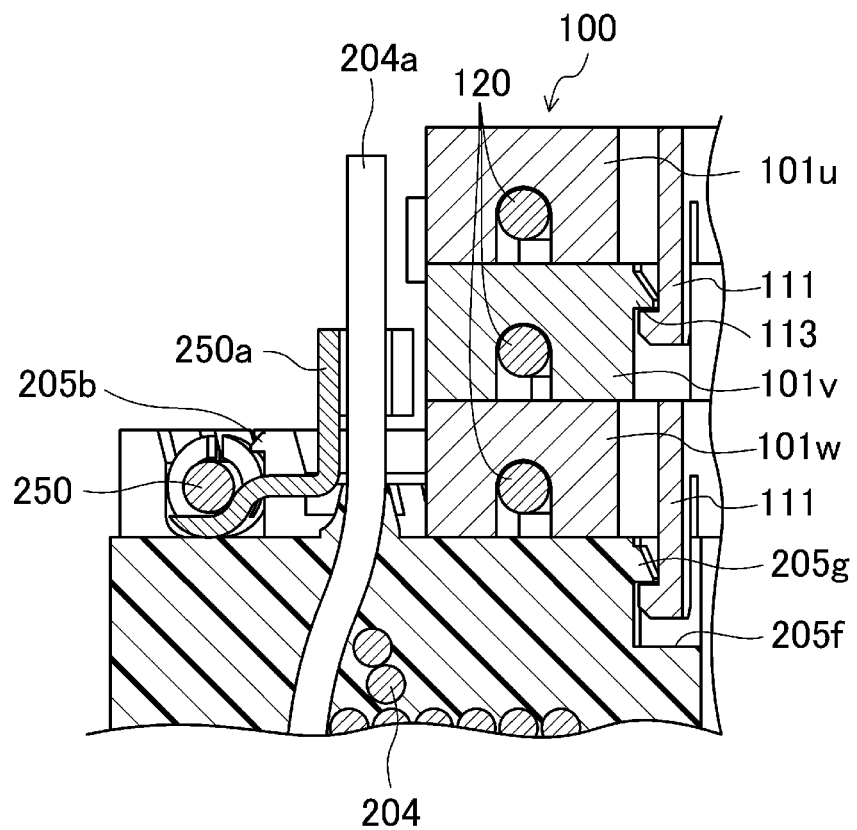
FIG. 17 is a cross-sectional view illustrating a situation in which the busbar unit is secured to the stator according to a preferred embodiment of the present invention.
Figure 18:
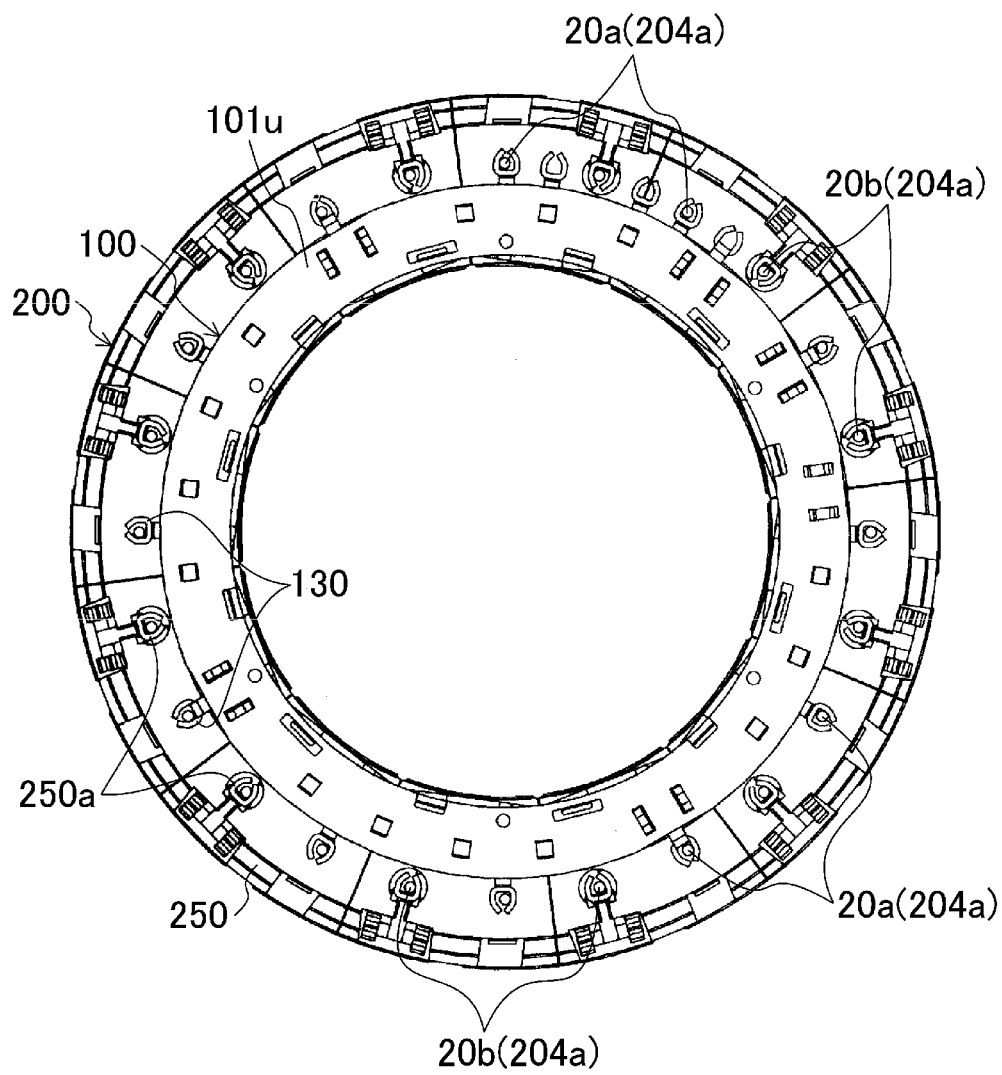
FIG. 18 is a plan view illustrating a situation in which the busbar unit is secured to the stator according to a preferred embodiment of the present invention.

Referring to FIGS. 16 and 17, the hooks 111 of the w-phase holder 101w, which is placed at the bottom of the busbar unit 100, are preferably brought into engagement with projections 205g which are similar to the aforementioned projections 113 and defined in the stator 200, so that the busbar unit 100 is secured to an axial end portion of the stator 200. Moreover, the raised portions 114 of the w-phase holder 101w, which is placed at the bottom of the busbar unit 100, are preferably fitted into recessed portions 205h defined in the axial end portion of the stator 200, so that the busbar unit 100 is properly positioned. Furthermore, the fitting of the raised portions 114 into the recessed portions 205h contributes to restraining a circumferential movement of the busbar unit 100.

As also illustrated in FIGS. 3, 5, 17, and 18, the busbar unit 100 is attached to the axial end portion of the stator 200 such that the busbar unit 100 and the stator 200 are preferably coaxial or substantially coaxial with each other. With the busbar unit 100 and the stator 200 being in this situation, the busbars 120 are arranged above the stator 200. Meanwhile, in the stator 200, the coil wire terminals 204a, preferably numbering twenty-four, are arranged to axially project from the axial end portion of the stator 200. The coil wire terminals 204a are preferably arranged at regular or substantially regular intervals of about 15 degrees in the circumferential direction, centering about the axis of the stator 200. In other words, the coil wire terminals 204a are arranged in circles having the same radius and whose center is the axis of the stator 200.

The coil wire terminals 204a described above are divided into phase terminals 20a, which are provided for the respective phases and connected to the terminal members 130 installed in the busbar unit 100, and neutral point terminals 20b. The phase terminals 20a and the neutral point terminals 20b are arranged alternately with each other. The neutral point terminals 20b are preferably connected with a neutral point busbar 250 through neutral point terminal members 250a, which will be described below. The neutral point busbar 250 is held by a holding portion which has been molded in the axial end portion of the stator 200 and which is arranged radially outward of an outer circumference of the busbar unit 100. That is, the neutral point busbar 250 is secured to the axial end portion of the stator 200. There is therefore no need to provide the busbar unit 100 with a holder for a neutral point, which makes it possible to reduce the height of the busbar unit 100 or the height of the motor 1 as a whole. Also, insulation between each busbar 120 and the neutral point busbar 250 is ensured more effectively.

In the present preferred embodiment, the axial direction of each coil connection portion 135 coincides with the axial direction of the stator 200. That is, the axial direction of each coil connection portion 135 coincides with a direction in which each coil wire terminal 204a is arranged to project. As described above, in the present preferred embodiment, each terminal member 130 is provided with the busbar connection portion 131, which is connected with the annular busbar 120 extending in the circumferential direction, and the coil connection portion 135, which is connected with the coil wire terminal 204a extending in the axial direction of the stator 200. It is therefore possible to insert the coil wire terminals 204a into the corresponding coil connection portions 135 by simply moving the busbar unit 100 in the axial direction toward the axial end portion of the stator 200. Therefore, the fitting of the terminal members 130 of the busbar unit 100 and hence the fitting of the busbar unit 100 to the stator 200 can be easily accomplished preferably without the need for an operation of adjusting the orientation of any coil wire terminal 204a. This leads to shortening a procedure of fitting the busbar unit 100 to the stator 200, leading in turn to improved productivity in manufacturing the motors 1.

In the present preferred embodiment, the busbars 120 and the terminal members 130 are preferably independent of each other, and each busbar 120 is preferably defined by a wire, for example. An improvement in the yield of the material is therefore achieved as compared to the case where band-shaped conductors with integral terminals are used as in related art. This leads to a reduction in the costs of the materials for the busbar unit 100 and the motor 1, leading in turn to a reduction in the production cost.

Furthermore, in the present preferred embodiment, the terminal member 130 is arranged to have a shape that achieves a high yield of the material as described above. This contributes to further reducing the costs of the materials and the production cost.

Furthermore, the busbar 120 according to the present preferred embodiment is preferably defined by a bare electric wire without an insulating coating. The lack of an insulating coating leads to an increased number of choices of how to join the terminal members 130 to the busbar 120. For example, crimping, welding, and the like are included in the choices.

Furthermore, the busbar unit 100 according to the present preferred embodiment is preferably provided with the plurality of holders 101u, 101v, and 101w, each of which is arranged in an annular shape. In addition, each of the plurality of holders 101u, 101v, and 101w includes the annular accommodating groove 106 arranged to contain and hold a separate one of the busbars 120 individually. This leads to ensuring insulation between the busbars 120.

Furthermore, in the present preferred embodiment, each of the holders 101u, 101v, and 101w preferably has the same configuration. This leads to an additional improvement in productivity.

Furthermore, in the present preferred embodiment, the annular surfaces 105a of the holders 101u, 101v, and 101w (hence, the opening surfaces of the accommodating grooves 106 of the holders 101u, 101v, and 101w) are preferably arranged not to face each other. This leads to further ensuring the insulation between the busbars 120.

Furthermore, in the present preferred embodiment, the terminal members 130 installed in the busbar unit 100 are preferably arranged at regular or substantially regular intervals in the circumferential direction. This contributes to eliminating the need for the operation of adjusting the orientation of any coil wire terminal 204a.

Figure 19:
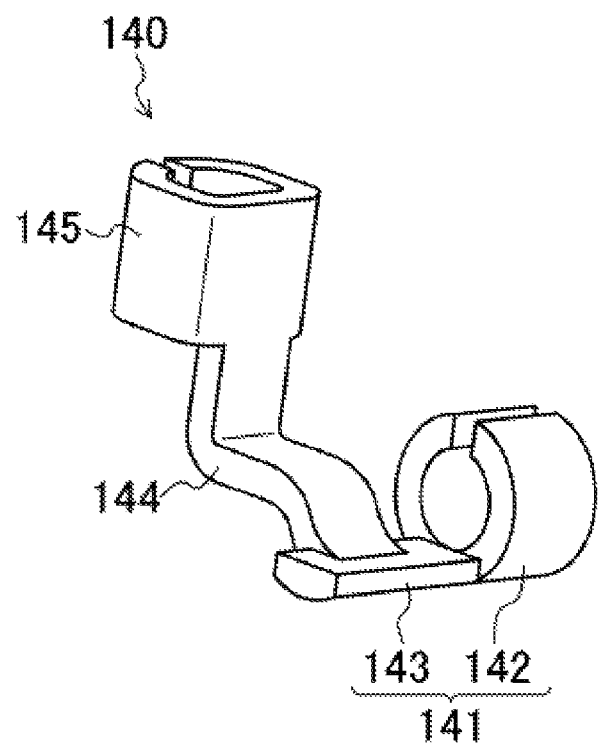
FIG. 19 is a perspective view of an example terminal member according to a preferred embodiment of the present invention.
Figure 20:
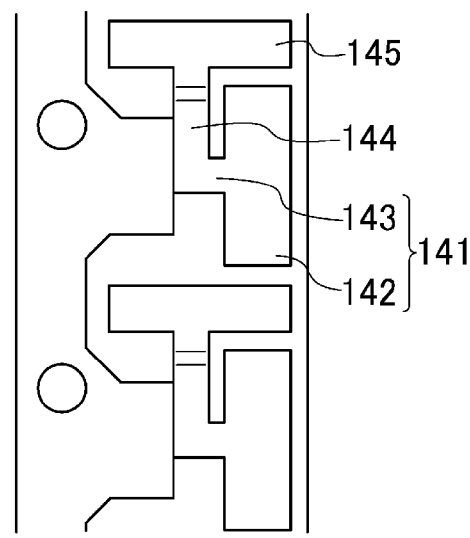
FIG. 20 illustrates a development of the example terminal member according to a preferred embodiment of the present invention.

Note that the terminal member 130 according to the present preferred embodiment may be replaced with a terminal member 140 as illustrated in FIG. 19. The terminal member 140 is preferably made out of a single piece of plate material, for example. The terminal member 140 includes a busbar connection portion 141, which is connected with the busbar 120; a coil connection portion 145, which is connected with the coil wire terminal 204a; and a joining portion 144, which is arranged to extend to be continuous with the busbar connection portion 141 and the coil connection portion 145. The busbar connection portion 141 is preferably defined by one C-shaped tubular portion 142 and a plate portion 143 arranged to be continuous with an end surface of the C-shaped tubular portion 142. The structure of the terminal member 140 is otherwise similar to that of the terminal member 130 illustrated in FIG. 9. The action and beneficial effects of the terminal member 140 are also similar to those of the terminal member 130 illustrated in FIG. 9. In other words, the terminal member 140 is substantially identical to the terminal member 130 illustrated in FIG. 9 except that the terminal member 140 includes only one C-shaped tubular portion 142. FIG. 20 shows a development of the terminal member 140 in accordance with a preferred embodiment of the present invention. The plate material is cut in accordance with this development. The resulting plate material is subjected to a bending process to define the terminal member 140. As is the case with the terminal member 130, the terminal member 140 has such a shape as to preferably achieve a high yield of the material.

In the present preferred embodiment, each of the holders 101u, 101v, and 101w is preferably arranged to have the same configuration. Note, however, that each of the holders 101u, 101v, and 101w may be arranged to have a different configuration, as long as the holders 101u, 101v, and 101w are able to hold the corresponding busbars 120 while ensuring the insulation between the busbars 120.

In the present preferred embodiment, the three holders 101u, 101v, and 101w are arranged to hold the busbars 120 individually. Note, however, that only one holder which is arranged to hold all the busbars 120 may be provided.

In the present preferred embodiment, each of the holders 101u, 101v, and 101w is preferably made of an insulating material. Note, however, that, in the case where each of the busbars 120 is defined by an electrically conductive wire having an insulating coating arranged on the outer circumference thereof, each of the holders 101u, 101v, and 101w may not necessarily be made of an insulating material.

In the present preferred embodiment, each of the holders 101u, 101v, and 101w is preferably defined by an annular member arranged to contain and hold the corresponding busbar 120 in its entirety. Note, however, that, in the case where each of the busbars 120 is defined by an electrically conductive wire having an insulating coating arranged on the outer circumference thereof, each of the holders 101u, 101v, and 101w may be replaced with a member or members arranged to hold the busbar 120 only partially in the circumferential direction.

Also note that a minimum requirement of the terminal member 130 is that the terminal member 130 is preferably defined by a single member including the busbar connection portion 131 which is to be connected with the annular busbar 120 extending in the circumferential direction, and the coil connection portion 135 which is to be connected with the coil wire terminal 204a extending in the axial direction of the stator 200. That is, the shape of the terminal member is not limited to the shapes mentioned above.

An example modification of the busbar unit 100 according to the present preferred embodiment will now be described below with reference to FIGS. 49, 50, 51, 52, and 53. The busbar unit 100 according to the present example modification is different from the busbar unit 100 according to the above-described preferred embodiment in the structures of the busbars 120 and the holders 101u, 101v, and 101w.

Each busbar 120 according to the present example modification is preferably defined by a single electrically conductive wire bent into an appropriate shape. Specifically, each busbar 120 preferably includes a body portion 1201 and external connection portions 1202. The body portion 1201 is defined by a portion of the electrically conductive wire shaped in a ring. Each external connection portion 1202 is arranged to extend radially inward from the body portion 1201 and thereafter bend and extend in the axial direction. The external connection portions 1202 and the body portion 1201 are preferably defined by a single continuous member, for example. That is, a single electrically conductive wire is bent into an annular shape, and thereafter both end portions of the single electrically conductive wire are bent radially inward and then in the axial direction to define the busbar 120. The busbar 120 (i.e., the body portion 1201 and the external connection portions 1202) according to the present example modification is also preferably defined by a bare electric wire (e.g., a bare copper wire) without an insulating coating, as is the case with the busbar 120 according to the above-described preferred embodiment. Four terminal members 130 are preferably connected to the body portion 1201 of the busbar 120. That is, the number of terminal members 130 connected to the body portion 1201 of the busbar 120 is preferably one less than the number of terminal members 130 connected to the busbar 120 according to the above-described preferred embodiment. The four terminal members 130 are arranged at regular or substantially regular intervals of about 90 degrees in the circumferential direction. The external connection portions 1202 are electrically connected to the external power supply, so that the power-supply current is supplied from the external power supply to the body portion 1201. As described above, the busbar 120 according to the present example modification is preferably defined by, not only an electrically conductive wire (i.e., the body portion 1201) which is arranged to establish connection with the coil wire terminals 204a from the stator 200, but also electrically conductive wires (i.e., the external connection portions 1202) which are arranged to establish electrical connection with the external power supply, which are defined in one united body.

The holders 101u, 101v, and 101w according to the present example modification are similar to the holders 101u, 101v, and 101w, respectively, according to the above-described preferred embodiment except that each of the holders 101u, 101v, and 101w according to the present example modification additionally preferably includes a lead groove 116 and vertical lead grooves 117. The lead groove 116 of each of the holders 101u, 101v, and 101w is arranged to extend radially inward from the annular accommodating groove 106 and then extend in the axial direction. In other words, the lead groove 116 includes a radially extending groove defined in the annular surface 105a of the holder 101u, 101v, or 101w to extend radially inward from the accommodating groove 106, and a vertically extending groove which is continuous with the radially extending groove and defined in an inner circumferential surface of the holder 101u, 101v, or 101w to extend in the axial direction throughout the holder 101u, 101v, or 101w. Note that, in the present example modification, each of the holders 101u, 101v, and 101w preferably includes only one lead groove 116 defined therein. With respect to each of the holders 101u, 101v, and 101w, the body portion 1201 of the busbar 120 is placed and held in the accommodating groove 106, while the external connection portions 1202 of the busbar 120 are placed and held in the lead groove 116. That is, the external connection portions 1202 are drawn radially inward from the accommodating groove 106 through the lead groove 116, and thereafter drawn in the axial direction. Meanwhile, each vertical lead groove 117 is preferably arranged in the inner circumferential surface of the holder 101u, 101v, or 101w to extend in the axial direction throughout the holder 101u, 101v, or 101w. In addition, each vertical lead groove 117 of each of the holders 101u, 101v, and 101w is arranged at a position corresponding to a position of the lead groove 116 in a different one of the holders 101u, 101v, and 101w. When the three holders 101u, 101v, and 101w are placed one upon another, the vertical lead grooves 117 are arranged to accommodate and hold the external connection portions 1202 drawn from the lead grooves 116 in the axial direction. The external connection portions 1202 are drawn smoothly in the axial direction through the vertical lead grooves 117. Note that, in the present example modification, the number of vertical lead grooves 117 included in each of the holders 101u, 101v, and 101w is two.

In the present example modification, the three holders 101u, 101v, and 101w are preferably placed one upon another such that the lead grooves 116 of the respective holders 101u, 101v, and 101w are circumferentially displaced from one another so as not to overlap with one another when viewed in the axial direction. Moreover, the three holders 101u, 101v, and 101w are placed one upon another such that the two vertical lead grooves 117 of each of the holders 101u, 101v, and 101w are preferably aligned with the lead grooves 116 of the other ones of the holders 101u, 101v, and 101w. This makes it possible to draw the external connection portions 1202 of each busbar 120 in the axial direction without the need to cross any external connection portions 1202. Furthermore, in the present example modification, the holders 101u, 101v, and 101w are placed one upon another so that the external connection portions 1202 of each busbar 120 can be drawn upward in the axial direction. As described above, the busbar unit 100 according to the present example modification is constructed such that the body portion 1201 of each busbar 120 is held in the accommodating groove 106 of a corresponding one of the holders 101u, 101v, and 101w, and that the external connection portions 1202 of each busbar 120 are drawn from the accommodating groove 106 in the radial direction and then drawn in the axial direction.

According to the example modification described above, the electrically conductive wires (i.e., the external connection portions 1202) preferably arranged to establish electrical connection with the external power supply are integrally included in each busbar 120. This eliminates the need for each busbar 120 to be provided with a terminal member to which an electrically conductive wire leading from the external power supply is connected, as is necessary with each busbar 120 according to the above-described preferred embodiment. As a result, the terminal members 130 arranged outside the outer circumference of the busbar unit 100 are more widely spaced from one another in the circumferential direction. Moreover, because the aforementioned terminal member is unnecessary, it eliminates the need for a crimping operation for the terminal member. This leads to improved workability in crimping the terminal members 130 onto the coil wire terminals 204a from the stator 200. This in turn leads to an additional reduction in the production cost of the motor 1.

Furthermore, the external connection portions 1202 of each busbar 120 are drawn in the radial direction before being drawn in the axial direction. This makes it possible to draw the external connection portions 1202 in the axial direction while preventing the external connection portions 1202 from coming into contact with the body portion 1201 of any of the busbars 120 arranged in the axial direction.

Furthermore, with respect to each of the holders 101u, 101v, and 101w, the external connection portions 1202 of the busbar 120 are drawn inward in the radial direction. This avoids a situation in which the external connection portions 1202 are arranged outside the outer circumference of the busbar unit 100. This eliminates the need to provide a space for the arrangement of the external connection portions 1202 outside the outer circumference of the busbar unit 100. This leads to an additional improvement in workability in crimping the terminal members 130 onto the coil wire terminals 204a.

Furthermore, in the present example modification, the external connection portions 1202 are not simply drawn in the axial direction after being drawn inward in the radial direction, but drawn in the axial direction while being placed and held in grooves (i.e., the vertically extending grooves in the lead grooves 116, and the vertical lead grooves 117) defined in the inner circumferential surfaces of the holders 101u, 101v, and 101w. This contributes to reducing space for the arrangement of the external connection portions 1202.

Note that, in the present example modification, the external connection portions 1202 of the busbars 120 may be drawn radially inward beyond the inner circumferential surfaces of the holders 101u, 101v, and 101w and then drawn in the axial direction.

Figure 54:
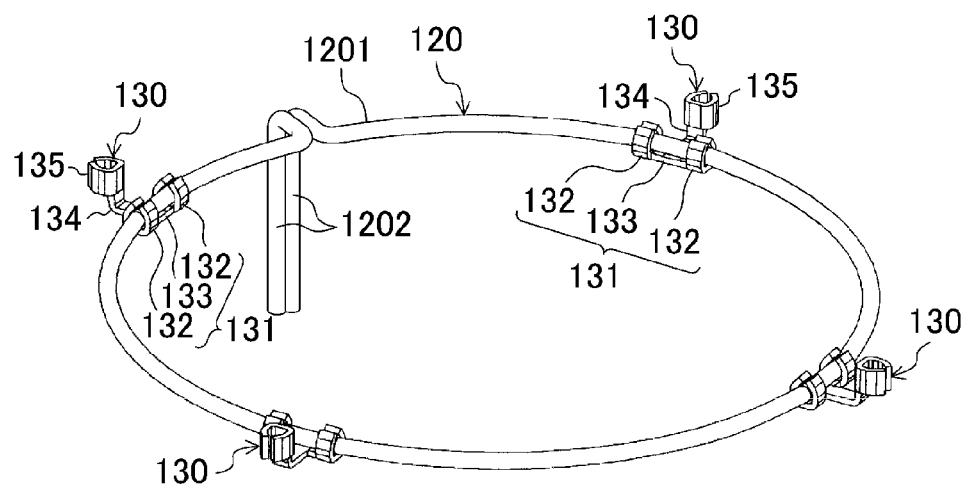
FIG. 54 is a perspective view illustrating an example modification of the busbar according to a preferred embodiment of the present invention.
Figure 55:
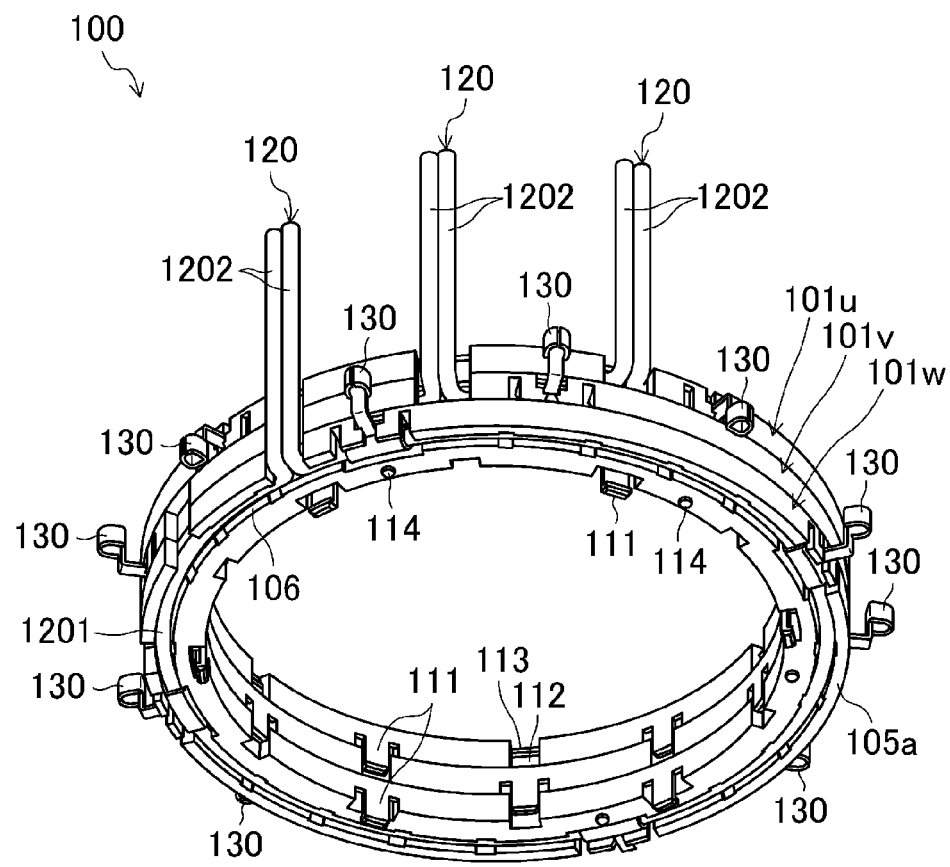
FIG. 55 is a perspective view of an example modification of the busbar unit according to a preferred embodiment of the present invention as viewed from below.
Figure 56:
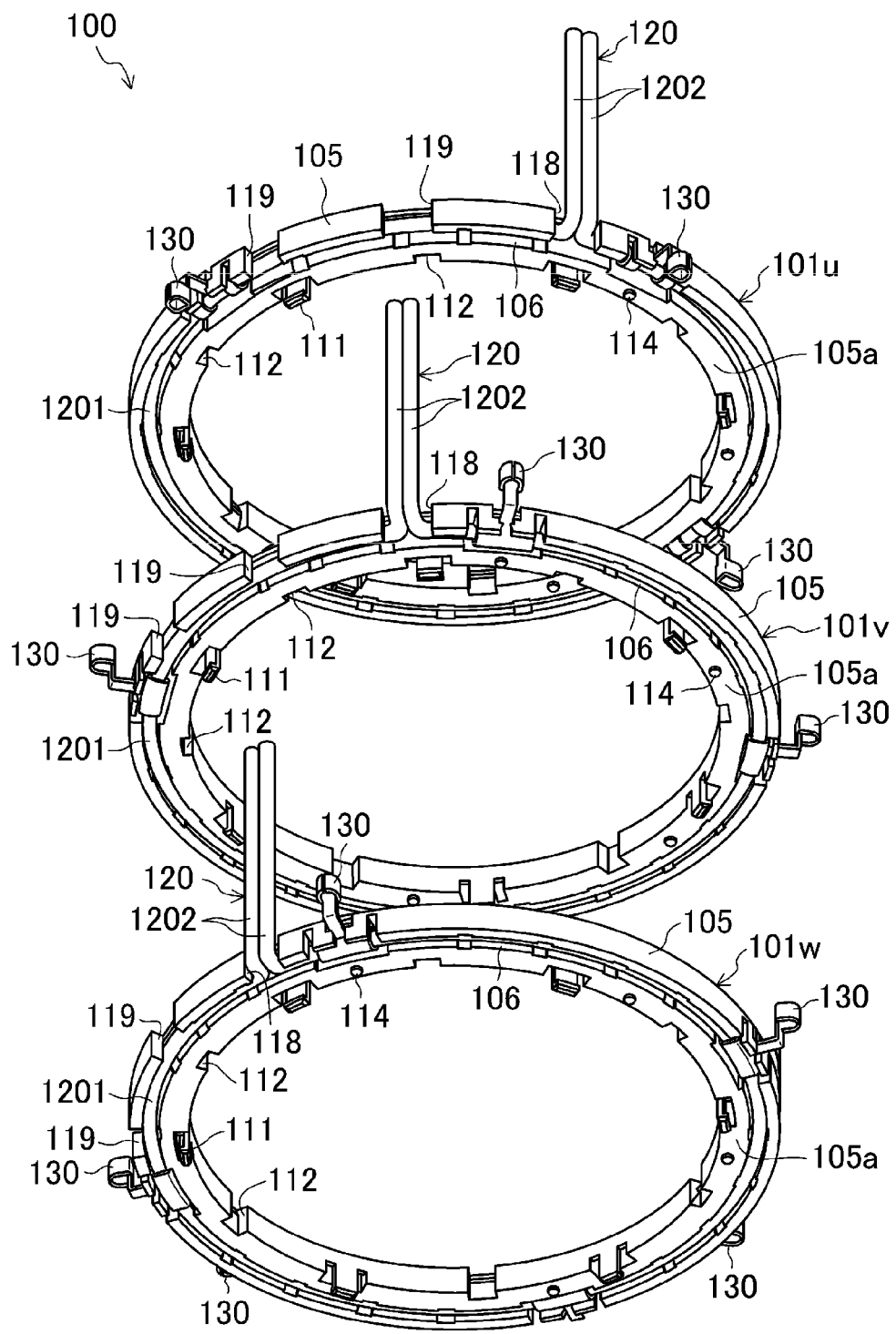
FIG. 56 is an exploded perspective view of the busbar unit according to a preferred embodiment of the present invention illustrated in FIG. 55, in which holders are separated from one another.

Also, referring to FIGS. 54, 55, and 56, the external connection portions 1202 may be drawn from the accommodating groove 106 not inward but outward in the radial direction before being drawn in the axial direction. In this case, as illustrated in FIGS. 55 and 56, vertically extending grooves of lead grooves 118 and vertical lead grooves 119 are defined in outer circumferential surfaces of the holders 101u, 101v, and 101w. The external connection portions 1202 may be drawn in the axial direction (i.e., upward in the axial direction) while being placed and held in these grooves. This preferably avoids a situation in which the external connection portions 1202 are arranged outside the outer circumference of the busbar unit 100. Therefore, the workability in crimping the terminal members 130 onto the coil wire terminals 204a is scarcely impaired.

Also, the external connection portions 1202 may be drawn from the accommodating groove 106 outward in the radial direction and then arranged to extend in the radial direction without being drawn in the axial direction, for example. In other words, the direction in which the external connection portions 1202 are drawn may preferably be modified in any manner depending on the direction in which the motor 1 is arranged or the position of the external power supply.

Also, in the present example modification, both end portions of the single electrically conductive wire are drawn from the accommodating groove 106 as the external connection portions 1202. Note, however, that this is not essential to the present invention, and that only one end portion thereof may be drawn from the accommodating groove 106 as the external connection portion 1202. That is, only one end portion of the single electrically conductive wire may be drawn from the accommodating groove 106 as the external connection portion 1202, with a remaining portion of the single electrically conductive wire shaped in a ring to define the annular body portion 1201. This preferably leads to a reduction in the material cost of the busbars 120.

Also note that the body portion 1201 of the busbar 120 may be arranged or substantially arranged in the shape of the letter "C", instead of in the annular shape. It is enough, for example, that four terminal members 130 are connected to the body portion 1201 such that the terminal members 130 are arranged at regular or substantially regular intervals of about 90 degrees. Therefore, it is enough that the body portion 1201 preferably be arranged in the shape of an arc of at least 270 degrees.

Figure 21:
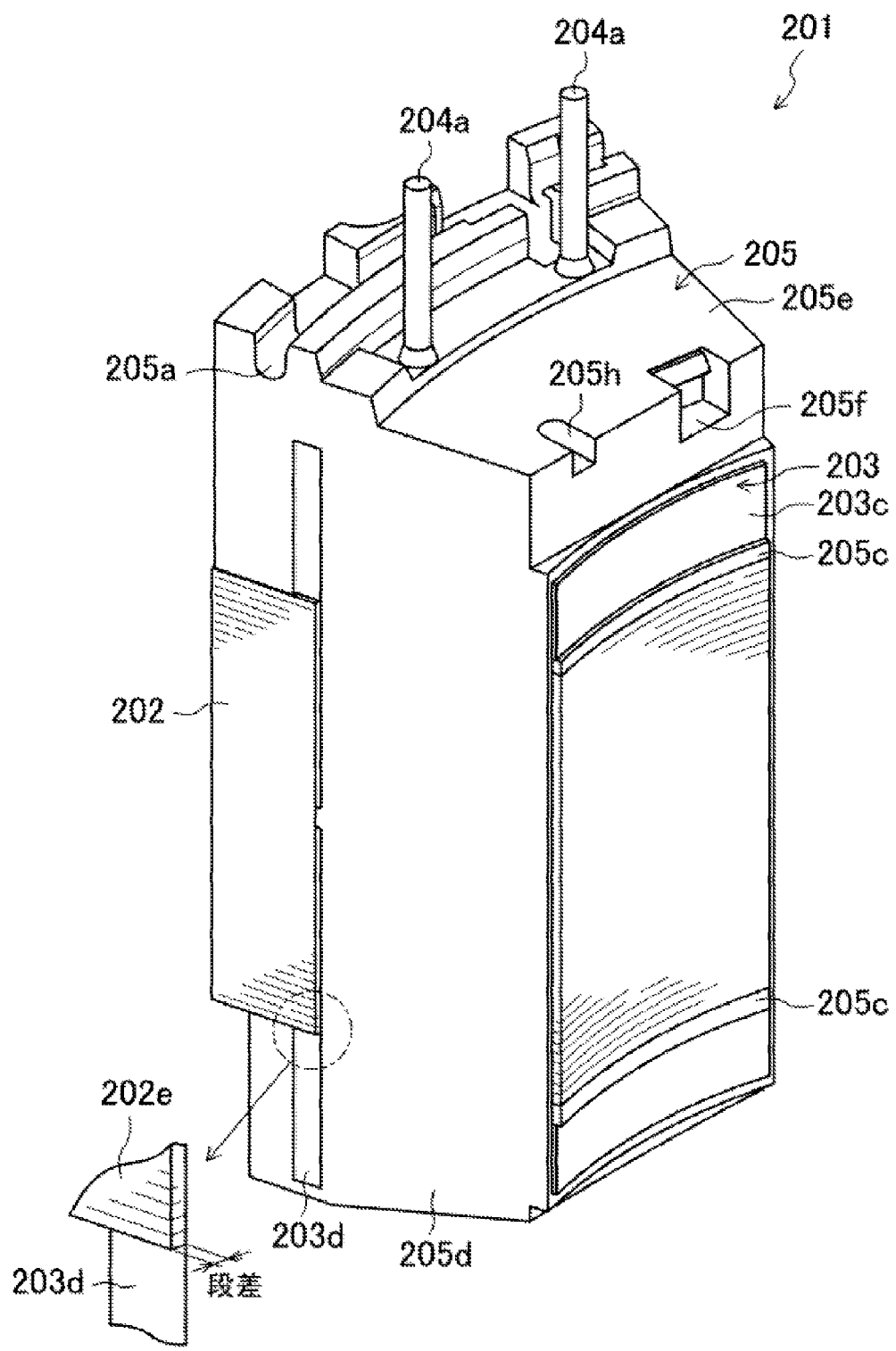
FIG. 21 is a perspective view of a stator segment according to a preferred embodiment of the present invention.
Figure 22:
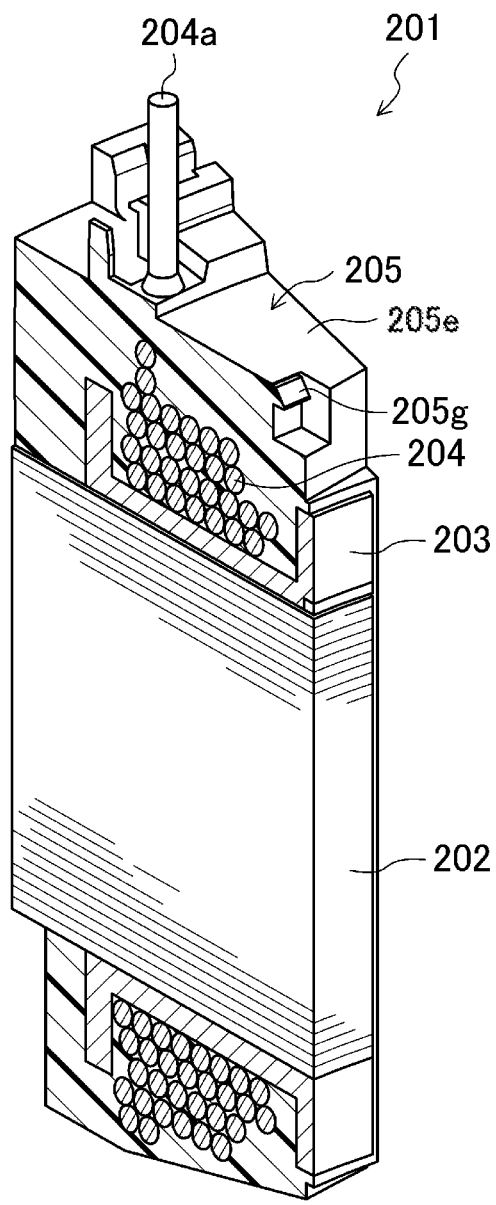
FIG. 22 is a vertical cross-sectional view of the stator segment according to a preferred embodiment of the present invention.

The stator 200 according to the present preferred embodiment is preferably defined by a plurality of stator segments 201. As illustrated in FIG. 2, the stator 200 is preferably in the shape of a cylinder. In the present preferred embodiment, the number (hereinafter referred to as a "segment number") of stator segments 201 which together define the stator 200 is preferably twelve, for example. A central angle of each stator segment 201 is therefore preferably about 30 degrees, for example. FIG. 21 is a perspective view of the stator segment 201. FIG. 22 is a vertical cross-sectional view of the stator segment 201. As illustrated in FIG. 22, the stator segment 201 preferably includes a core segment 202, insulators 203, the coil 204, and a resin layer 205.

It is assumed in the following description that the axial direction or a vertical direction of the stator 200 or the stator segment 201 refers to a direction of the axis of the shaft 6; that a horizontal direction refers to a direction perpendicular or substantially perpendicular to the axis of the shaft 6; that terms "radially inward", "radially inner", etc., refer to a side closer to the shaft 6; and that the terms "radially outward", "radially outer", etc., refer to a side farther away from the shaft 6.

Figure 23:
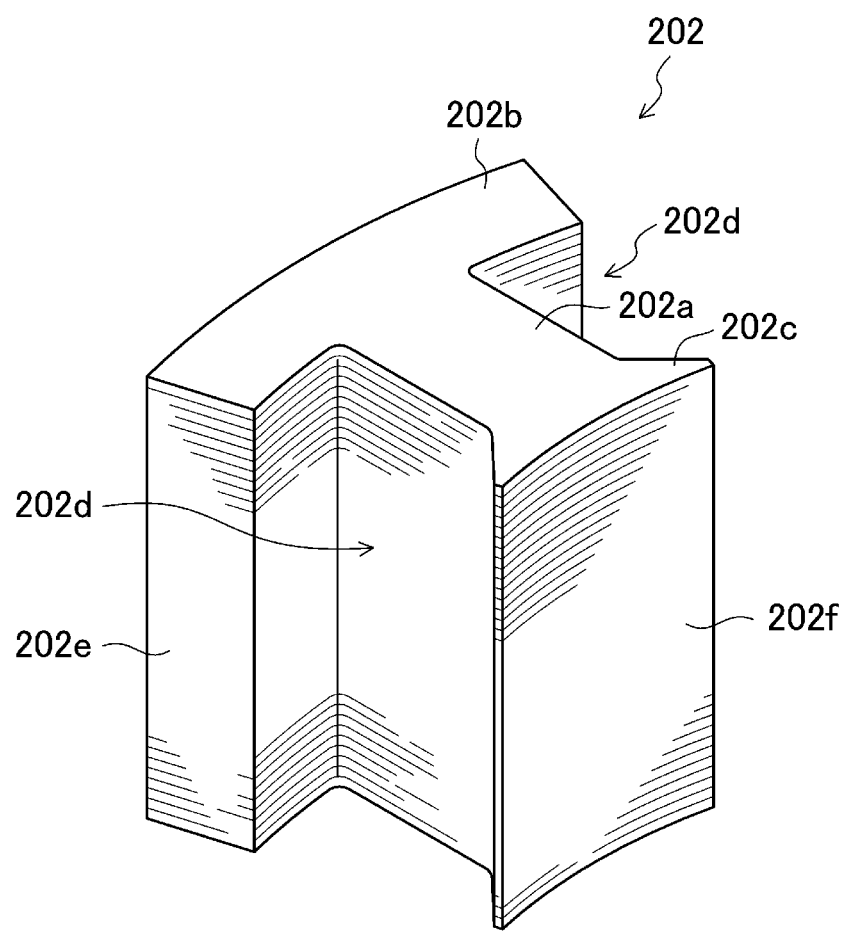
FIG. 23 is a perspective view of a core segment according to a preferred embodiment of the present invention.

FIG. 23 is a perspective view of the core segment 202 according to a preferred embodiment of the present invention. The core segment 202 is preferably defined by a plurality of electromagnetic steel sheets placed one upon another in the axial direction. However, any other desirable type of stator core segment could be used instead. As is apparent from FIG. 23, a cross section of the core segment 202 is or substantially is in the shape of the letter "T".

In more detail, the core segment 202 preferably includes a tooth portion 202a, a core back portion 202b, and an inner yoke portion 202c. The core back portion 202b is a portion which is arranged to extend in the circumferential direction of the stator 200 when the core back portion 202b defines a portion of the stator 200. An angle defined between two circumferential end walls 202e of the core back portion 202b corresponds to a central angle of the core segment 202. In the present preferred embodiment, the central angle of the core segment 202 is preferably about 30 degrees, for example. The tooth portion 202a is a portion which is arranged to extend from the core back portion 202b in a radial direction of the stator 200. The inner yoke portion 202c is arranged to be continuous with a radially inner end of the tooth portion 202a. The inner yoke portion 202c is a portion which is arranged to extend in the circumferential direction over a distance smaller than a distance over which the core back portion 202b is arranged to extend in the circumferential direction. Spaces defined between the inner yoke portion 202c and the core back portion 202b on both circumferential sides of the tooth portion 202a define slots 202d arranged to accommodate the coil 204.

The insulator 203 is preferably an insulating layer arranged to ensure insulation between the core segment 202 and the coil 204. The insulator 203 is arranged between the coil 204 and the tooth portion 202a as described below. That is, the insulator 203 is an example insulating layer according to a preferred embodiment of the present invention. The insulator 203 is therefore made of an insulating material. A thermoplastic resin is preferably used as the insulating material in the present preferred embodiment.

Figure 24:
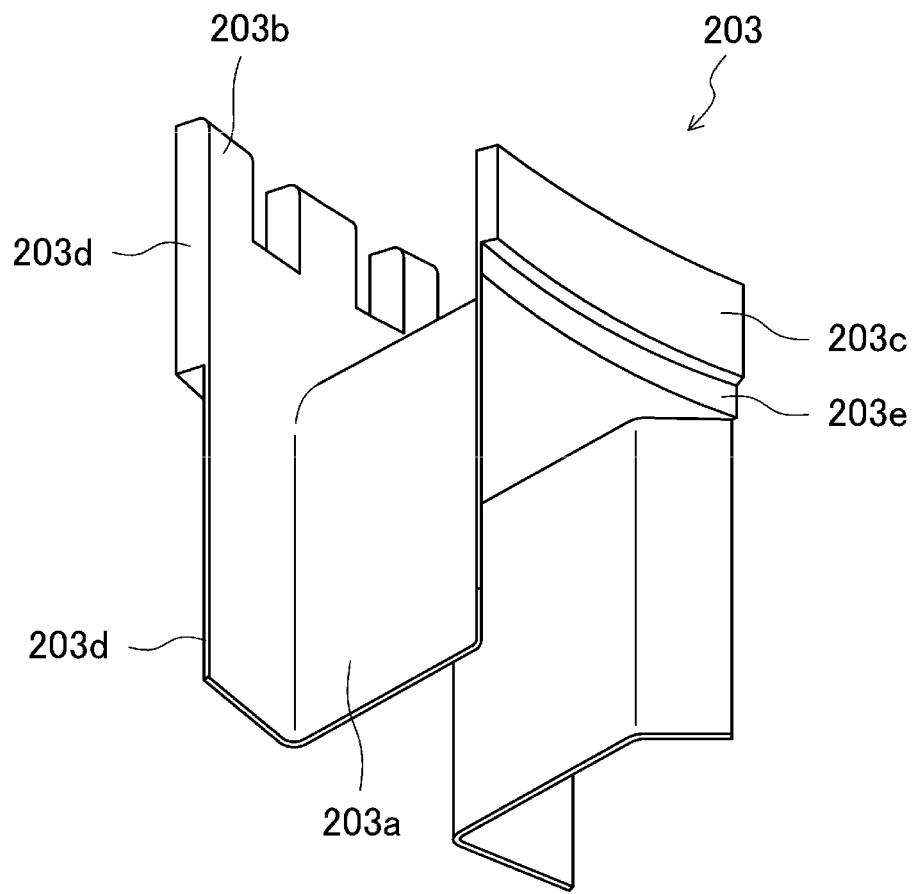
FIG. 24 is a perspective view illustrating the structure of an insulator according to a preferred embodiment of the present invention.
Figure 25:
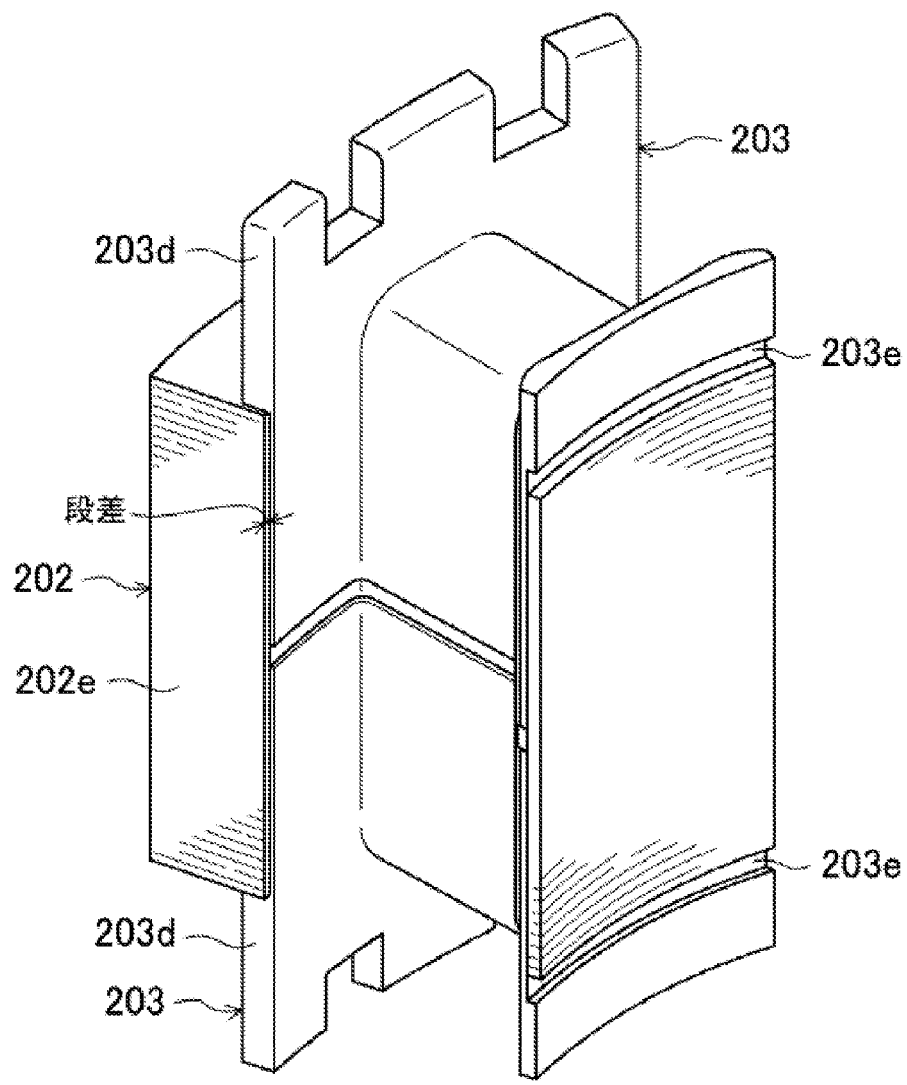
FIG. 25 is a perspective view of the core segment having insulators attached thereto according to a preferred embodiment of the present invention.

FIG. 24 is a perspective view of the insulator 203, illustrating the structure of the insulator 203. Referring to FIG. 24, the insulator 203 specifically includes a body portion 203a and end walls 203b and 203c. The body portion 203a is or substantially is in the shape of the letter "U", and is fitted to the tooth portion 202a. FIG. 25 is a perspective view illustrating the insulators 203 attached to the core segment 202. Two insulators 203 are used in each stator segment 201. The body portion 203a of one of the two insulators 203 is fitted to one axial end (i.e., an output-side end) of the core segment 202, while the body portion 203a of the other insulator 203 is fitted to the other axial end of the core segment 202. As a result, the tooth portion 202a is covered by the body portions 203a of the insulators 203.

When the insulator 203 has been fitted to the core segment 202, the end walls 203b and 203c thereof are preferably arranged to project over an axial end wall of the core segment 202. The end wall 203c is arranged radially outward of an inner side surface 202f of the core segment 202. Referring to FIG. 24, the end wall 203c includes a step portion 203e arranged at a position corresponding to an axial end of the core segment 202.

A circumferential end wall 203d of the insulator 203 is preferably arranged to be slightly recessed, in the direction of the tooth portion 202a (i.e., circumferentially inward), relative to the circumferential end wall 202e of the core segment 202. In the present preferred embodiment, there is a step preferably measuring about 0.1 mm between the circumferential end wall 203d of the insulator 203 and the circumferential end wall 202e of the core segment 202.

Figure 26:
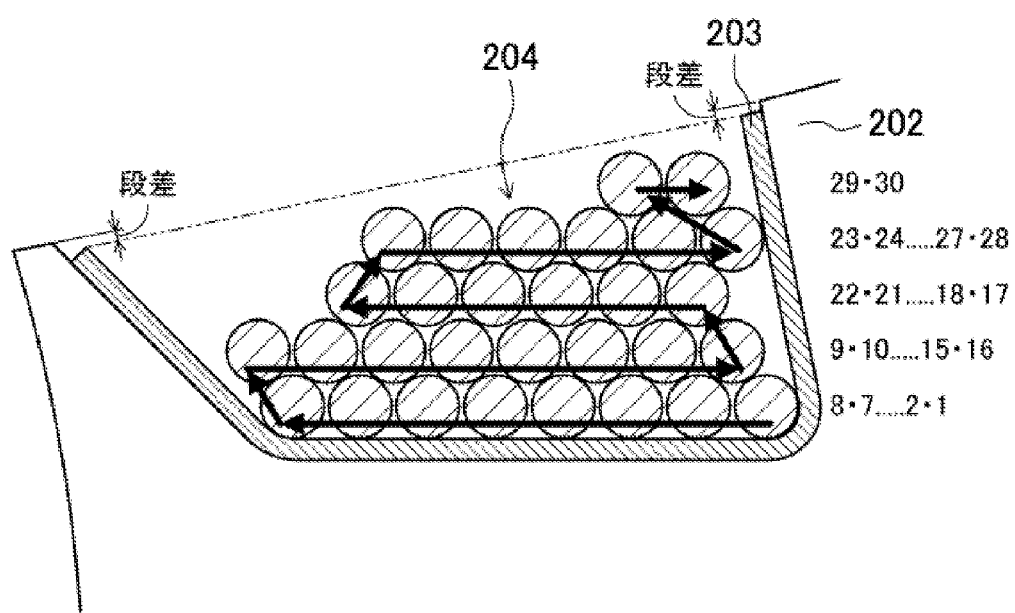
FIG. 26 is a cross-sectional view of the core segment according to a preferred embodiment of the present invention having a coil wound thereabout, illustrating a slot and its vicinity.

Each coil 204 is preferably defined by an electric wire (i.e., a copper wire), such as an enamel-coated copper wire, wound around the core segment 202 in a regular winding fashion with the insulators 203 arranged therebetween. The winding of the wire is preferably carried out such that the coil 204 does not bulge over the circumferential end walls 203d of the insulators 203. FIG. 26 is a cross-sectional view of the slot 202d and its vicinity when the coil 204 has been wound about the core segment 202. In FIG. 26, the tooth portion 202a is shown at the bottom, and the copper wire is wound around the tooth portion 202a in an order indicated by arrows shown in FIG. 26. In FIG. 26, numbers shown to the right of each layer of the coil 204 (e.g., 8·7 . . . 2·1, etc.) indicate the number of turns. For instance, a first layer of the coil 204 (i.e., a lowermost layer in FIG. 26) corresponds to first to eighth turns. The number of turns is determined in accordance with a rating of the motor 1. The adoption of the regular winding for the coil 204 contributes to preferably preventing the coil 204 from bulging over circumferential end surfaces of the core segment 202. In the present preferred embodiment, a clearance of about 0.1 mm is arranged between the circumferential end surfaces of the core segment 202 and a line joining the circumferential end walls 203d of the insulator 203 (i.e., a line represented by a chain double-dashed line in FIG. 26).

Figure 27:
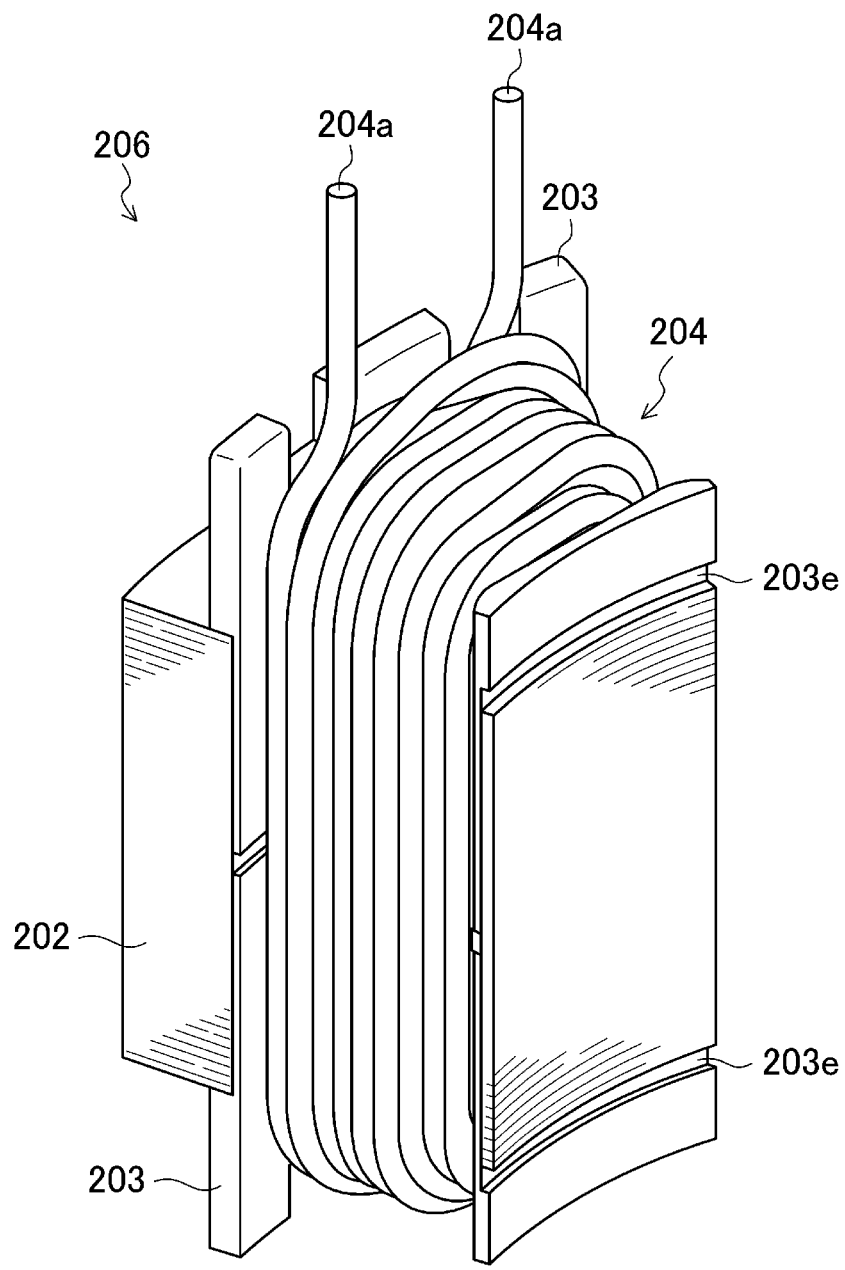
FIG. 27 is a perspective view of the core segment according to a preferred embodiment of the present invention including the insulators attached thereto and the coil wound thereabout.

FIG. 27 is a perspective view of the core segment 202 having the insulators 203 fitted thereto and the coil 204 wound thereabout. As illustrated in FIG. 27, the coil 204 includes a pair of coil wire terminals 204a. The coil wire terminals 204a are arranged to extend substantially in parallel with each other toward the output-side end (i.e., in the axial direction of the stator segment 201). A central angle (hereinafter also referred to as a "pitch angle") defined between the pair of coil wire terminals 204a is half the central angle of the core segment 202, that is, preferably about 15 degrees in the present preferred embodiment. In the present preferred embodiment, the pair of coil wire terminals 204a are fixed through the resin layer 205 such that the central angle defined between the pair of coil wire terminals 204a is half the central angle of the core segment 202. When the stator segments 201 have been assembled together to define the stator 200 in the annular shape, the coil wire terminals 204a are therefore preferably arranged at regular or substantially regular intervals of about 15 degrees. Note that the core segment 202 having the insulators 203 fitted thereto and the coil 204 wound thereabout will be hereinafter referred to as a subassembly 206 for the sake of convenience in description.

The resin layer 205 is preferably arranged to seal the entire coil 204 except for the pair of coil wire terminals 204a. The coating of the entire coil 204 with the resin layer 205 contributes to prevention of a short circuit (i.e., an interphase short circuit) with another stator segment 201. Moreover, the resin layer 205 contributes to reduction of an exciting vibration of the coil 204.

The resin layer 205 is preferably molded on the subassembly 206. In the present preferred embodiment, the resin layer 205 is preferably made of, for example, a thermoplastic resin similar to the material of the insulators 203. The resin layer 205 may alternatively be made of a thermosetting resin or any other resin commonly used in motors.

In the present preferred embodiment, a circumferential end wall 205d of the resin layer 205 is arranged circumferentially inward of the circumferential end wall 202e of the core segment 202. In addition, the resin layer 205 is arranged not to occupy a space over the end wall 203c of the insulator 203 and the inner side surface 202f of the core segment 202.

Figure 28:
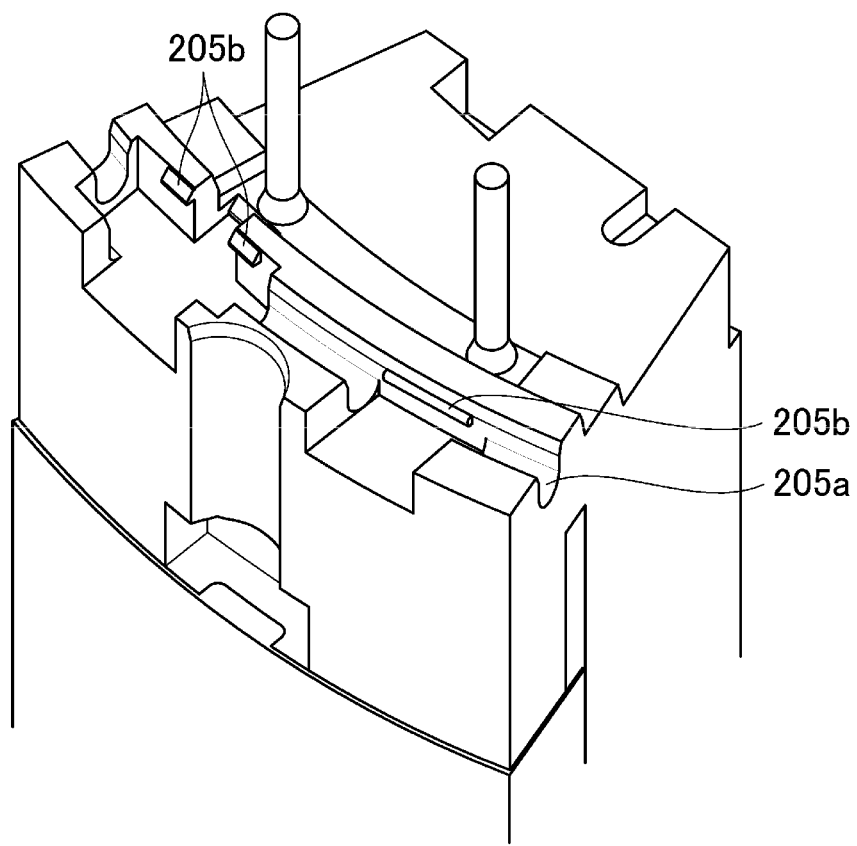
FIG. 28 is a perspective view illustrating a groove defined in the stator segment according to a preferred embodiment of the present invention.

Furthermore, an output-side end surface of the resin layer 205 preferably includes a groove 205a arranged to accommodate the neutral point busbar 250, which functions as a wiring member providing a ground (i.e., the neutral point). FIG. 28 is a perspective view illustrating the groove 205a arranged in the stator segment 201. When the stator segments 201 have been assembled together to define the stator 200 in the annular shape, the grooves 205a of the stator segments 201 are arranged to together define an annular groove (see FIG. 2). A cross section of the groove 205a and its vicinity is illustrated in FIG. 17. FIG. 17 illustrates a situation in which the groove 205a has the neutral point busbar 250 arranged therein. In the present preferred embodiment, the neutral point busbar 250 is preferably an annular or C-shaped wiring member. Twelve neutral point terminal members 250a are attached to the neutral point busbar 250. Note that the number of neutral point terminal members 250a is equal to the segment number. Each of the neutral point terminal members 250a preferably is or substantially is in the shape of the letter "T", as with the terminal members 130 used in the busbar unit 100. Each of the neutral point terminal members 250a is fixed to the neutral point busbar 250 through swaging or the like. When the stator segments 201 have been assembled together to define the stator 200 in the annular shape, the neutral point terminal members 250a are arranged at regular or substantially regular intervals in the circumferential direction, such that every adjacent one of the neutral point terminal members 250a are preferably circumferentially spaced from each other by an angle corresponding to a central angle of the core back portion 202b.

Figure 29:
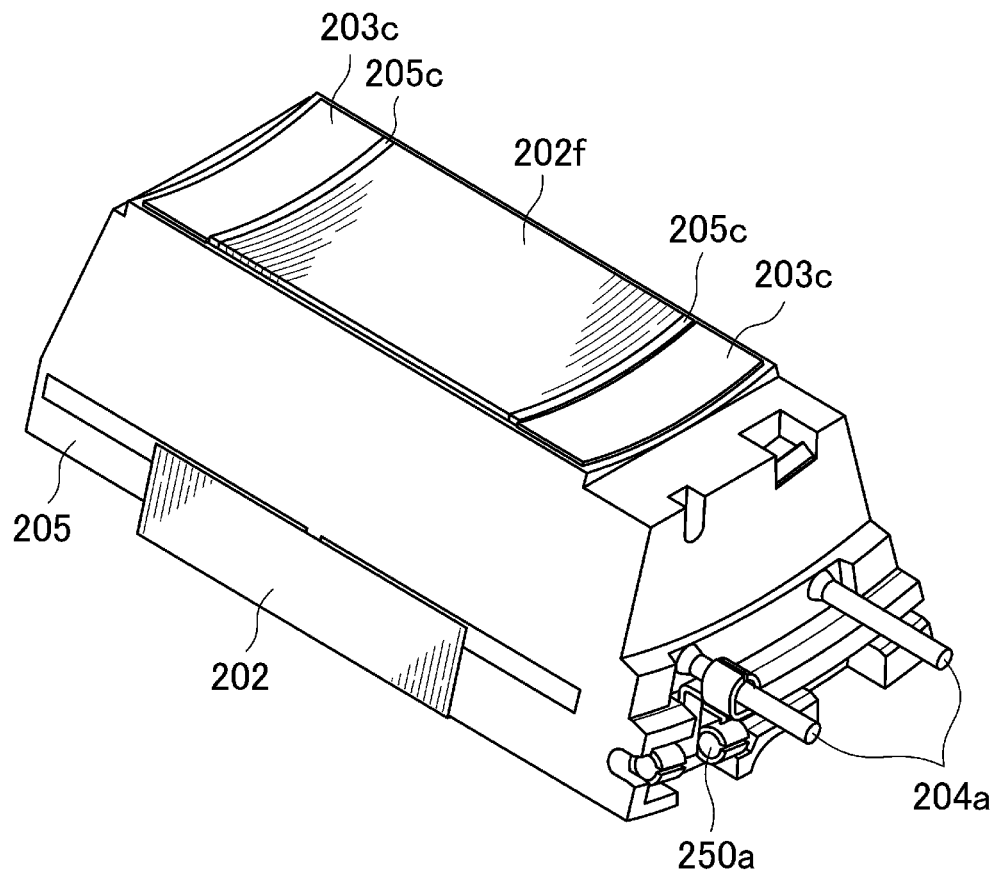
FIG. 29 is a diagram illustrating a situation in which the terminal member has been attached to a coil wire terminal according to a preferred embodiment of the present invention.

Each of the neutral point terminal members 250a is preferably arranged in the groove 205a so as to align with one of the coil wire terminals 204a of a separate one of the stator segments 201. The neutral point terminal member 250a is then fitted to the corresponding coil wire terminal 204a. FIG. 29 is a diagram illustrating a situation in which the neutral point terminal member 250a is fitted to the coil wire terminal 204a. In FIG. 29, the neutral point busbar 250 is omitted for the sake of convenience in description. As illustrated in FIG. 29, one of the coil wire terminals 204a of the corresponding stator segment 201 is inserted into each neutral point terminal member 250a in the axial direction, so that the neutral point terminal member 250a is electrically connected with the coil wire terminal 204a.

Furthermore, referring to FIG. 28, an inside wall surface of the groove 205a preferably includes a plurality of projecting portions 205b. The projecting portions 205b are arranged to prevent the neutral point terminal members 250a and the neutral point busbar 250 from coming off. Referring to FIG. 17, each neutral point terminal member 250a is preferably held between the projecting portion 205b and a bottom portion of the groove 205a. The projecting portions 205b contribute to preventing the neutral point terminal member 250a and so on from coming off the groove 205a. This in turn contributes to further ensuring the electrical connection between the neutral point terminal member 250a and the coil wire terminal 204a.

Furthermore, referring to FIG. 21, the resin layer 205 preferably includes a flat portion 205e arranged at an output-side end thereof to have the busbar unit 100 mounted thereon. Furthermore, referring to FIGS. 17, 21, and 22, the resin layer 205 preferably includes a recessed portion 205f arranged at a radially inner corner of the output-side end thereof. The stator 200 according to the present preferred embodiment is preferably defined by the twelve stator segments 201. Therefore, in the stator 200, the recessed portions 205f are preferably arranged at regular or substantially regular intervals of about 30 degrees. Each recessed portion 205f includes the projection 205g arranged therein. One of the hooks 111 of the holder 101w is mechanically engaged with the projection 205g. The recessed portion 205f and the projection 205g together define an example fixing portion according to a preferred embodiment of the present invention.

Figure 30:
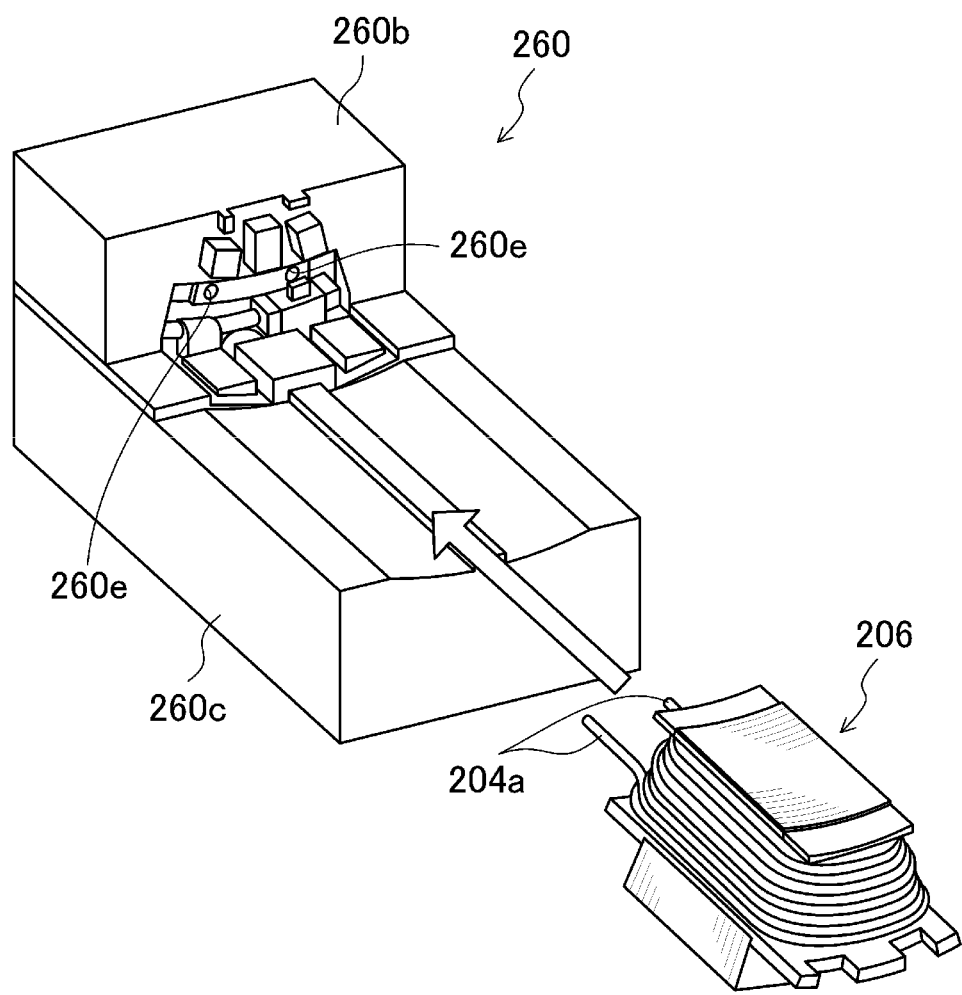
FIG. 30 is a perspective view illustrating a portion of a mold used to mold a resin layer according to a preferred embodiment of the present invention.
Figure 31:
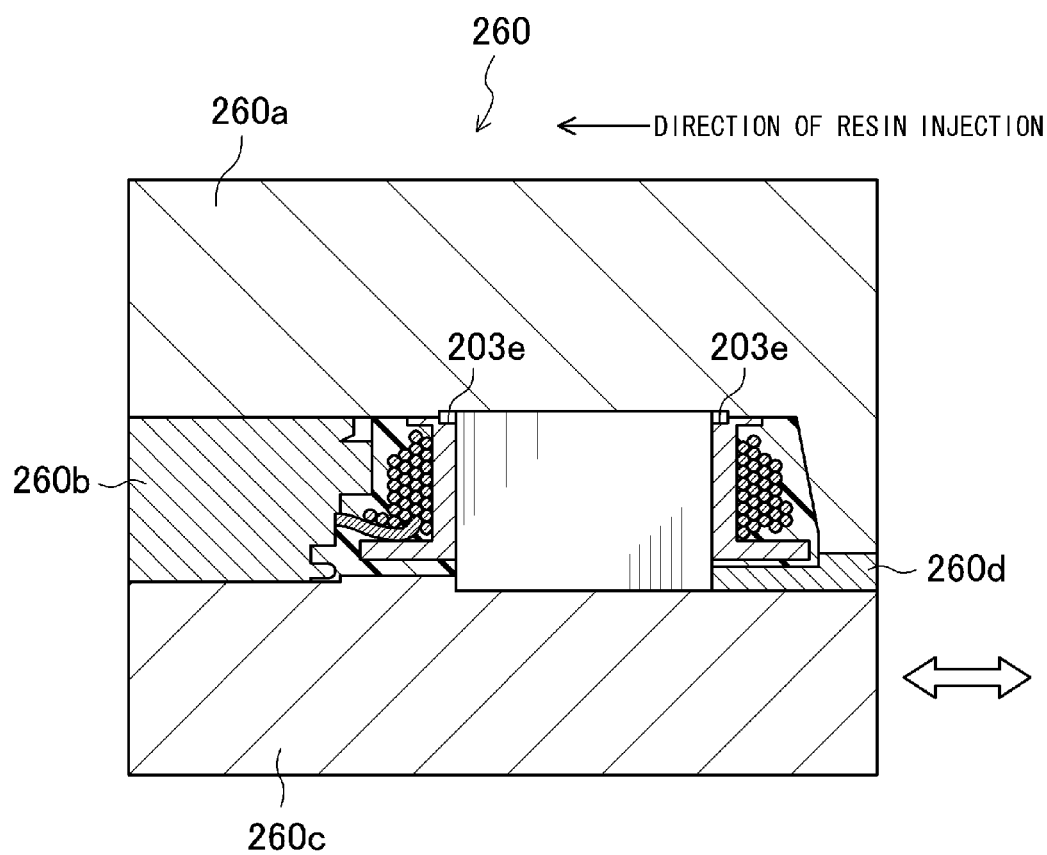
FIG. 31 is a cross-sectional view of the mold according to a preferred embodiment of the present invention.

FIG. 30 is a perspective view illustrating a portion of a mold 260 preferably used to mold the resin layer 205 in accordance with a preferred embodiment of the present invention. FIG. 31 is a cross-sectional view of the mold 260. FIG. 31 illustrates a situation in which the subassembly 206 is set inside the mold 260. The mold 260 includes a stationary side mold portion 260a, a coil wire terminal side mold portion 260b, a movable side mold portion 260c, and a slide portion 260d.

The coil wire terminal side mold portion 260b is arranged to position the pair of coil wire terminals 204a. Specifically, the coil wire terminal side mold portion 260b preferably includes two holes 260e arranged to have the coil wire terminals 204a inserted there into. The holes 260e are spaced from each other by a predetermined distance. This enables the coil wire terminals 204a of the stator 200 to be arranged at regular or substantially regular intervals of about 15 degrees (the pitch angle=about 15 degrees) when the stator segments 201 have been assembled together to define the stator 200 in the annular shape. The coil wire terminal side mold portion 260b is preferably provided with a predetermined seal structure to prevent or substantially prevent an injected resin from leaking out through a gap between any coil wire terminal 204a and the coil wire terminal side mold portion 260b (i.e., any hole 260e).

The slide portion 260d is slid into contact with an opposite axial end (i.e., an end opposite to the output-side end) of the core segment 202 before the injection of the resin.

Next, the step portion 203e of the insulator 203 will now be described below. The stationary side mold portion 260a can be assumed to have uniform dimensions because the same stationary side mold portion 260a is used repeatedly. In contrast, the core segments 202 may have individual differences in axial dimension due to, for example, manufacturing tolerances. In the case where the core segment 202 has a decreased axial dimension, an extra space is defined between the stationary side mold portion 260a, the opposite axial end of the core segment 202, and the end wall 203c of the insulator 203. The resin injected to define the resin layer 205 flows into the extra space. If the resin which has flowed into the extra space has a very small thickness, the resin may be removed from the inner circumferential surface of the stator 200 toward the rotor 300. In order to prevent or substantially prevent this from happening, the step portion 203e is defined in the insulator 203. The resin flows into the step portion 203e when molding the resin layer 205. As a result, the resin layer 205 defined has a sufficient thickness.

The stationary side mold portion 260a is arranged to extend along the end wall 203c of the insulator 203 and the inner side surface 202f of the core segment 202, so that the resin layer 205 is prevented from extending over the end wall 203c and the inner side surface 202f of the core segment 202. Referring to FIG. 29, because of the stationary side mold portion 260a, a surface 205c of the resin which has flowed into the step portion 203e is arranged to be flush with the inner side surface 202f of the core segment 202.

Furthermore, the stationary side mold portion 260a is preferably arranged in contact with the circumferential end walls 203d of the insulator 203 on both sides. Furthermore, the stationary side mold portion 260a is also arranged in contact with the circumferential end walls 202e of the core segment 202 on both sides. That is, the circumferential end walls 203d and 202e are used as references when molding the resin layer 205. Because the stationary side mold portion 260a is arranged in contact with the circumferential end walls 202e of the core segment 202 on both sides, the resin layer 205 is prevented or substantially prevented from extending over the circumferential end walls 202e of the core segment 202.

As described above, the steps are defined between the circumferential end walls 202e of the core segment 202 and the circumferential end walls 203d of the insulators 203. The stationary side mold portion 260a preferably includes steps (each preferably measuring about 0.1 mm, for example) corresponding to the steps between the circumferential end walls 202e of the core segment 202 and the circumferential end walls 203d of the insulators 203. Steps of a similar size (i.e., each preferably measuring about 0.1 mm, for example) are accordingly defined between the circumferential end walls 205d of the resin layer 205 and the circumferential end walls 202e of the core segment 202. That is, the circumferential end walls 205d of the resin layer 205 are arranged circumferentially inward of the circumferential end walls 202e of the core segment 202. As a result, when the stator 200 has been assembled, the resin layers 205 of adjacent ones of the stator segments 201 are not arranged in circumferential contact with each other, while the circumferential end walls 202e of adjacent ones of the core segments 202 are arranged in contact with each other.

Figure 32:
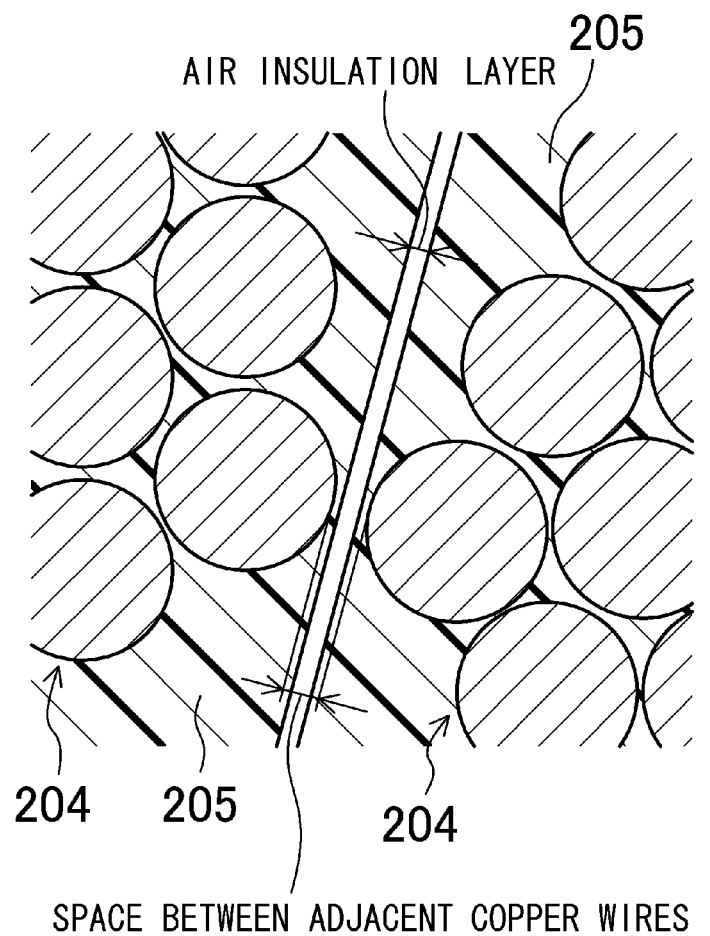
FIG. 32 is an enlarged view of a cross section of coils of adjacent stator segments and their vicinity according to a preferred embodiment of the present invention.

FIG. 32 is an enlarged view of a cross section of the coils 204 of adjacent ones of the stator segments 201 and their vicinity. As described above, there is a step measuring about 0.1 mm, for example, between the circumferential end wall 202e of the core segment 202 and the circumferential end wall 203d of the insulator 203. Therefore, as illustrated in FIG. 32, an air insulation layer preferably measuring more than about 0.2 mm, for example, can be secured between the adjacent stator segments 201. Since each coil 204 and the circumferential end wall 203d of the corresponding insulator 203 are preferably spaced from each other by about 0.1 mm, a distance of more than about 0.4 mm, for example, is preferably secured between adjacent ones of the copper wires.

As described above, in the present preferred embodiment, the circumferential end walls 202e of the core segments 202 of the stator 200 are preferably arranged in contact with one another, while the resin layers 205 are not arranged in circumferential contact with one another. It is therefore possible to construct the stator 200 with an accuracy of the core segments 202 according to the present preferred embodiment. Use of the stator segments 201 to construct the stator 200 therefore contributes to achieving improved circularity of an inner circumference of the stator as compared to the case where stator segments whose resin layers are arranged in circumferential contact with one another are used to construct the stator. Since the circularity of the inner circumference of the stator affects characteristics of the motor, the motor 1 according to the present preferred embodiment is able to achieve improved characteristics.

Furthermore, the end wall 203c of the insulator 203 preferably includes the step portion 203e. The step portion 203e contributes to absorbing a cumulative error in the axial dimension of the core segment 202.

Furthermore, the resin layer 205 is molded in a situation where the pair of coil wire terminals 204a is positioned by the coil wire terminal side mold portion 260b. This contributes to ensuring sufficient accuracy of the pitch angle defined between the coil wire terminals 204a in each stator segment 201. This in turn preferably contributes to preventing a short circuit (i.e., a so-called intraphase short circuit) between the coil wire terminals 204a in the same stator segment 201. In addition, the fitting of the busbar unit 100 to the stator 200 is preferably made easier. The increased ease of the fitting of the busbar unit 100 makes it possible to use an automated machine arranged to perform the fitting of the busbar unit 100. Furthermore, since the coil wire terminals 204a are properly positioned, it is preferably possible to eliminate the need for forced routing of wires. This contributes to reducing a residual stress on a joint between wires, and improving reliability of electrical connection.

Furthermore, the busbar unit 100 is mechanically joined to the stator segments 201 through the recessed portions 205f thereof. This contributes to improving mechanical rigidity, vibration resistance, and impact resistance of the busbar unit 100.

Furthermore, each stator segment 201 includes the groove 205a arranged to accommodate the neutral point busbar 250 separately from the busbar unit 100. This contributes to reducing the total length of the motor 1 as compared to the case where the wires of each phase and the wires of the ground are arranged in a single busbar unit. This in turn contributes to achieving a reduced cost.

Furthermore, the resin layer 205 is arranged such that the coil 204 is preferably sandwiched between the insulators 203 and the resin layer 205. This contributes to reducing the exciting vibration of the coil 204.

Note that the aforementioned insulating layer may be defined by a coating (e.g., preferably an electrodeposition coating), instead of the insulator 203, in other preferred embodiments of the present invention.

Also note that the neutral point busbar 250 may be produced by punching out an annular or C-shaped piece from a plate material. In this case, the neutral point terminal members 250a may preferably be defined integrally with the neutral point busbar 250 when the neutral point busbar 250 is punched out from the plate material.

Also note that the aforementioned segment number of the stator 200 is merely an example.

Also note that the aforementioned degree of the central angle defined between the pair of coil wire terminals 204a is merely an example. That is, the central angle defined between the pair of coil wire terminals 204a may not necessarily be half the central angle of the core segment 202, as in the above-described preferred embodiment.

Figure 33:
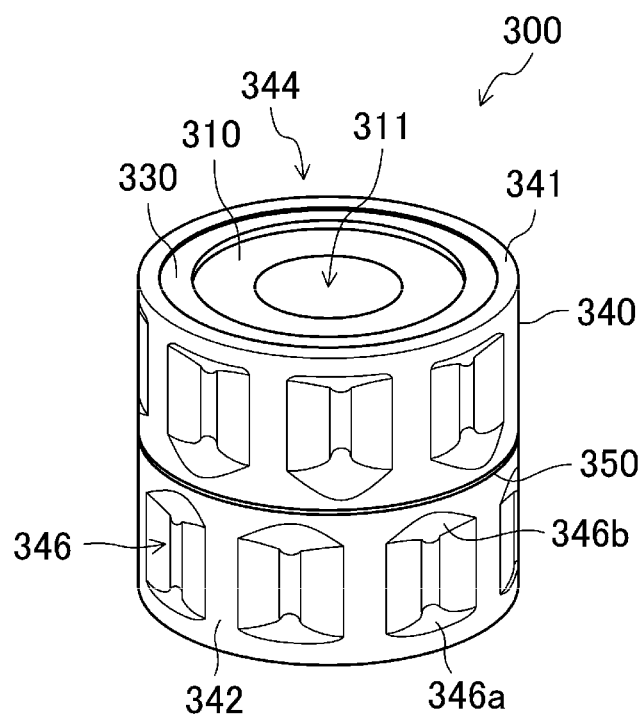
FIG. 33 is a schematic perspective view of a rotor according to a preferred embodiment of the present invention.
Figure 34:
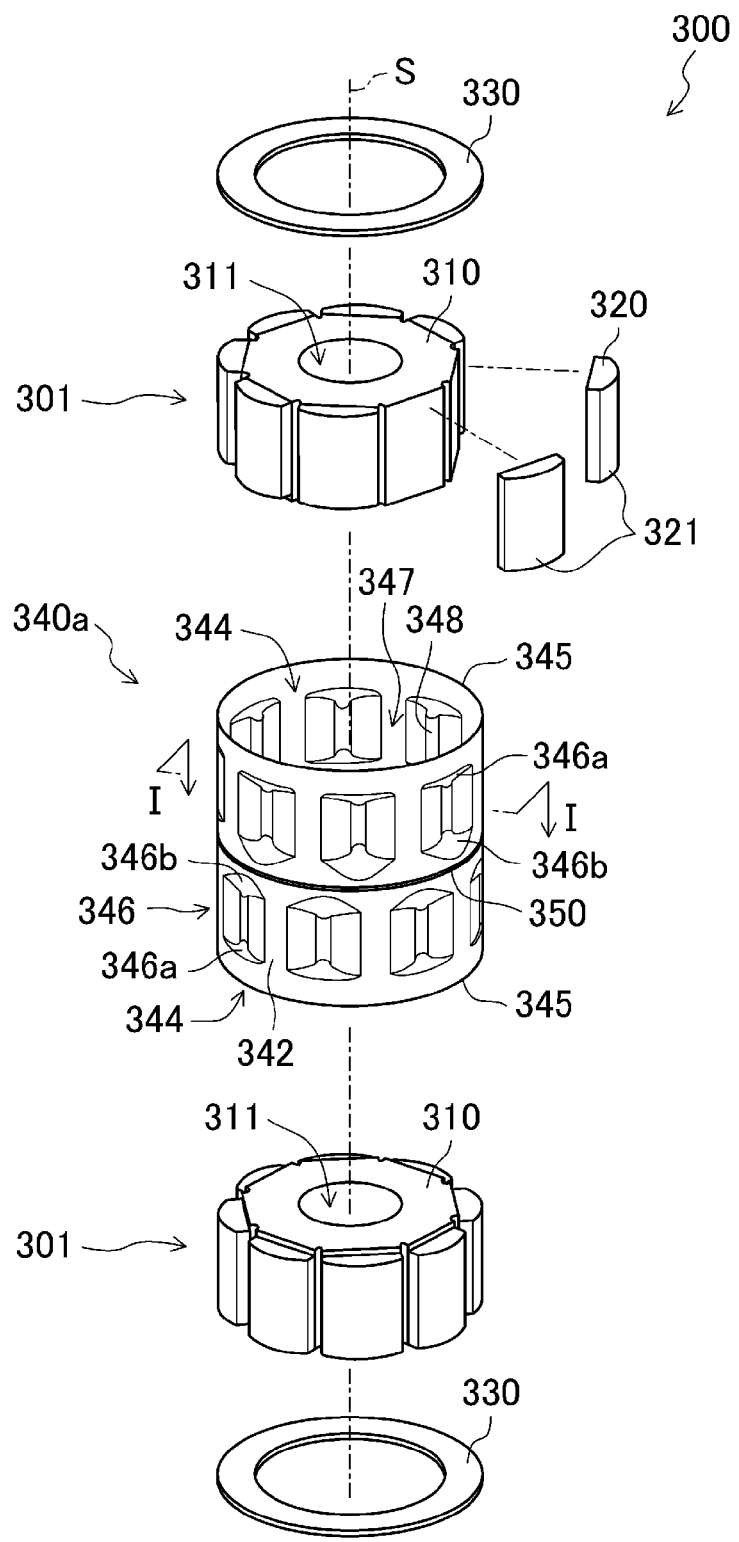
FIG. 34 is an exploded view of components of the rotor according to a preferred embodiment of the present invention.

As illustrated in FIGS. 33 and 34, the rotor 300 according to the present preferred embodiment is preferably a rotor having a two-step skew structure. The rotor 300 preferably includes rotor cores 310, magnets 320, spacers 330, a rotor cover 340, and so on. The rotor cores 310, the magnets 320, and the spacers 330 are preferably securely united through the rotor cover 340 without use of an adhesive. Note that FIG. 34 shows the rotor cover 340 (i.e., a base 340a) before collar portions 341 are defined therein.

The number of rotor cores 310 included in the rotor 300 according to the present preferred embodiment is preferably two, for example. Each rotor core 310 is preferably a columnar member having a cross section in or substantially in the shape of a regular octagon. The rotor core 310 includes a through hole 311 defined at its center. The through hole 311 is arranged to be coaxial or substantially coaxial with a rotation axis S, and is arranged to have the shaft 6 secured therein. The rotor core 310 is preferably defined by a plurality of metal sheets placed one upon another along the rotation axis S and united in a single body. However, any other desirable type of rotor core could be used instead.

The rotor 300 according to the present preferred embodiment preferably has eight poles, for example. In other words, the number of magnets 320 (which will be referred to collectively as a "magnet group") attached to each rotor core 310 is preferably eight. Each magnet 320 is preferably shaped like a band plate, for example. Each magnet 320 preferably includes a convex surface 321 arranged to project so as to assume a minor arc in a cross-section. The magnets 320 in each magnet group are arranged to orient the convex surfaces 321 thereof radially outward. Moreover, each magnet 320 is arranged to have the convex surface 321 thereof extending in parallel or substantially in parallel with the through hole 311. The magnets 320 are therefore arranged on an outer circumferential surface of the rotor core 310 at regular intervals in the circumferential direction with a predetermined gap defined between adjacent ones of the magnets 320. The magnets 320 are polarized such that each of the magnets 320 preferably defines a south or a north pole radially oriented. The south and north poles are preferably arranged to alternate with each other in the circumferential direction on a radial outside.

The two rotor cores 310, each with the magnet group attached thereto, are arranged one above the other along the rotation axis S. Each pair of the rotor core 310 and the magnet group will be referred to as a "rotor assembly 301". The two rotor assemblies 301 are preferably fitted inside the rotor cover 340 such that the rotor assemblies 301 are circumferentially displaced from each other by a predetermined step angle. Each of the eight magnets 320 in each rotor assembly 301 is therefore circumferentially displaced from a corresponding one of the eight magnets 320 in the other rotor assembly 301 by the predetermined step angle. In other words, the rotor assemblies 301 have a step skew structure.

The number of spacers 330 included in the rotor 300 according to the present preferred embodiment is preferably two, for example. Each spacer 330 is a member having a portion which is substantially in an annular shape and arranged to extend along an inner circumferential surface of the rotor cover 340. The spacer 330 is preferably arranged to have an outside diameter slightly smaller than the inside diameter of the rotor cover 340. In addition, the spacer 330 is preferably arranged to have an inside diameter greater than the diameter of the through hole 311. The outside diameter of the spacer 330 is preferably at least arranged to be smaller than the outside diameter of the rotor core 310. Note that the spacer 330 may be made of either, for example, a metal or a resin, as long as it is made of a non-magnetic material.

Each spacer 330 is arranged between an end surface of a separate one of the rotor assemblies 301 fitted inside the rotor cover 340 and one of the collar portions 341. Each collar portion 341 is preferably defined by deforming an end portion of the rotor cover 340. Each spacer 330 is arranged to restrain an axial movement of the corresponding rotor assembly 301 in combination with the corresponding collar portion 341. Moreover, the spacer 330 contributes to facilitating processing of the collar portion 341, and also to preventing the magnets 320 and the rotor core 310 from being damaged during the processing. Details thereof will be described below.

The rotor cover 340 is preferably a cylindrical metal article subjected to metalworking. The rotor cover 340 preferably includes a cylindrical circumferential wall 342 and openings 344 arranged to be open at both ends of the rotor cover 340. The rotor cover 340 is defined by subjecting the base 340a, which is preferably substantially cylindrical and free of joints, to, for example, press working or the like. The rotor assembly 301 and the spacer 330 are preferably placed inside the rotor cover 340 through each opening 344 and fitted to the rotor cover 340. Each rotor assembly 301 is preferably, for example, press fitted to the rotor cover 340. The rotor cover 340 is preferably arranged to protect the rotor assemblies 301 and the spacers 330, and to properly position and hold the rotor assemblies 301 and the spacers 330 in a united manner without use of an adhesive.

The rotor cover 340 is essentially identical to the base 340a except that the rotor cover 340 preferably includes the collar portions 341 defined therein. A portion (hereinafter also referred to as a "processed edge 345") of the base 340a around each opening 344 is deformed radially inward to define the collar portion 341 projecting radially inward, so that the rotor cover 340 is completed. The axial dimension of the base 340a is therefore designed to be greater than the total axial dimension of the rotor cores 310 and the magnets 320.

An outer surface of the circumferential wall 342 of the rotor cover 340 preferably includes a recessed dividing portion 350 depressed radially inward. The recessed dividing portion 350 corresponds to a space provided between the two rotor assemblies 301 arranged adjacent to each other along the rotation axis S. The recessed dividing portion 350 according to the present preferred embodiment is preferably defined by a straight groove arranged to extend in the circumferential direction at an axial center of the rotor cover 340. The recessed dividing portion 350 preferably contributes to retaining the two rotor assemblies 301 such that the rotor assemblies 301 are not in contact with each other.

Note that the structure of the rotor cover 340 may be modified as long as a contact between the rotor assemblies 301 is avoided. That is, a gap defined between the adjacent rotor assemblies 301 by the recessed dividing portion 350 may be only slight. Note, however, that, when the rotor assemblies 301 are arranged in too close proximity to each other, a high-speed rotation of the rotor 300 may lead to occurrence of an eddy-current loss. It is therefore preferable that the recessed dividing portion 350 be arranged to space the two rotor assemblies 301 from each other by, for example, about 1 mm or more.

The outer surface of the circumferential wall 342 of the rotor cover 340 preferably includes a plurality of recesses 346 defined therein. The recesses 346 are preferably arranged to extend along the rotation axis S, correspondingly to the magnets 320. On both sides of the recessed dividing portion 350 in the rotor cover 340, the recesses 346 are arranged not to extend over an end portion on either side.

Each recess 346 preferably includes a first end wall 346a arranged at an end thereof closer to the opening 344. The first end wall 346a is arranged to extend from an outer circumferential surface of the rotor cover 340 radially inward perpendicularly or substantially perpendicularly. The first end walls 346a of the recesses 346 are arranged in or substantially in a straight line in the circumferential direction. Meanwhile, an end portion of each recess 346 at an end closer to the recessed dividing portion 350 preferably has a tapered shape. The end portion of each recess 346 at the end closer to the recessed dividing portion 350 preferably includes a second end wall 346b arranged to extend from the outer circumferential surface of the rotor cover 340 radially inward obliquely. Note that the shape of the second end wall 346b is a result of avoiding forced removal of the base 340a from a columnar jig 360 when defining the recesses 346.

Figure 35:
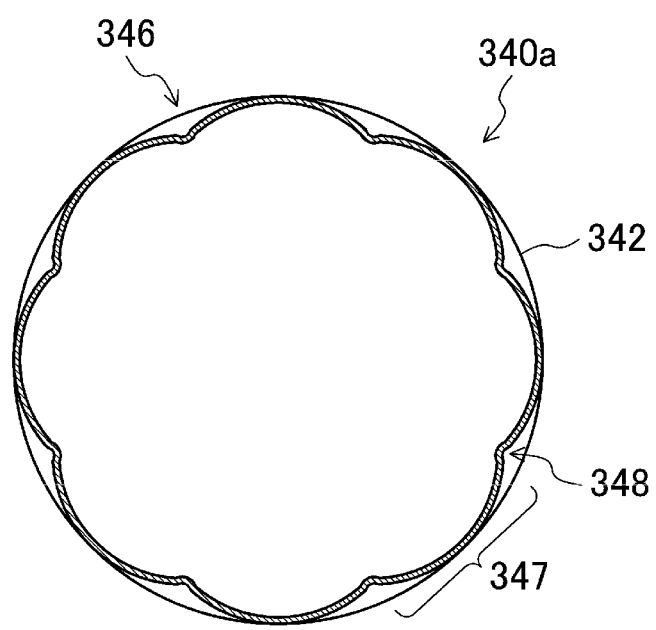
FIG. 35 is a cross-sectional view of a rotor cover according to a preferred embodiment of the present invention as viewed from a direction indicated by line I-I of FIG. 34.

Referring to FIG. 35, because of the recesses 346, the rotor cover 340 includes a plurality of support regions 347 each preferably having a cross section in the shape of a minor arc. Each support region 347 is arranged to project radially outward to match the convex surface 321 of a separate one of the magnets 320 fitted inside the rotor cover 340. In other words, each magnet 320 is preferably arranged such that the convex surface 321 thereof is arranged opposite a separate one of the support regions 347. In addition, each magnet 320 is arranged in contact with the corresponding support region 347. Each magnet 320 is thereby restrained from circumferential movement, and retained at a predetermined position.

Between every two support regions 347 adjacent to each other in the circumferential direction, a recessed portion 348 extending in a line along the rotation axis S and being continuous with the two support regions 347 is preferably defined. In contrast to the support regions 347, each recessed portion 348 is arranged to project radially inward to have a cross section in the shape of a minor arc. The recessed portion 348 is preferably a small depression which is embedded in a gap defined between every two adjacent magnets 320. Each recessed portion 348 is arranged in a circumferential middle of a separate one of the recesses 346. In addition, the recessed portion 348 is arranged to extend from the first end wall 346a to a vicinity of the second end wall 346b. The recessed portions 348 contribute to securely preventing a contact between any magnets 320 adjacent to each other in the circumferential direction.

Each support region 347 is arranged in secure surface contact with the convex surface 321 of a separate one of the magnets 320. This contributes to properly holding the magnets 320.

Figure 36A:
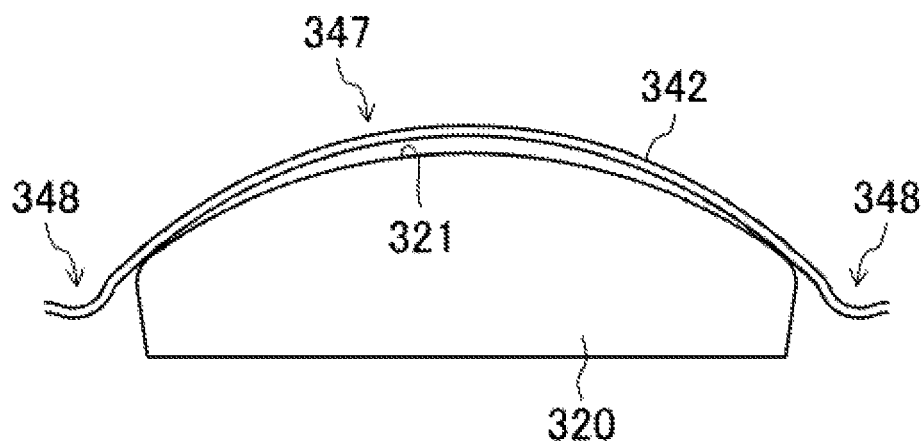
FIGS. 36A and 36B are diagrams illustrating a relationship between a support region and a convex surface according to a preferred embodiment of the present invention.
Figure 36B:
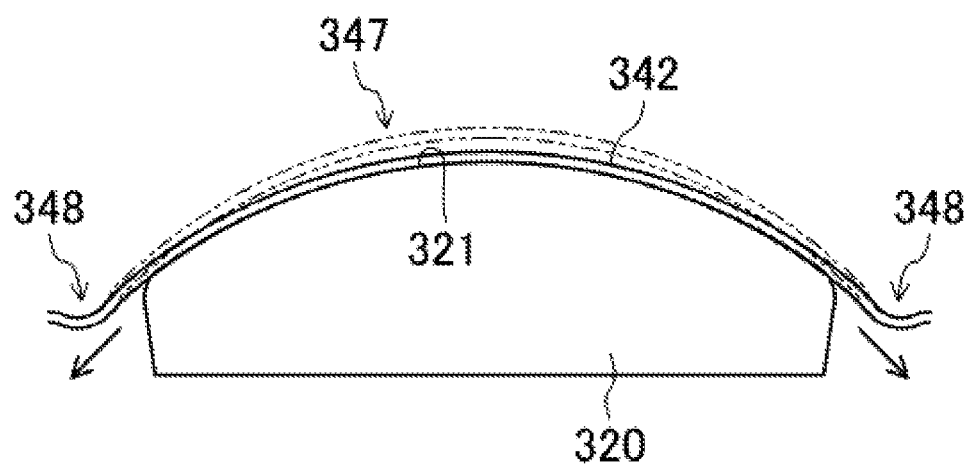

Specifically, referring to FIGS. 36A and 36B, an inner surface of the support region 347 is preferably arranged to have a smaller radius of curvature than that of the convex surface 321. Dimensions of portions of the rotor cover 340 are designed such that both circumferential ends of the convex surface 321 of each magnet 320 are positioned circumferentially inward of both circumferential ends of the inner surface of the corresponding support region 347.

Referring to FIG. 36A, when no external force is applied to the support region 347, the support region 347 has a smaller radius of curvature than that of the convex surface 321. Therefore, when the convex surface 321 is brought into contact with the inner surface of the support region 347, two separate portions of the support region 347 near both circumferential ends thereof are brought into contact with the convex surface 321, while a middle portion of the support region 347 is not in contact with the convex surface 321. Referring to FIG. 36B, after the rotor core 310 and so on are fitted to the base 340a, forces are applied to the base 340a as if to increase the diameter of the base 340a. As a result, both circumferential end portions of the support region 347 are pulled in mutually opposite directions. As a result, a force acting toward the rotation axis S is applied to the support region 347 to force the support region 347 onto the magnet 320. In this manner, the inner surface of the support region 347 is preferably brought into surface contact with the convex surface 321 in its substantial entirety.

Moreover, when the support region 347 has been brought into close contact with the convex surface 321 to have the same radius of curvature as that of the convex surface 321, an arc having this radius of curvature and defined by the support region 347 is longer than an arc having this radius of curvature and defined by the convex surface 321. This contributes to securing the surface contact between the convex surface 321 and the support region 347. As a result, the magnet 320 is properly positioned circumferentially.

Figure 37:
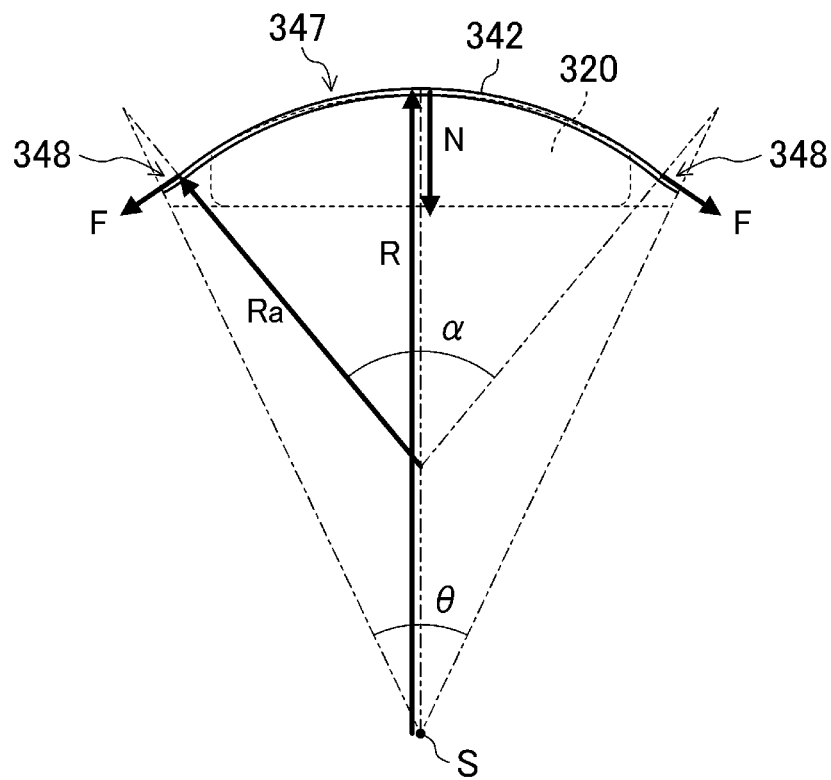
FIG. 37 is a diagram illustrating conditions required of the support region according to a preferred embodiment of the present invention.
Figure 38:
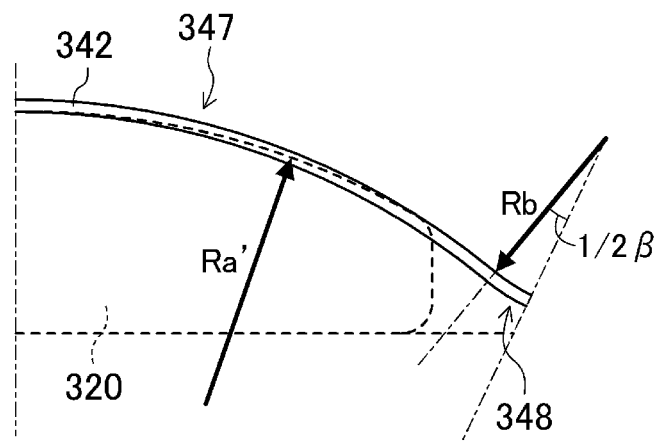
FIG. 38 is another diagram illustrating conditions required of the support region according to a preferred embodiment of the present invention.

Referring to FIGS. 37 and 38, mathematical equations used in deriving the radius of curvature of the support region 347 and so on will now be described below. It is assumed that Ra denotes the radius of curvature (mm) of the support region 347 when no external force is acting on the support region 347, and that α denotes the central angle (radian) thereof. It is similarly assumed that Rb denotes the radius of curvature of the recessed portion 348, and that β denotes the central angle thereof.

It is assumed that Ra' denotes the radius of curvature of the support region 347 when the support region 347 has been deformed after the magnets 320 and so on are fitted to the rotor cover 340, and that α' denotes the central angle thereof. It is similarly assumed that Rb' denotes the radius of curvature of the recessed portion 348 when the recessed portion 348 has been deformed after the magnets 320 and so on are fitted to the rotor cover 340, and that β' denotes the central angle thereof. Note that Ra' is equal to the radius of curvature of the convex surface 321.

It is assumed that R denotes a maximum outside diameter (mm) of the rotor cover 340 when the magnets 320 and so on have been fitted to the rotor cover 340. It is also assumed that θ denotes the central angle of one pole of the rotor 300, that t denotes the thickness (mm) of the rotor cover 340, that L denotes the circumferential length (mm) of the rotor cover 340, and that E denotes the Young's modulus of the rotor cover 340.

When the rotor cover 340 is constructed in the above-described manner, the following geometric equations hold.

$$\alpha' = \theta + \beta' \qquad \text{Eq. 1}$$

$$(R-t-Ra')\sin\theta = (Ra'+Rb'+t)\sin\beta' \qquad \text{Eq. 2}$$

Furthermore, when the magnets 320 and so on have been fitted to the rotor cover 340, pulling forces F are produced at the support region 347 and circumferential end portions of the recessed portions 348. The support region 347 and the recessed portions 348 are stretched thereby, so that the following equation holds.

$$\frac{\alpha' Ra' - \alpha Ra}{\alpha Ra} = \frac{\beta' Rb' - \beta Rb}{\beta Rb} = \frac{F}{tEL} \qquad \text{Eq. 3}$$

The pulling forces F produced at the support region 347 produce a radially inward force N (i.e., a supporting force) acting on the magnet 320. The supporting force N is represented by the following equation.

$$N = 2F \sin(\alpha'/2) \qquad \text{Eq. 4}$$

Therefore, the proper holding of the magnets 320 is ensured by making the supporting force N calculated based on the above equations greater than a maximum centrifugal force applied to the magnets 320.

Specifically, the proper holding of the magnets 320 is ensured when the following inequality holds:

$$N > Mm \cdot Rm \cdot S^2 \qquad \text{Eq. 5}$$

where Mm denotes the mass of each magnet 320, Rm denotes the distance from the center of the through hole 311 to the center of gravity of the magnet 320, and S denotes a maximum angular velocity of the rotor 300 based on a design thereof.

Next, a non-limiting example of a method of manufacturing the rotor 300 according to a present preferred embodiment will now be described below.

As described above, the magnets 320 and so on are preferably fitted to the rotor cover 340 without use of an adhesive to construct the rotor 300 in a unified manner. Specifically, the method of fitting the magnets 320 and so on to the rotor cover 340 to construct the rotor 300 in a unified manner preferably includes a step of defining the base 340a of the rotor cover 340 (i.e., a base defining step); a step of defining the recessed dividing portion 350 in the base 340a (i.e., a recessed dividing portion defining step); a step of defining the support regions 347 in the base 340a (i.e., a support region defining step); a step of fitting the rotor cores 310 and the magnets 320 to the base 340a (i.e., a fitting step); and a step of defining the collar portions 341 in the base 340a to complete the rotor cover 340 (i.e., a collar portion defining step).

Referring to FIGS. 39A, 39B, 39C, and 39D, the base 340a of the rotor cover 340 (an initial state) is defined in the base defining step. Specifically, referring to FIG. 39A, a metal sheet is preferably first subjected to, for example, press working to define a pressed metal item which has a bottom and is substantially cylindrical and free of joints. The thickness of the metal sheet is preferably in the range of about 0.2 mm to about 0.3 mm, for example, from the standpoint of durability and motor performance.

Figure 39A:
FIGS. 39A, 39B, 39C, and 39D are diagrams illustrating a base defining step according to a preferred embodiment of the present invention.
Figure 39B:
Figure 39C:
Figure 39D:
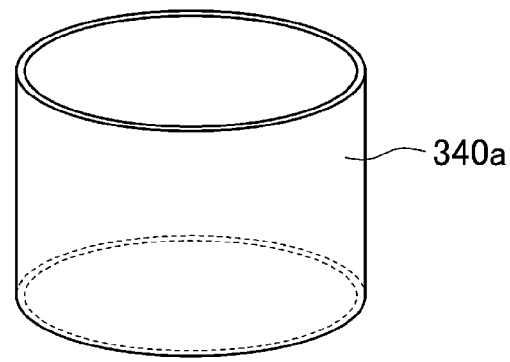
Figure 40A:
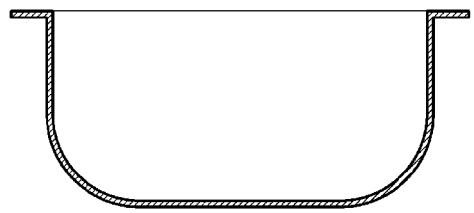
FIGS. 40A, 40B, 40C, and 40D are diagrams illustrating an example variation of the base defining step according to a preferred embodiment of the present invention.
Figure 40B:
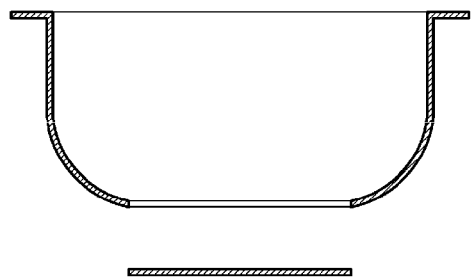
Figure 40C:
Figure 40D:
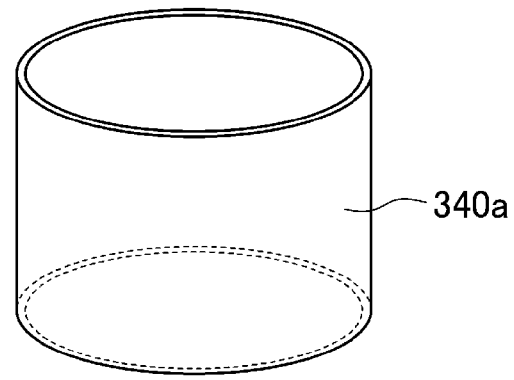

Next, referring to FIG. 39B, the bottom of the pressed metal item is removed therefrom to shape the pressed metal item as illustrated in FIG. 39C, and thereafter an unwanted flange portion is preferably cut off, so that a substantially cylindrical item having openings at both ends thereof and being free of joints as illustrated in FIG. 39D is finally defined. This item is used as the base 340a of the rotor cover 340 (the initial state).

Alternatively, referring to FIGS. 40A, 40B, 40C, and 40D, a pressed item which has a bottom and is substantially cylindrical and free of joints and which includes a curved surface defined in a bottom portion thereof may be used to define the base 340a, for example. In this case, for example, after a portion of the bottom surface is preferably cut off, a portion of the pressed item which corresponds to the curved surface is preferably deformed through, for example, press working to assume a cylindrical shape. An unwanted flange portion is preferably cut off thereafter.

In the recessed dividing portion defining step in accordance with a preferred embodiment of the present invention, a portion of the circumferential wall 342 of the base 340a is preferably depressed radially inward, so that an axial middle portion of the base 340a includes the recessed dividing portion 350.

Figure 41:
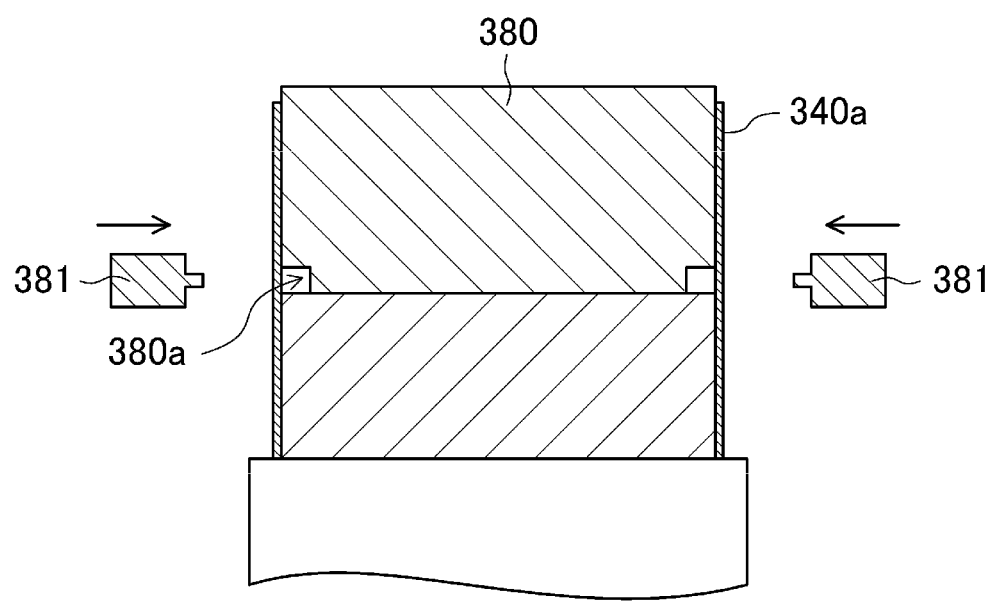
FIG. 41 is a diagram illustrating a recessed dividing portion defining step according to a preferred embodiment of the present invention.

Referring to FIG. 41, specifically, the base 340a is preferably fitted to one of a pair of predetermined half jigs 380, so that the base 340a is held thereby. The other of the pair of half jigs 380 is joined to the first half jig 380, so that a recess 380a is defined in an outer circumferential surface of the second half jig 380. The recess 380a corresponds to the recessed dividing portion 350. A stamping die 381 including a projection defined at a top end thereof is pressed against the circumferential wall 342 of the base 340a into the recess 380a, radially inward from outside the circumferential wall 342. As a result, the recessed dividing portion 350 is defined at a predetermined portion of the circumferential wall 342.

In the support region defining step, portions of the circumferential wall 342 of the base 340a are depressed radially inward so that the recesses 346 are preferably defined therein. As a result, the support regions 347 are defined therein. In the present preferred embodiment, the recessed portions 348 are preferably defined simultaneously with the support regions 347.

The support region defining step includes a first support region defining step and a second support region defining step. In the first support region defining step, the support regions 347 are defined in one of two axial halves of the base 340a divided by the recessed dividing portion 350. In the second support region defining step, the support regions 347 are preferably defined in the other axial half of the base 340a such that the support regions 347 in the other axial half of the base 340a are circumferentially displaced from the support regions 347 in the first axial half of the base 340a by the predetermined step angle.

Referring to FIGS. 42, 43, 44, and 45, eight pressing bars 361 (i.e., pressing dies) and so on are preferably used in the support region defining step. The pressing bars 361 are arranged to correspond to the columnar jig 360 and the recesses 346 of one of the two rotor assemblies 301. The axial dimension of the jig 360 is about half the axial dimension of the base 340a, and the outside diameter of the jig 360 is slightly smaller than the inside diameter of the base 340a. An outer circumferential surface of the jig 360 preferably includes eight depressed portions 362 defined therein. The depressed portions 362 are arranged to correspond to the recesses 346 in cross-section, in other words, to the support regions 347 and the recessed portions 348 in cross-section. Each of the depressed portions 362 is arranged to extend from an axial middle portion to an upper edge of the outer circumferential surface of the jig 360. Each depressed portion 362 includes a closed end 362a, which is closed by an end surface spreading radially, and an open end 362b.

Each pressing bar 361 preferably includes a pressing surface 361a. The pressing surface 361a is arranged to project so as to correspond to the recess 346 in cross-section. The pressing bars 361 are arranged around the jig 360 such that the pressing surfaces 361a thereof are arranged to face the depressed portions 362 of the jig 360. In addition, each pressing bar 361 is preferably capable of being shifted in a radial direction. An axial end of the pressing surface 361a of each pressing bar 361 is aligned with the closed end 362a of a separate one of the depressed portions 362. The other axial end of the pressing surface 361a of each pressing bar 361 is positioned axially below an upper edge of the jig 360.

Figure 42:
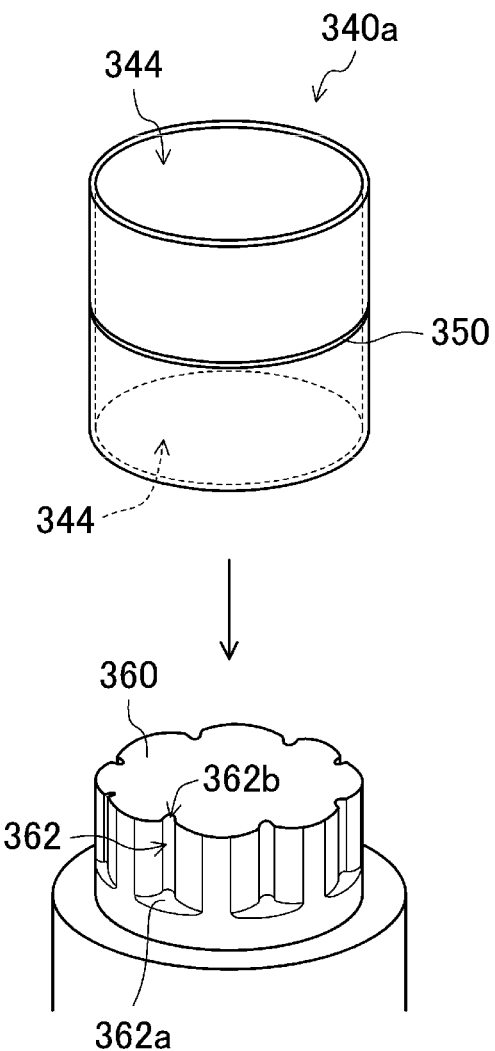
FIG. 42 is a diagram illustrating a support region defining step according to a preferred embodiment of the present invention.
Figure 43:
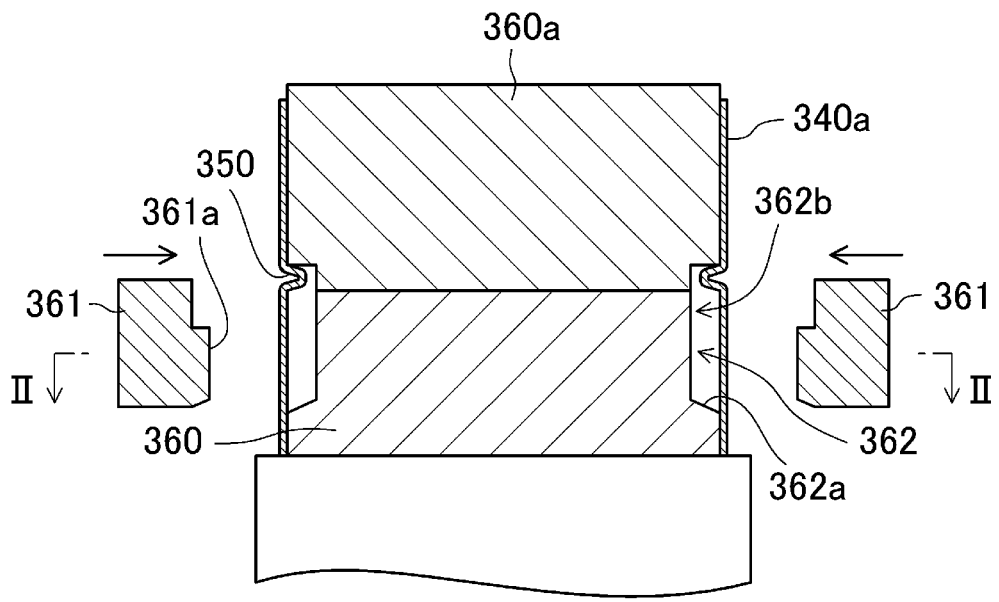
FIG. 43 is another diagram illustrating the support region defining step according to a preferred embodiment of the present invention.
Figure 44:
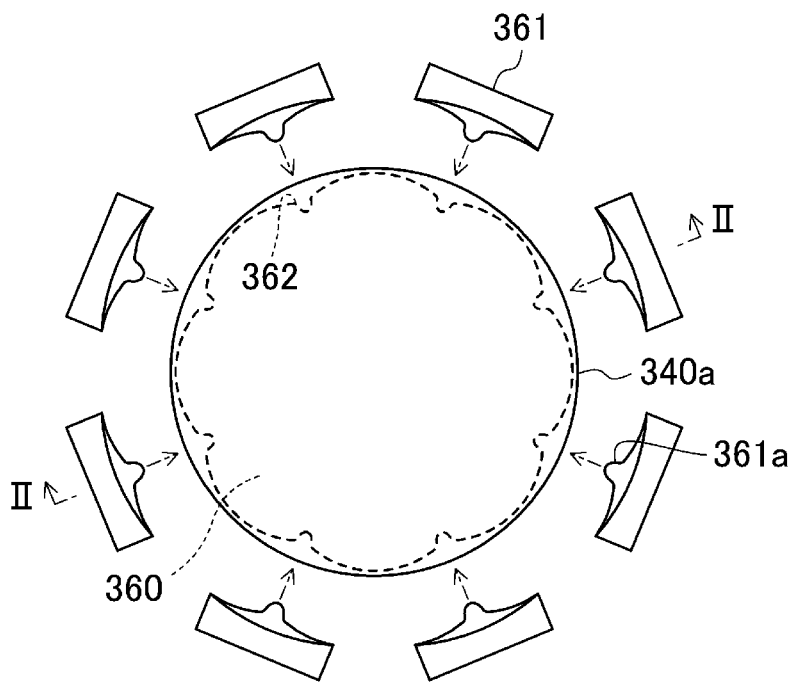
FIG. 44 is a cross-sectional view corresponding to FIG. 43 as viewed from a direction indicated by line II-II of FIG. 43.

Referring to FIG. 42, in the support region defining step, the base 340a is first fitted to the jig 360 such that one of the openings 344 of the base 340a is placed over the upper edge (i.e., a fitting edge) of the jig 360. Next, referring to FIG. 43, a supporting jig 360a is preferably inserted into the base 340a through the opposite opening 344 thereof. Thereafter, the pressing bars 361 are pressed against the outer circumferential surface of the base 340a. Predetermined portions of the circumferential wall 342 are thereby deformed to shape the recesses 346 (the first support region defining step).

Each depressed portion 362 preferably includes the open end 362b arranged at the upper edge of the jig 360. Therefore, after the pressing bars 361 are shifted backward, the base 340a can be easily removed from the jig 360 by simply pulling the base 340a off the jig 360, preferably without the need for a forced removal.

Figure 45:
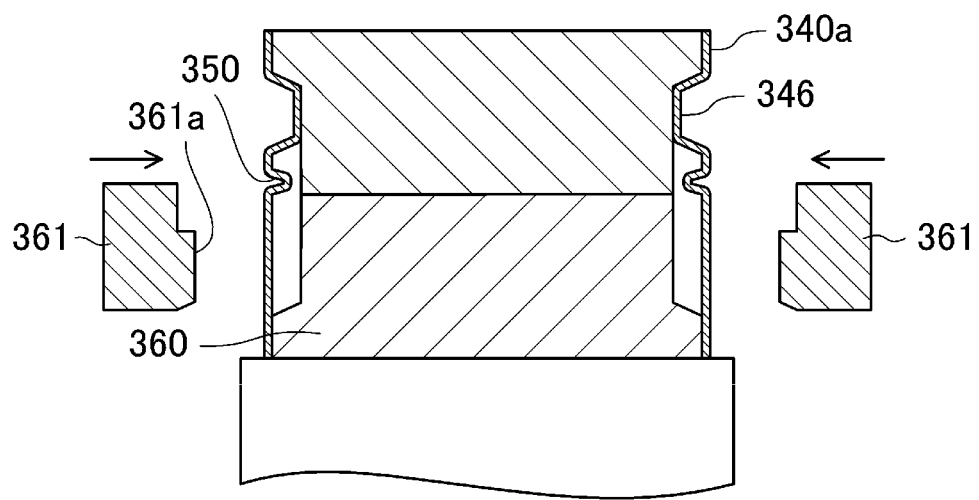
FIG. 45 is yet another diagram illustrating the support region defining step according to a preferred embodiment of the present invention.

Next, referring to FIG. 45, the base 340a is turned upside down and circumferentially displaced by the predetermined step angle. Thereafter, the base 340a is again fitted to the jig 360 such that the opposite opening 344 of the base 340a is placed over the upper edge of the jig 360. Predetermined portions of the circumferential wall 342 of the base 340a are then preferably deformed to shape the recesses 346 in a manner similar to that described above (the second support region defining step).

The recesses 346 and hence the support regions 347 are thereby defined as illustrated in FIG. 33 and other figures.

In the fitting step in accordance with a preferred embodiment of the present invention, which is performed after the support region defining step discussed above, the rotor cores 310, the magnets 320, and the spacers 330 are preferably fitted to the base 340a so that they are temporarily assembled in a unified manner.

First, one of the rotor assemblies 301 is preferably fitted to one of the axial halves of the base 340a. For example, a supporting tool is used to support the rotor assembly 301 with the magnets 320 arranged at predetermined positions on the outer circumferential surface of the rotor core 310. The rotor assembly 301 is then fitted to the base 340a such that the base 340a is placed over axial ends of the rotor core 310 and the magnets 320, and is preferably, for example, press fitted to the base 340a so that the magnets 320 are brought into contact with the recessed dividing portion 350. At this time, the rotor assembly 301 is circumferentially aligned with the base 340a such that both circumferential ends of the convex surface 321 of each magnet 320 are positioned circumferentially inward of both circumferential ends of the inner surface of the corresponding support region 347.

When the rotor assembly 301 is circumferentially aligned with the base 340a such that both circumferential ends of the convex surface 321 of each magnet 320 are positioned circumferentially inward of both circumferential ends of the inner surface of the corresponding support region 347, the convex surfaces 321 are arranged in surface contact with the corresponding support regions 347. The magnets 320 are thereby held securely in the circumferential direction. Moreover, the recessed portions 348 are embedded between every pair of adjacent magnets 320. This contributes to preferably preventing contact between the magnets 320.

Next, the other rotor assembly 301 is fitted to the other axial half of the base 340a such that the other rotor assembly 301 is circumferentially displaced from the first rotor assembly 301 by the predetermined step angle. For example, the supporting tool is used to support the second rotor assembly 301 with the magnets 320 arranged at predetermined positions on the outer circumferential surface of the rotor core 310 thereof. The second rotor assembly 301 is then fitted to the base 340a such that the base 340a is placed over axial ends of the rotor core 310 and the magnets 320 thereof, and is preferably, for example, press fitted to the base 340a so that the rotor core 310 thereof is brought into contact with the rotor core 310 of the first rotor assembly 301, and that the magnets 320 thereof are brought into contact with the recessed dividing portion 350. At this time, the second rotor assembly 301 is circumferentially aligned with the base 340a such that both circumferential ends of the convex surface 321 of each magnet 320 are positioned circumferentially inward of both circumferential ends of the inner surface of the corresponding support region 347.

Finally, the spacer 330 is arranged on an end surface, facing the opening 344, of each of the rotor assemblies 301 fitted to the base 340a. When the rotor cores 310, the magnets 320, and the spacers 330 have been properly fitted to the base 340a, each end portion (i.e., the processed edge 345) of the base 340a around the opening 344 is arranged to protrude over an end surface of the corresponding spacer 330.

In the collar portion defining step in accordance with a preferred embodiment of the present invention, which is performed after the fitting step, the processed edges 345 of the base 340a are deformed to define the collar portions 341. The collar portions 341 are arranged to seal the magnets 320 and so on inside the rotor cover 340.

Figure 46:
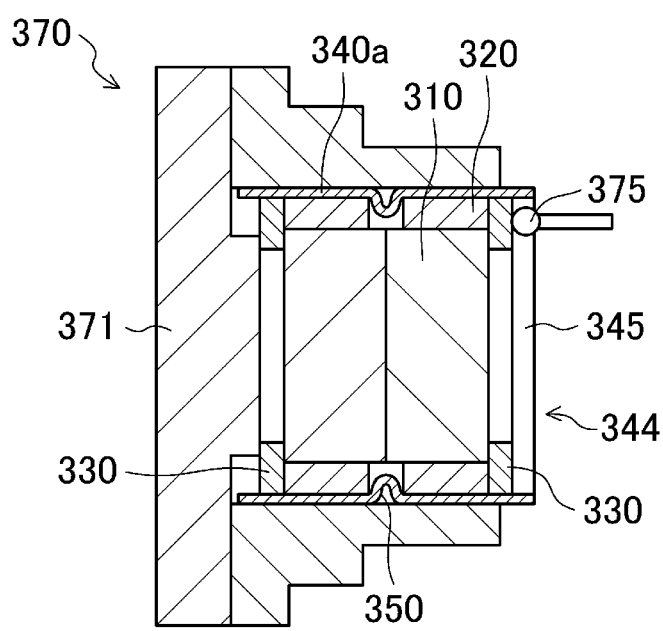
FIG. 46 is a diagram illustrating a collar portion defining step according to a preferred embodiment of the present invention.
Figure 47:
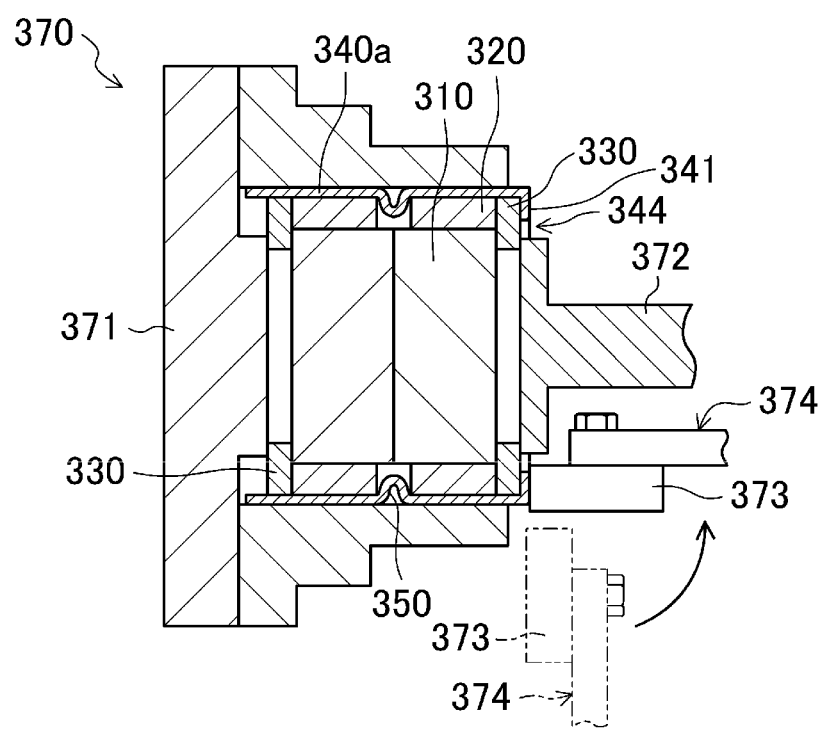
FIG. 47 is another diagram illustrating the collar portion defining step according to a preferred embodiment of the present invention.
Figure 48:
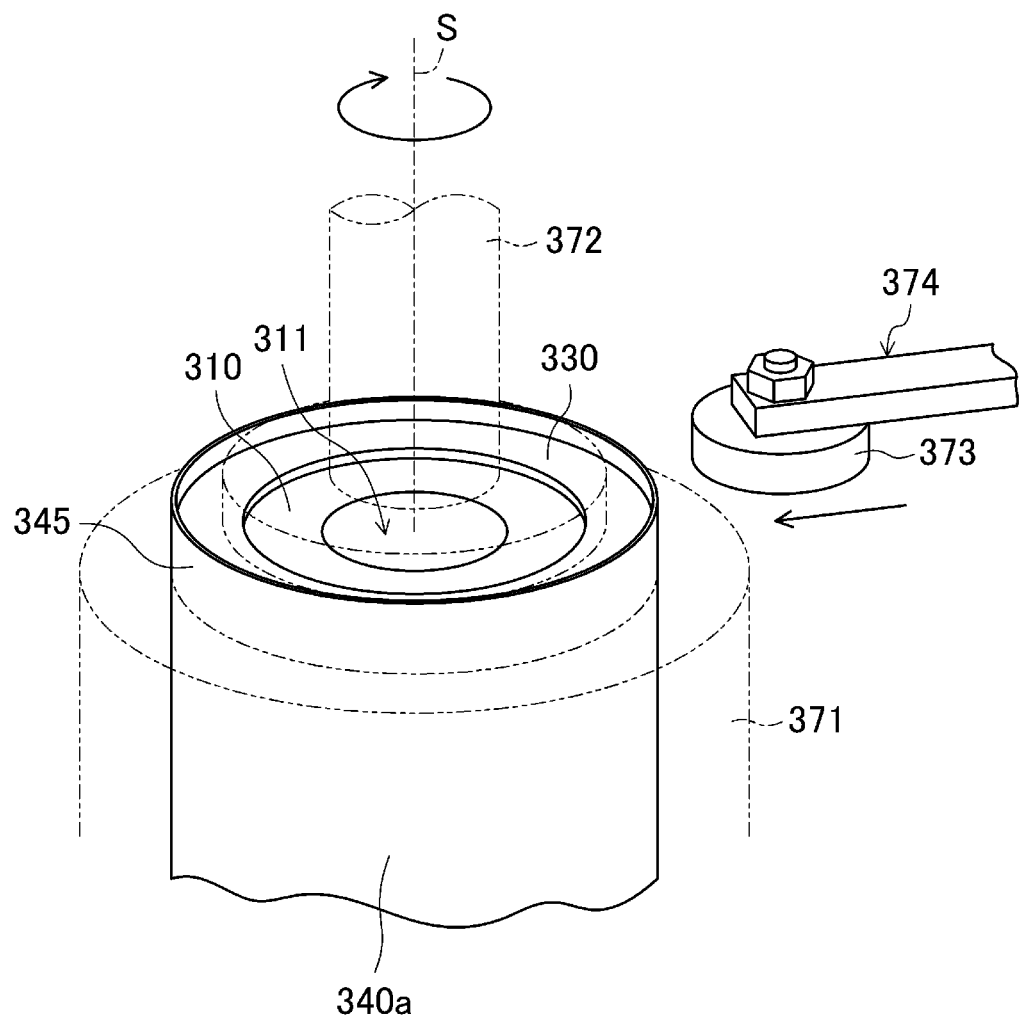
FIG. 48 is yet another diagram illustrating the collar portion defining step according to a preferred embodiment of the present invention.
Figure 49:
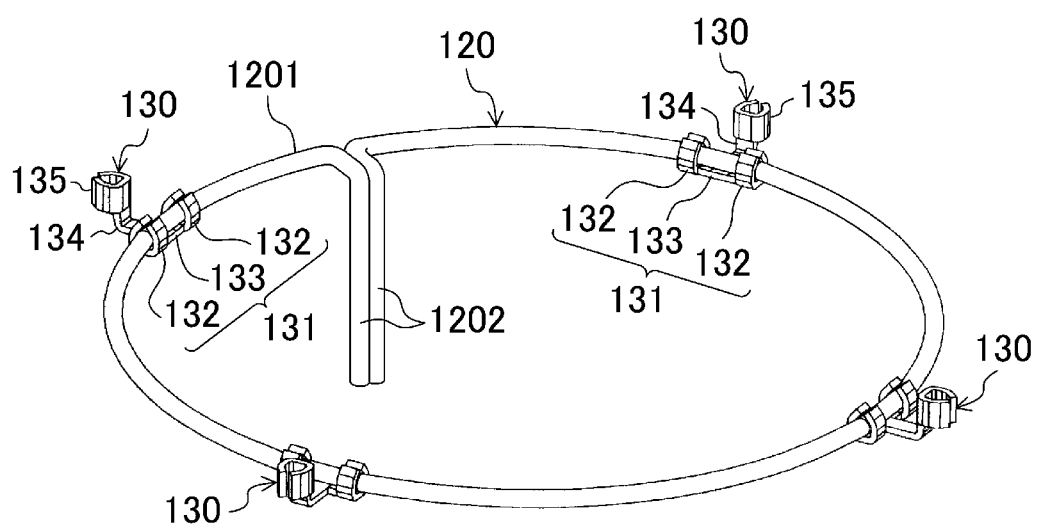
FIG. 49 is a perspective view illustrating an example modification of the busbar according to a preferred embodiment of the present invention.
Figure 50:
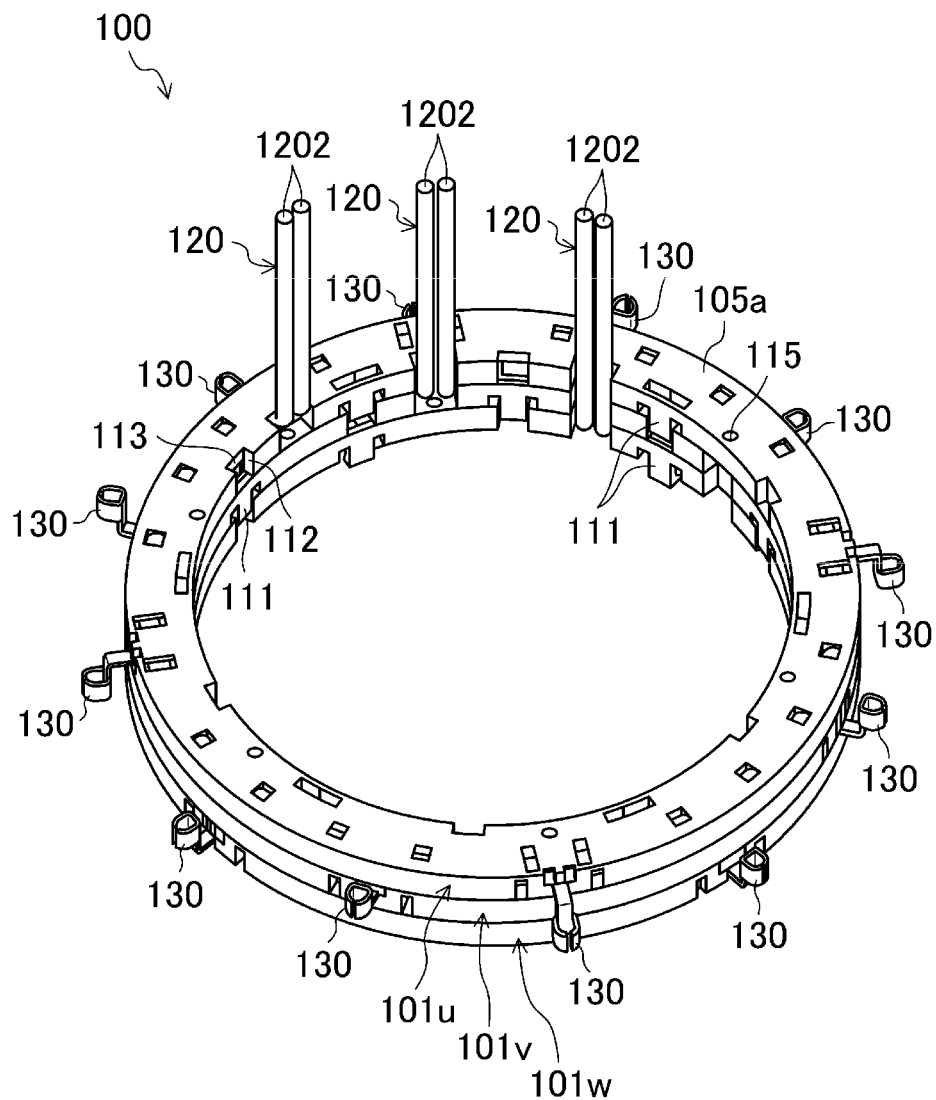
FIG. 50 is a perspective view illustrating an example modification of the busbar unit according to a preferred embodiment of the present invention as viewed from above.
Figure 51:
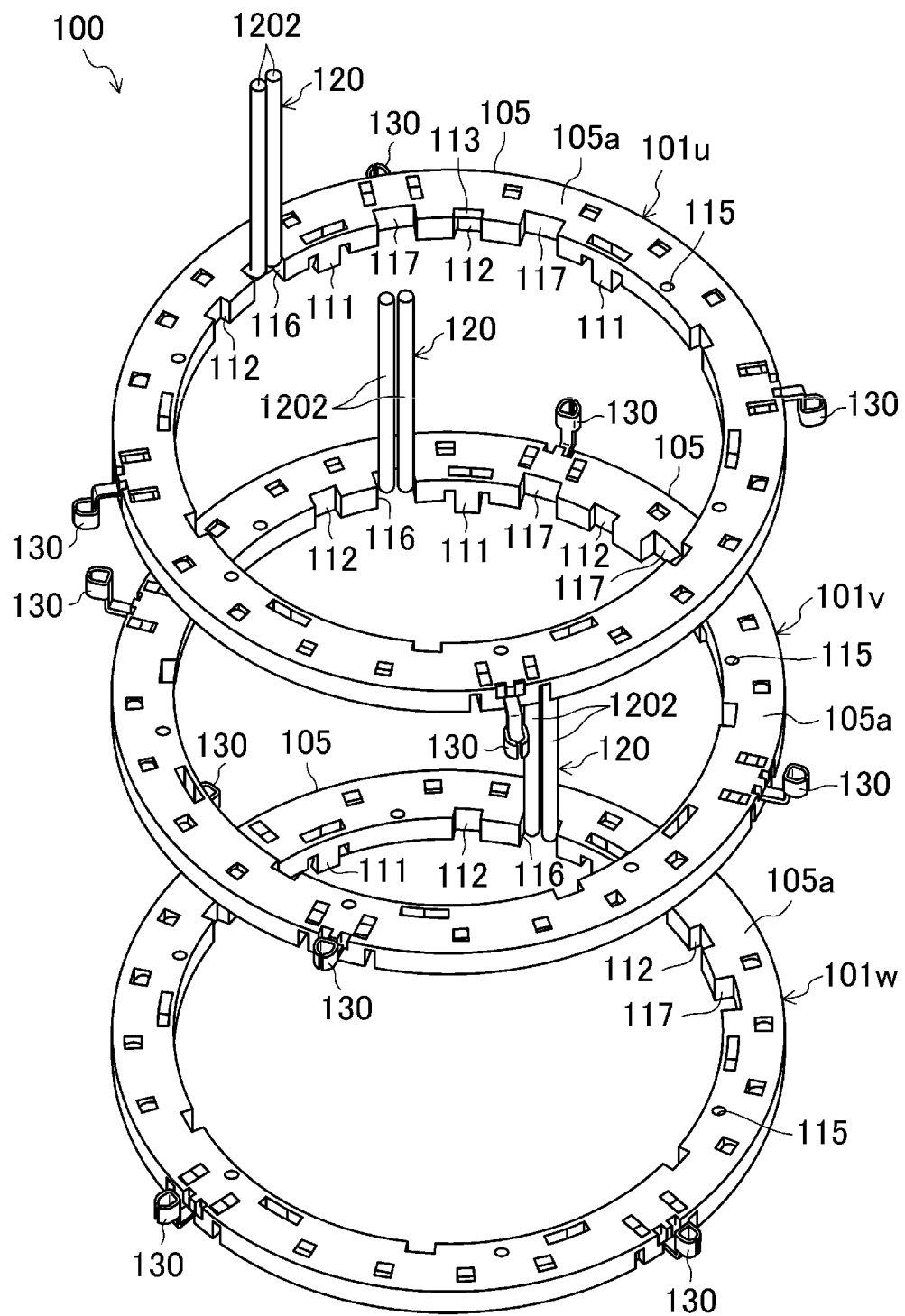
FIG. 51 is an exploded perspective view of the busbar unit according to a preferred embodiment of the present invention illustrated in FIG. 50, in which holders are separated from one another.
Figure 52:
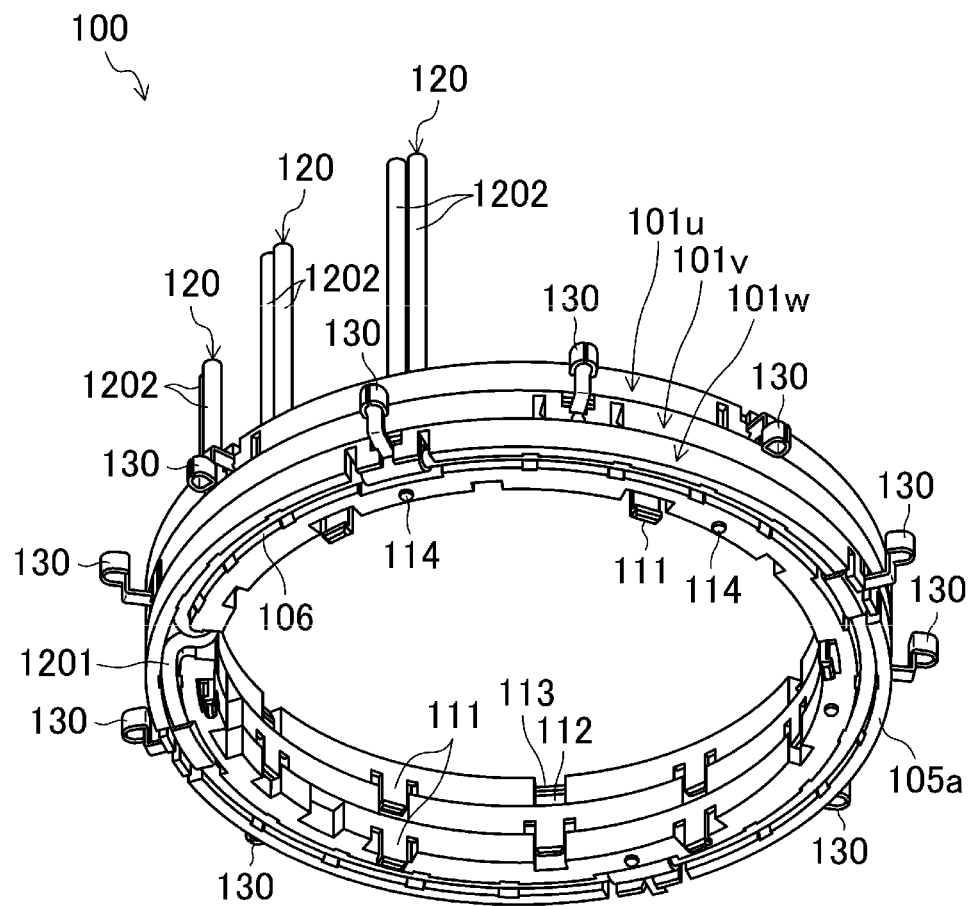
FIG. 52 is a perspective view of the example modification of the busbar unit according to a preferred embodiment of the present invention as viewed from below.
Figure 53:
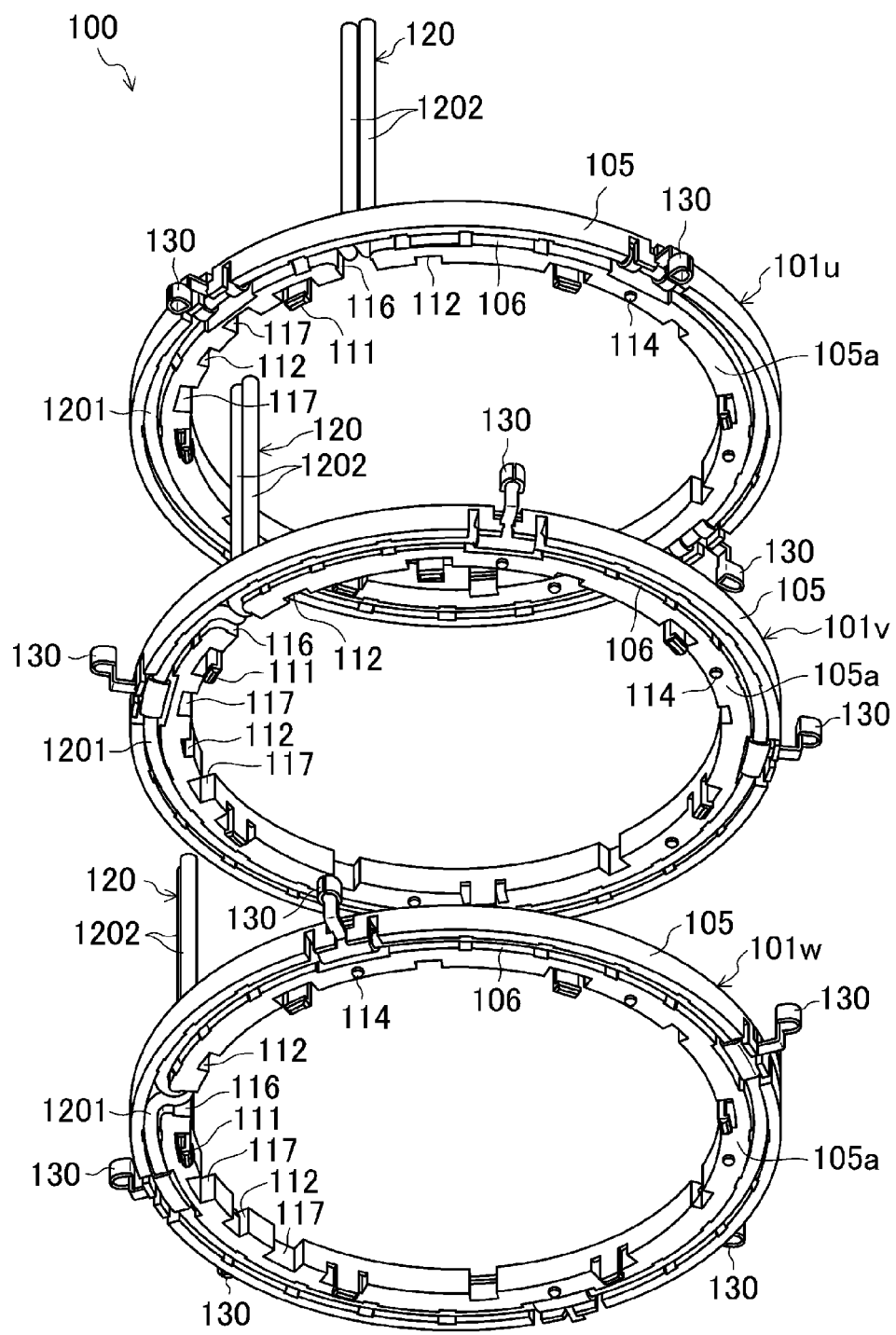
FIG. 53 is an exploded perspective view of the busbar unit according to a preferred embodiment of the present invention illustrated in FIG. 52, in which holders are separated from one another.

The collar portion defining step will now be described below with reference to FIGS. 46, 47, and 48. In the collar portion defining step, a dedicated lathe apparatus 370 is preferably used to define the collar portions 341 as illustrated in FIGS. 46 to 48. The lathe apparatus 370 includes a chuck 371 which is capable of being rotated about the rotation axis S, a tail stock 372, and so on. The tail stock 372 is arranged to be opposed to the chuck 371 along the rotation axis S, and is arranged to rotate in synchronism with the chuck 371 while supporting one of the spacers 330.

The lathe apparatus 370 preferably further includes a small-diameter roller (i.e., a cam follower 373) arranged on a top thereof and being freely rotatable. The lathe apparatus 370 preferably further includes a crimping tool 374. The crimping tool 374 is capable of being shifted in a radial direction with respect to the rotation axis S of the chuck 371 and so on. In addition, the crimping tool 374 is preferably capable of being tilted at least within a range between the rotation axis S and an axis perpendicular or substantially perpendicular to the rotation axis S. Furthermore, the lathe apparatus 370 preferably further includes a touch probe 375 used to determine a reference position during processing. The lathe apparatus 370 preferably further includes a control apparatus and so on (not shown) which are used to perform centralized control of the chuck 371, the tail stock 372, the cam follower 373, the crimping tool 374, and the touch probe 375. The lathe apparatus 370 is arranged to automatically perform a series of processes for defining the collar portions 341.

In the collar portion defining step, first, the base 340a having the rotor cores 310 and so on fitted thereto is held by the chuck 371 such that one of the openings 344 of the base 340a is arranged to face outward. At this time, the chuck 371 and the base 340a are arranged to be coaxial or substantially coaxial with each other to share the same rotation axis S. Referring to FIG. 46, once the lathe apparatus 370 is activated, the touch probe 375 is driven. The touch probe 375 is then brought into contact with the end surface of the spacer 330. A reference surface to be used as a reference during the processing is set thereby. Note that performing the processing based on the reference surface contributes to coping with variations in the dimensions of different parts due to, for example, manufacturing tolerances.

Referring to FIG. 47, the tail stock 372 starts operating based on the set reference surface. The tail stock 372 is then properly pressed against the spacer 330 toward the chuck 371. The base 340a is thereby held by the lathe apparatus 370. In addition, the base 340a is caused to rotate about the rotation axis S at a predetermined rotation rate, together with the chuck 371 and the tail stock 372.

Referring to FIG. 48, while the base 340a is rotating, the cam follower 373 is pressed against the processed edge 345 of the base 340a. Referring to FIG. 47, the cam follower 373 is then preferably tilted in a stepwise manner, so that the processed edge 345 is deformed radially inward to define the collar portion 341. When the collar portion 341 has been defined, the spacer 330 is held between the collar portion 341 and an end portion of the rotor core 310.

The cam follower 373 is arranged to rotate as needed at this time. The rotation of the cam follower 373 preferably contributes to preventing an occurrence of an excessive frictional force (i.e., an aggressive wear) and an unwanted force between the processed edge 345 and the cam follower 373. Furthermore, the spacer 330 contributes to preventing a damage of any magnet 320 and the end portion of the rotor core 310. Furthermore, the spacer 330 also contributes to retaining the circular shape of the processed edge 345 against influence of the recesses 346. The spacer 330 thus facilitates the shaping of the collar portion 341.

The collar portion 341 shaped to extend evenly in the radial direction to have a fine finish. The collar portion 341 is arranged in close contact with the spacer 330 to restrain the movement of the spacer 330.

The collar portion 341 is preferably arranged to project radially inward from the circumferential wall 342 by more than about 1 mm, for example. The projection of more than about 1 mm ensures that the collar portion 341 is reliably shaped to be flat without being corrugated, and also ensures secure retention of the spacer 330. Note that the collar portion 341 may not necessarily be arranged to extend uniformly along the entire circumference thereof. That is, a cut or cuts may be defined in a portion or portions of the collar portion 341.

Thereafter, the base 340a is placed in the lathe apparatus 370 in reverse orientation, and the above-described series of processes is performed in a similar manner to deform the other processed edge 345 to define the other collar portion 341.

The rotor cover 340 is completed when the other collar portion 341 has been defined. The collar portions 341, the spacers 330, and the recessed dividing portion 350 combine to restrain the axial movement of the rotor cores 310 and the magnets 320 fitted inside the rotor cover 340. The rotor cores 310 and the magnets 320 are thereby retained at predetermined positions. As described above, the rotor 300 can preferably be constructed without use of an adhesive, according to the present preferred embodiment. This leads to improved productivity and reduced production cost. Furthermore, it is possible to arrange the magnets at regular or substantially regular intervals in the circumferential direction preferably without use of an intervening adhesive. This leads to an improvement in the degree of imbalance of the rotor.

Note that the present invention is not limited to the rotor 300 and so on according to the above-described preferred embodiments. It is to be understood by those skilled in the art that variations and modifications can be made without departing from the scope and spirit of the present invention.

For example, the shape of the cross section of the rotor core 310 is not limited to an octagon. The shape of the cross section of the rotor core 310 may be changed to, for example, a circle, any of a variety of other polygons, or the like suitably in accordance with the number of magnets 320 arranged on the rotor core 310 and the shape of each magnet 320.

Also note that it may be arranged such that the number of rotor cores 310 is one while a plurality of groups of magnets are arranged one above the other along a rotation axis of the rotor core 310.

Also note that the recessed dividing portion defining step may be performed after the support region defining step. Also note that the recessed dividing portion may not necessarily be arranged to extend continuously along the entire circumference thereof, but may be defined by a portion or portions arranged discontinuously in the circumferential direction, as long as the magnets are axially held thereby.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A busbar unit arranged on an axial end portion of a stator, and electrically connected with a plurality of coil wire terminals arranged to project in an axial direction above the axial end portion of the stator, the busbar unit comprising:
a plurality of busbars each including a body portion defined by an electrically conductive wire having an annular or "C" shape;
a holder member arranged on the axial end portion of the stator to hold the busbars; and
a plurality of terminal members each including a busbar connection portion connected with the body portion of one of the busbars and a coil connection portion connected with one of the coil wire terminals; wherein
the holder member is defined by a plurality of annular holders placed one upon another in the axial direction, each of the holders including an accommodating groove in an annular shape or in a "C" shape arranged to separately accommodate and hold the body portion of a separate one of the busbars and a lead groove arranged to accommodate and hold an external connection portion of the each of the busbars to allow the external connection portion to be drawn from the accommodating groove in a radial direction.

2. The busbar unit according to claim 1, wherein the external connection portion is defined by an electrically conductive wire continuous and integral with the body portion, and arranged to be electrically connected with an external power supply.

3. The busbar unit according to claim 2, wherein each of the busbars is defined by a bare electric wire.

4. The busbar unit according to claim 1, wherein the external connection portion of each of the busbars extends in the axial direction after extending from the accommodating groove in the radial direction.

5. The busbar unit according to claim 4, wherein
the lead groove of each of the holders is arranged to extend radially inward from the accommodating groove and then extend in the axial direction; and
an inner circumferential surface of each of the holders includes a vertical lead groove defined therein correspondingly to the lead groove of a different one of the holders, and arranged to accommodate and hold the external connection portion extending through the lead groove of the different holder to allow the external connection portion to be drawn in the axial direction.

6. The busbar unit according to claim 4, wherein each of the busbars is defined by a bare electric wire.

7. The busbar unit according to claim 1, wherein each of the holders has an identical configuration.

8. The busbar unit according to claim 7, wherein the holders are placed one upon another such that the accommodating grooves of the respective holders do not have opening surfaces thereof facing each other.

9. The busbar unit according to claim 1, wherein the holders are placed one upon another such that the accommodating grooves of the respective holders do not have opening surfaces thereof facing each other.

10. The busbar unit according to claim 9, wherein each of the busbars is defined by a bare electric wire.

11. The busbar unit according to claim 1, wherein each of the holders includes a first annular surface and a second annular surface, the first annular surface including a plurality of raised portions defined therein, the second annular surface including a plurality of recessed portions defined therein to have the raised portions of a different one of the holders fitted therein.

12. The busbar unit according to claim 1, wherein
each of the terminal members is defined by a single piece of plate material; and
each of the terminal members includes a plate-shaped joining portion arranged to extend continuously between the busbar connection portion and the coil connection portion, the joining portion being bent in a plate thickness direction thereof.

13. The busbar unit according to claim 12, wherein each of the busbars is defined by a bare electric wire.

14. The busbar unit according to claim 1, wherein each of the busbars is defined by a bare electric wire.

15. A motor comprising:
the busbar unit of claim 1; and
a stator including a plurality of coils and a plurality of coil wire terminals arranged to project therefrom in an axial direction; wherein
the busbar unit is arranged on an axial end portion of the stator, and the terminal members of the busbar unit are connected with the coil wire terminals of the stator.

16. The motor according to claim 15, wherein the coil wire terminals are arranged at regular intervals in a circumferential direction about an axis of the stator.

17. The motor according to claim 15, further comprising:
a neutral point busbar defined by an electrically conductive wire having an annular or a "C" shape; and
a groove portion defined in the axial end portion of the stator and arranged to hold the neutral point busbar; wherein
the coils of the stator are connected in a star configuration;
the coil wire terminals include a neutral point terminal; and
the terminal members include a neutral point terminal member arranged to connect the neutral point busbar and the neutral point terminal to each other.

* * * * *